(12) United States Patent
Yasui et al.

(10) Patent No.: US 8,965,664 B2
(45) Date of Patent: Feb. 24, 2015

(54) CONTROLLER FOR PLANT

(75) Inventors: Yuji Yasui, Saitama (JP); Koichi Nakajima, Saitama (JP); Michael Fischer, Offenbach/am Main (DE)

(73) Assignee: Honda Motor Co., Ltd., Tokyo (JP)

( * ) Notice: Subject to any disclaimer, the term of this patent is extended or adjusted under 35 U.S.C. 154(b) by 820 days.

(21) Appl. No.: 13/259,021

(22) PCT Filed: Mar. 27, 2009

(86) PCT No.: PCT/JP2009/056366
§ 371 (c)(1),
(2), (4) Date: Sep. 22, 2011

(87) PCT Pub. No.: WO2010/109667
PCT Pub. Date: Sep. 30, 2010

(65) Prior Publication Data
US 2012/0014838 A1 Jan. 19, 2012

(51) Int. Cl.
*F02D 41/00* (2006.01)
*G05B 21/00* (2006.01)
(Continued)

(52) U.S. Cl.
CPC ........ *F02D 41/1402* (2013.01); *F02D 41/0062* (2013.01); *F02D 41/1458* (2013.01);
(Continued)

(58) Field of Classification Search
CPC .............. F02D 41/00; F02D 2041/143; F02D 41/0062; F02D 41/1402; F02D 41/1404; F02D 41/1405; G05B 21/00; G05B 13/041
USPC ......... 701/106, 53, 57, 59, 99, 108, 102, 115; 123/568.11, 568.16, 568.21; 60/276, 60/285, 295, 301
See application file for complete search history.

(56) References Cited

U.S. PATENT DOCUMENTS

| 5,539,638 A | 7/1996 | Keeler et al. |
| 6,882,929 B2 * | 4/2005 | Liang et al. ................... 701/115 |

(Continued)

FOREIGN PATENT DOCUMENTS

| DE | 100 10 745 A1 | 3/2002 |
| EP | 1 367 248 A1 | 12/2003 |

(Continued)

OTHER PUBLICATIONS

Notice of Reasons for Rejection issued to JP Application No. 2011-505786, mailed Nov. 13, 2012.
(Continued)

*Primary Examiner* — Hieu T Vo
(74) *Attorney, Agent, or Firm* — Squire Patton Boggs (US) LLP

(57) ABSTRACT

A controller for a plant that controls a controlled variable for the plant in accordance with estimated values, allowing to reduce any error in the estimated values that is caused by solid variation or aging of the plant. A controller for an exhaust emission control system has an estimated Inert-EGR value calculation section (711) to calculate the estimated value $IEGR_{HAT}$ for the Inert-EGR amount on the basis of an input vector U through a neural network, an estimated LAF sensor output value calculation section (712) to calculate the estimated value $\Phi_{HAT}$ for an exhaust air-fuel ratio correlating with the Inert-EGR amount on the basis of the input vector U through the neural network, an LAF sensor (34) to detect the exhaust air-fuel ratio, and a nonlinear adaptive corrector (713) to calculate the adaptive input $U_{VNS}$ such that the estimated error $E_{HAT}$ between the detected value $\Phi_{ACT}$ from the LAF sensor (34) and the estimated output value $\Phi_{HAT}$ of the LAF sensor (34) is minimized.

13 Claims, 33 Drawing Sheets

(51) Int. Cl.
*F02D 41/14* (2006.01)
*G05B 13/04* (2006.01)

(52) U.S. Cl.
CPC .......... *F02D41/1463* (2013.01); *G05B 13/041* (2013.01); *F02D 41/1405* (2013.01); *F02D 41/1456* (2013.01); *F02D 2041/143* (2013.01); *Y02T 10/47* (2013.01)
USPC .............................. 701/106; 701/59; 701/99

(56) References Cited

U.S. PATENT DOCUMENTS

| | | | |
|---|---|---|---|
| 7,975,471 B2 * | 7/2011 | Miyashita | 60/285 |
| 8,738,269 B2 * | 5/2014 | Yasui et al. | 701/101 |
| 2003/0216855 A1 | 11/2003 | Liang et al. | |

FOREIGN PATENT DOCUMENTS

| | | |
|---|---|---|
| JP | 9-501782 A | 2/1997 |
| JP | 10-312497 A | 11/1998 |
| JP | 11-351049 A | 12/1999 |
| JP | 2001-304027 A | 10/2001 |
| JP | 2002-49409 A | 2/2002 |
| JP | 2003-328732 A | 11/2003 |
| JP | 2008-019782 A | 1/2008 |
| JP | 2008-106717 A | 5/2008 |
| WO | WO 95/04957 A1 | 2/1995 |

OTHER PUBLICATIONS

Supplementary European Search Report issued to Application No. EP09842281.9, mailed Jul. 31, 2012.

* cited by examiner

CONTROLLER FOR PLANT

CROSS REFERENCES TO RELATED APPLICATION

This application is a National Stage entry of International Application No. PCT/JP2009/056366, filed Mar. 27, 2009, the disclosure of the prior application is incorporated in its entirety by reference.

TECHNICAL FIELD

The present invention relates to a control device for a plant. In particular, the present invention relates to a control device for a plant that calculates an estimated value of a predetermined physical quantity indicating a state of the plant, and controls a control variable of the plant based on this estimated value.

BACKGROUND ART

In plants such as an internal combustion engine and an exhaust purification system thereof, a plurality of physical quantities indicating the state of this plant is differentiated into physical quantities that are detected by way of a sensor (detected physical quantities) and physical quantities not detected by a sensor (non-detected physical quantities). Herein, physical quantities that cannot be directly detected by a sensor in principle, physical quantities that are not directly detected using a sensor for various reasons such as durability and cost, and the like are included in non-detected physical quantities. In a case of the necessity arising to control a plant based on such non-detected physical quantities, the estimated values thereof are calculated by a control device based on other detected physical quantities, basically.

As one concrete example of a non-detected physical quantity, a physical quantity related to an exhaust recirculation device such as the EGR amount and EGR rate in an exhaust purification system of an internal combustion engine can be exemplified. Technology related to the calculation of estimated values of the EGR amount and EGR rate, and control based on these estimated values is shown in Patent Document 1 and Patent Document 2.

Patent Document 1 illustrates a control device that calculates the estimated value of the EGR rate by way of a map in which the relationships between the aperture of various valves, intake new air amount, engine revolution speed, and EGR rate are established. With this control device, fluctuation in the amount of NOx discharged from the internal combustion engine is suppressed by regenerating a diesel particulate filter (hereinafter referred to as "DPF") so that the estimated value of the EGR rate maintains a target EGR rate.

Patent Document 2 illustrates a control device that calculates an estimated value of the EGR amount based on the aperture of the EGR valve, the intake air amount detected by an air flow meter, and the like. With this control device, combustion noise of the engine in a transient operating state is reduced, and the emission amount of NOx is decreased by correcting the fuel injection timing and pilot injection amount based on the EGR amount thus estimated.

Patent Document 1: Japanese Unexamined Patent Application, Publication No. 2008-106717

Patent Document 2: Japanese Unexamined Patent Application, Publication No. 2008-19782

DISCLOSURE OF THE INVENTION

Problems to be Solved by the Invention

However, in the technology shown in Patent Document 1 and Patent Document 2, other previously known technology, and the like, a map established in advance and an arithmetic expression set in advance are used when estimating the EGR amount and EGR rate. However, in a case of using such a map and arithmetic expression established in advance, error will occur between the estimated value and actual value when aging degradation and variability in solids of the system arise, a result of which suitable control will no longer be performed.

The present invention has been made taking the aforementioned points into account, and has an object of providing a control device for a plant that controls a control variable of the plant based on an estimated value, and can suppress error of the estimated value due to variability in solids and aging degradation of the plant.

Means for Solving the Problems

In order to achieve the above-mentioned objects, the present invention provides a control device of a plant (2, 2A, 2B). The control device for the plant includes: a first estimated value calculating means (711, 811, 911, 915) for calculating an estimated value ($IEGR_{HAT}$, $NOX_{HAT}$, $RED_{HAT}$) of a first physical quantity, which is at least one of a plurality of physical quantities indicating a state of the plant, by way of a predetermined algorithm based on a plurality of inputs; a second estimated value calculating means (712, 812, 912) for calculating an estimated value ($\Phi_{HAT}$) of a second physical quantity, which correlates with the first physical quantity, by way of a predetermined algorithm based on a plurality of inputs; a detection means (34) for detecting the second physical quantity; and an adaptive input calculating means (713, 813, 913) for calculating an adaptive input ($U_{VNS}$) to be mutually inputted to the first estimated value calculating means and the second estimated value calculating means, so that deviation ($E_{HAT}$) between a detected value ($\Phi_{ACT}$) of the second physical quantity detected by way of the detection means and the estimated value ($\Phi_{HAT}$) of the second physical quantity calculated by way of the second estimated value calculating means becomes a minimum. The control device for a plant controls a predetermined control variable of the plant based on an estimated value of the first physical quantity.

According to this configuration, the estimated value of the first physical quantity is calculated based on a predetermined algorithm by the first estimated value calculating means, and the estimated value of the second physical quantity is calculated based on a predetermined algorithm based on the second estimated value calculating means. Herein, the adaptive input calculated so that the deviation between the estimated value of the second physical quantity and the output value of the detection means becomes a minimum is input to the first estimated value calculating means and the second estimated value calculating means. Furthermore, a predetermined control variable of the plant is controlled based on this estimated value of the first physical quantity.

Herein, error in the estimated value of the first physical quantity occurs due to variability in solids and aging degradation of the plant, for example. In this case, error is considered to occur in the estimated value of the second physical quantity correlated to the first physical quantity. According to the above-mentioned configuration, the error occurring in this estimated value of the first physical quantity is detected as deviation between the estimated value of the second physical quantity and the detected value of the detection means. The adaptive input is further calculated so that this deviation becomes a minimum, and is input to the first estimated value calculating means and second estimating means. It is thereby possible to suppress error of the estimated value of the first physical quantity as well as the estimated value of the second physical quantity. In addition, it is possible to control the control variable of the plant to an appropriate state by controlling the predetermined control variable based on such an estimated value of the first physical quantity.

It is preferable for the algorithm of the first estimated value calculating means and the algorithm of the second estimated value calculating means to each be a neural network configured by joining a plurality of neurons that output according to a predetermined function (f(x), g(x)).

According to this configuration, the estimated values of the first physical quantity and the second physical quantity are calculated by neural networks that excel in reproducibility of non-linear dynamic characteristics. It is thereby possible, even if the actual first physical quantity exhibits non-linear behavior, to estimate this with high precision, for example.

It is preferable for data related to a physical quantity at a plurality of different times to be included in a plurality of inputs (U) to the first estimated value calculating means and a plurality of inputs (U) to the second estimated value calculating means, respectively.

According to this configuration, it is possible to further improve the reproducibility of the dynamic behavior of the estimated value by including data related to the physical quantity at a plurality of different times in the inputs to the first estimated value calculating means and the second estimated value calculating means.

It is preferable for the adaptive input calculating means to include: a weighting function setting means (715) for defining a plurality of regions ($W_{ij}$) overlapping each other in a space in which at least one among a plurality of inputs to the first estimated value calculating means and a plurality of inputs to the second estimated value calculating means is defined as a reference parameter, and the reference parameter is set as a base thereof, and for setting a plurality of weighting functions that is normalized to have a value that is not "0" in each of the regions, respectively; a corrected value calculating means (716) for calculating a corrected value ($U_{ij}$) in each of the regions so that a product of a value of the weighting functions and the deviation become a minimum; and a determination means (717) for determining an adaptive input based on a sum total ($\Sigma\Sigma W_{ij}U_{ij}$) of products of the value of the weighting functions and the corrected value over all of the regions.

According to this configuration, a plurality of regions is defined in a space with a reference parameter as a base, and weighting functions are set in the respective regions. Then, a corrected value is calculated in every region so that the product of the weighting functions and the above-mentioned deviation becomes a minimum. Furthermore, an adaptive input is determined based on the sum total of products between the weighting functions and the above-mentioned corrected value over the entire region.

However, the influence that aging degradation and variability in solids of the plant exerts on the error in the estimated values of the first physical quantity is considered to differ depending on the condition of the plant. According to this configuration, it is possible to calculate the adaptive input taking account of the influences on error differing at every plant condition, by calculating the corrected value in every region within the space with the reference parameters illustrating the conditions of the plant as the base.

It is preferable for the plant to be an exhaust purification system (2) of an internal combustion engine (1) including an exhaust recirculation device (40, 45) that recirculates a portion of exhaust flowing through an exhaust system of the internal combustion engine to an intake system of the internal combustion engine. The first physical quantity of the plant includes a parameter related to exhaust to be recirculated in the internal combustion engine by way of the exhaust recirculation device.

According to this configuration, with a parameter related to the exhaust recirculated to the internal combustion engine by way of the exhaust recirculation device as the first physical quantity, the estimated value of this first physical quantity is calculated in the aforementioned sequence. The parameter related to the exhaust recirculated by way of the exhaust recirculation device cannot be accurately detected with existing sensors. Therefore, the exhaust purification system can be controlled to the appropriate state based on the variability in solids and aging degradation thereof by accurately calculating the estimated value of this parameter with the first estimated value calculating means.

In particular, the parameter related to the exhaust recirculated by way of the exhaust recirculation device exhibits a non-linear behavior at transient times. As a result, such non-linear behavior can be reproduced by calculating the estimated value of the aforementioned parameter based on the aforementioned such neural network.

It is preferable for the exhaust recirculation device to include an exhaust recirculation channel (41, 46) that recirculates a portion of exhaust flowing through the exhaust system to the intake system, and an exhaust recirculation control valve (42, 47) that is provided in the exhaust recirculation channel. The control device further includes a controller (7, 72, 73, 74) that determines an operation amount ($L_{HP}$, $L_{LP}$) of the exhaust recirculation control valve so that the estimated value ($IEGR_{HAT}$) of the parameter related to exhaust to be recirculated matches a predetermined target value ($IEGR_{IDEAL\_CMD}$).

According to this configuration, the controller determines the operation amount of the exhaust recirculation control valve so that the estimated value of the parameter related to the exhaust recirculated by way of the exhaust recirculation device matches a predetermined target value. It is thereby possible to adequately determine the operation amount of the exhaust recirculation control value in accordance with the variability in solids and aging degradation of the exhaust purification system. Therefore, an increase in the discharged amount of NOx due to variability in solids and aging degradation of the exhaust purification system can be suppressed.

It is preferable for the plant to be an exhaust purification system (2A) for an internal combustion engine, including: a selective reduction catalyst (61) that is provided in an exhaust system of the internal combustion engine and reduces NOx flowing through the exhaust system under the presence of a reducing agent; and a reducing agent supply means (62) for supplying a reducing agent or an additive serving as a source of the reducing agent into the exhaust system on an upstream side of the selective reduction catalyst. The first physical quantity of the plant includes a parameter related to NOx in exhaust flowing into the selective reduction catalyst.

According to this configuration, with a parameter related to NOx in the exhaust flowing into the selective reduction catalyst set as the first physical quantity, the estimated value of this first physical quantity is calculated in the aforementioned sequence. In regards to a sensor detecting NOx in the exhaust, the detection resolution and responsiveness is low, and the output variability is large for existing sensors. As a result, a parameter related to NOx in the exhaust cannot be accurately detected. Therefore, it is possible to control the exhaust purification system to an appropriate state based on the variability in solids and aging degradation thereof, by accurately calculating the estimated value of such a parameter related to NOx in the exhaust with the first estimated value calculating means.

It is preferable for the control device for a plant to further include a controller (8, 82, 83, 84, 85) that determines a supply amount ($G_{UREA}$) of the reducing agent or the additive from the reducing agent supply means, based on an estimated value ($NOX_{HAT}$) of the parameter related to NOx in the exhaust.

According to this configuration, the controller determines the supply amount of the reducing agent or additive based on the estimated value of the parameter related to NOx in the exhaust. It is thereby possible to maintain the NOx purification rate of the selective reduction catalyst to be high, in accordance with the variability in solids and aging degradation of the exhaust purification system.

It is preferable for the plant to be an exhaust purification system (2B) of an internal combustion engine including: a NOx purification catalyst (65) that is provided in an exhaust system of the internal combustion engine, adsorbs or occludes NOx in exhaust when an air/fuel mixture combusting in the internal combustion engine is set to be leaner than a theoretical air/fuel ratio, and reduces the NOx thus adsorbed or occluded under a reducing atmosphere; and a reducing means (9) for executing reducing control processing to make the exhaust flowing into the NOx purification catalyst a reducing atmosphere. The first physical quantity of the plant includes a parameter related to NOx in exhaust flowing into the NOx purification catalyst, and a parameter related to a reducing component in exhaust flowing into the NOx purification catalyst.

According to this configuration, with the parameters related to the NOx and the reducing component in the exhaust flowing into the NOx purification catalyst as the first physical quantities, the estimated value of these first physical quantities are calculated in the aforementioned sequence. Such NOx and reducing component in the exhaust cannot be accurately detected with existing sensors in the aforementioned way. Therefore, it is possible to control the exhaust purification system to an appropriate state based on the variability in solids and aging degradation thereof, by accurately calculating an estimated value of such parameters related to the NOx and the reducing component in the exhaust with the first estimated value calculating means.

It is preferable for the control device for a plant to further include a controller (9, 92, 93) that instructs execution of the reducing control processing based on estimated values ($NOX_{HAT}$, $RED_{HAT}$) of the parameter related to NOx and the parameter related to the reducing component.

According to this configuration, the controller instructs execution of reducing control processing based on the estimated values of the parameters related to the NOx and the reducing component in the exhaust. It is thereby possible to maintain the NOx purification rate of the NOx purification catalyst to be high, in accordance with the variability in solids and aging degradation of the exhaust purification system.

It is preferable for the second physical quantity to be an air/fuel ratio of exhaust flowing through the exhaust system.

According to this configuration, with the air/fuel ratio of the exhaust set as the second physical parameter, an estimated value of this second physical quantity is calculated.

The parameter related to the exhaust recirculated by the aforementioned exhaust recirculation device, the parameter related to NOx in the exhaust, and the parameter related to reducing component in the exhaust all have a strong correlation with the air/fuel ratio of the exhaust. The accuracy of the estimated value of the first physical quantity can be improved by estimating the value of such an air/fuel ratio of the exhaust as the second physical quantity, and calculating the adaptive input so that the deviation between this estimated value and the detected value become a minimum.

EXPLANATION OF REFERENCE NUMERALS

Figure 1:
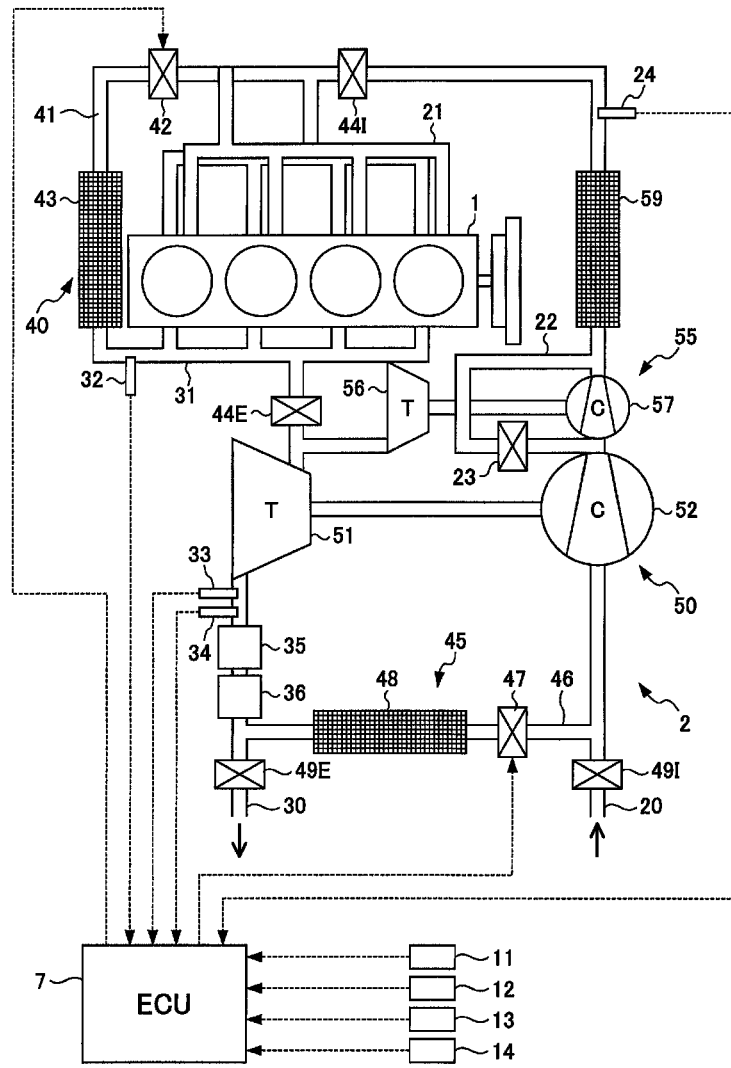
FIG. 1 is a schematic diagram showing configurations of an engine and exhaust purification system thereof, as well as a controller thereof according to a first embodiment of the present invention.

1 Engine (internal combustion engine)
2, 2A, 2B Exhaust purification system (plant, exhaust purification system)
20 intake plumbing (intake system)
21 intake manifold (intake system)
30 exhaust plumbing (exhaust system)
31 exhaust manifold (exhaust system)
34 LAF sensor (detection means)
40 High-pressure EGR device (exhaust recirculation device)
41 High-pressure EGR channel (exhaust recirculation path)
42 High-pressure EGR valve (exhaust recirculation control valve)
45 Low-pressure EGR device (exhaust recirculation device)
46 Low-pressure EGR channel (exhaust recirculation path)
47 Low-pressure EGR valve (exhaust recirculation control valve)
61 Selective reduction catalyst
62 Urea injection device (reducing agent supply means)
65 NOx purification catalyst
7 ECU
71 Adaptive virtual sensor system
711 Inert-EGR estimated value calculating portion (first estimated value calculating means)
712 LAF sensor output estimated value calculating portion (second estimated value calculating means)
713 Non-linear adaptive corrector (adaptive input calculating means)
715 Weighting function setting portion (weighting function setting means)
716 Local adaptive input calculating portion (corrected value calculating means)
717 Adaptation coefficient calculating portion (determination means)
72 Inert-EGR amount target value calculating portion (controller)
73 Inert-EGR controller (controller)
74 Lift amount calculating portion (controller)
8 ECU
81 Adaptive virtual sensor system
811 NOx amount estimated value calculating portion (first estimated value calculating means)
812 LAF sensor output estimated value calculating portion (second estimated value calculating means)
813 Non-linear adaptive corrector (adaptive input calculating means)
82 Feed-forward injection amount determining portion (controller)
83 Storage amount target value setting portion (controller)
84 Feedback injection amount determining portion (controller)
85 Adder (controller)
9 ECU
91 Adaptive virtual sensor system
911 NOx amount estimated value calculating portion (first estimated value calculating means)
912 LAF sensor output estimated value calculating portion (second estimated value calculating means)
913 Non-linear adaptive corrector (adaptive input calculating means)
915 Reducing agent amount estimated value calculating portion (first estimated value calculating means)
92 NOx adsorption/occlusion amount estimating portion (controller)
93 Rich mode controller (controller)

PREFERRED MODE FOR CARRYING OUT THE INVENTION

First Embodiment

Hereinafter, a first embodiment of the present invention will be explained while referring to the drawings.

FIG. 1 is a schematic diagram showing configurations of an internal combustion engine (hereinafter referred to as "engine") 1 and exhaust purification system 2 thereof, as well as a controller thereof.

The engine 1 is a gasoline engine of lean-burn operating type or a diesel engine, and is mounted in a vehicle, which is not illustrated. Fuel injectors that inject fuel into the combustion chamber of each cylinder are provided to the engine 1. These fuel injectors are electrically connected by an electronic control unit (hereinafter referred to as "ECU") 7, and the valve-opened time and valve-closed time of the fuel injectors are controlled by the ECU 7.

The exhaust purification system 2 is configured to include intake plumbing 20 that is connected to the engine 1 and through which intake air flows, exhaust plumbing 30 through which the exhaust of the engine 1 flows, a high-pressure exhaust recirculation device (hereinafter referred to as "high-pressure EGR device") 40 and low-pressure exhaust recirculation device (hereinafter referred to as "low-pressure EGR device") 45 that recirculate a portion of the exhaust to the intake air, an oxidation catalyst 35 and DPF 36 that purify the exhaust, and a primary turbocharger 50 and secondary turbocharger 55 that pressure feed intake air to the engine 1.

The intake plumbing 20 is connected to the intake port of each cylinder of the engine 1 via a plurality of branches in the intake manifold 21. The exhaust plumbing 30 is connected to the exhaust port of each cylinder of the engine 1 via a plurality of branches in the exhaust manifold 31.

The primary turbocharger 50, secondary turbocharger 55, and an intercooler 59 are provided in the intake plumbing 20 in this sequence from an upstream side.

The primary turbocharger 50 includes a turbine 51 provided in the exhaust plumbing 30, and a compressor 52 provided in the intake plumbing 20. The turbine 51 is driven by the kinetic energy of exhaust flowing through the exhaust plumbing 30. The compressor 52 is driven by the rotation of the turbine 51 to compress the intake air. Furthermore, the primary turbocharger 50 includes variable vanes that are not illustrated, which change the rotation speed of the turbine 51 by way of an opening/closing operation.

The secondary turbocharger 55 includes a turbine 56 provided in the exhaust plumbing 30 more upstream than the turbine 51 of the primary turbocharger 50, and a compressor 57 provided in the intake plumbing 20 more downstream than the compressor 52 of the primary turbocharger 50. The turbine 56 is driven by the kinetic energy of the exhaust flowing through the exhaust plumbing 30. The compressor 57 is driven by the rotation of the turbine 56 to compress the intake air. Furthermore, the secondary turbocharger 55 includes variable vanes that are not illustrated, which change the rotation speed of the turbine 51 by way of an opening/closing operation.

In addition, a bypass channel 22 that bypasses the compressor 57 of the secondary turbocharger 55 is provided in the intake plumbing 20. A bypass valve 23 that opens and closes this bypass channel 22 is provided in the bypass channel 22.

The intercooler 59 cools the intake air compressed by the two turbochargers 50 and 55.

The oxidation catalyst 35 and DPF 36 are provided in the exhaust plumbing 30 in this sequence from an upstream side, downstream of the turbine 51 of the primary turbocharger 50.

The oxidation catalyst 35 raises the temperature of exhaust with the heat generating by reaction with the exhaust. In this oxidation catalyst 35, for example, a catalyst is used that is configured by adding a zeolite excelling in HC adsorption action and rhodium (Rh) that excels in HC steam forming action, to a support of alumina ($Al_2O_3$) on which platinum (Pt) acting as a catalyst is loaded.

The DPF 36 collects particulate matter (hereafter referred to as "PM") in which carbon in the exhaust is a main component, by causing to deposit on the surface of the filter walls and in the holes in the filter walls, when exhaust flows through minute holes in the filter walls. A porous body of ceramics such as silicon carbide (SiC) is used as the constituent material of the filter walls, for example.

The high-pressure EGR device 40 is configured to include a high-pressure EGR channel 41, high-pressure EGR valve 42, high-pressure EGR cooler 43, high-pressure EGR intake shutter 44I, and high-pressure EGR exhaust shutter 44E.

The high-pressure EGR channel 41 connects the exhaust manifold 31 and the intake manifold 21. The high-pressure EGR valve 42 is provided in the high-pressure EGR channel 41, and controls the flow rate of exhaust to be recirculated via this high-pressure EGR channel 41. The high-pressure EGR cooler 43 cools the exhaust recirculated via the high-pressure EGR channel 41. The high-pressure EGR intake shutter 44I is provided in the intake plumbing 20 downstream of the intercooler 59, and the high-pressure EGR exhaust shutter 44E is provided in the exhaust plumbing 30 upstream of the turbine 56.

The high-pressure EGR valve 42, high-pressure EGR intake shutter 44I and high-pressure EGR exhaust shutter 44E are connected to the ECU 7 via actuators, which are not illustrated, and the aperture thereof (lift amount) is electromagnetically controlled by the ECU 7.

The low-pressure EGR device 45 is configured to include a low-pressure EGR channel 46, low-pressure EGR valve 47, low-pressure EGR cooler 48, low-pressure EGR intake shutter 49I, and low-pressure EGR exhaust shutter 49E.

The low-pressure EGR channel 46 connects the downstream side of the DPF 36 in the exhaust plumbing 30 and the upstream side of the compressor 52 in the intake plumbing 20. The low-pressure EGR valve 47 is provided in the low-pressure EGR channel 46, and controls the flow rate of exhaust to be recirculated via this low-pressure EGR channel 46. The low-pressure EGR cooler 48 cools the exhaust recirculated via the low-pressure EGR channel 46. The low-pressure intake shutter 49I is provided in the intake plumbing 20 more upstream than the connection portion of the low-pressure EGR channel 46 to the intake plumbing 20, and the low-pressure EGR exhaust shutter 49E is provided in the exhaust plumbing 30 more downstream than a connection portion of the low-pressure EGR channel 46 to the exhaust plumbing 30.

The low-pressure EGR valve 47, low-pressure EGR intake shutter 49I and low-pressure EGR exhaust shutter 49E are connected to the ECU 7 via actuators that are not illustrated, and the apertures thereof (lift amount) are electromagnetically controlled by the ECU 7.

A crank angle position sensor 11 that detects the rotational angle of the crank shaft of the engine 1, and an accelerator sensor 12 that detects a depression amount of the accelerator pedal of the vehicle driven by the engine 1 are connected to the ECU 7, and the detection signals of these sensors are supplied to the ECU 7. Herein, the revolution speed NE of the engine 1 is calculated by the ECU 7 based on the output of the crank angle position sensor 11. A fuel injection amount $G_{FUEL}$ indicating the load of the engine 1 is calculated by the ECU 7 based on the output of the accelerator sensor 12.

In addition to these sensors 11 and 12, an intake pressure sensor 24, first exhaust pressure sensor 32, second exhaust pressure sensor 33, LAF sensor 34, first lift sensor 13 and second lift sensor 14 that detect physical quantities in each portion of the exhaust purification system 2 are connected to the ECU 7.

The intake pressure sensor 24 detects an intake air pressure P2 in the intake plumbing 20 between the intercooler 59 and the high-pressure EGR intake shutter 49I, and transmits a signal substantially proportional to the detected value to the ECU 7. The first exhaust pressure sensor 32 detects an exhaust pressure P3 in the high-pressure EGR channel 41 on an upstream side of the high-pressure EGR cooler 43, and transmits a signal substantially proportional to the detected value to the ECU 7. The second exhaust pressure sensor 33 detects an exhaust pressure P4L in the exhaust plumbing 30 between the turbine 51 and the oxidation catalyst 35, and transmits a signal substantially proportional to the detected value to the ECU 7. The LAF sensor 34 detects the air/fuel ratio $\Phi_{ACT}$ of exhaust in the exhaust plumbing 30 between the turbine 51 and oxidation catalyst 35, and transmits a signal substantially proportional to the detected value to the ECU 7. The first lift sensor 13 detects a lift amount $L_{HP\_ACT}$ of the high-pressure EGR valve 42, and transmits a signal substantially proportional to the detected value to the ECU 7. The second lift sensor 14 detects a lift amount $L_{LP\_ACT}$ of the low-pressure EGR valve 47, and transmits a signal substantially proportional to the detected value to the ECU 7.

The ECU 7 is provided with an input circuit having functions such as of shaping input signal waveforms from every kind of sensor, correcting the voltage levels to predetermined levels, and converting analog signal values to digital signal values, and a central processing unit (hereinafter referred to as "CPU"). In addition, the ECU 7 is provided with a storage circuit that stores every kind of calculation program executed by the ECU, calculation results, and the like, and an output circuit that outputs control signals to the high-pressure EGR valve 42, low-pressure EGR valve 47, turbochargers 50 and 55, fuel injectors of the engine 1, and the like.

Next, the issues focused on by the inventors of the present application upon configuring the ECU controlling such an exhaust purification system 2 will be explained while referring to FIGS. 2 and 3.

Figure 2:
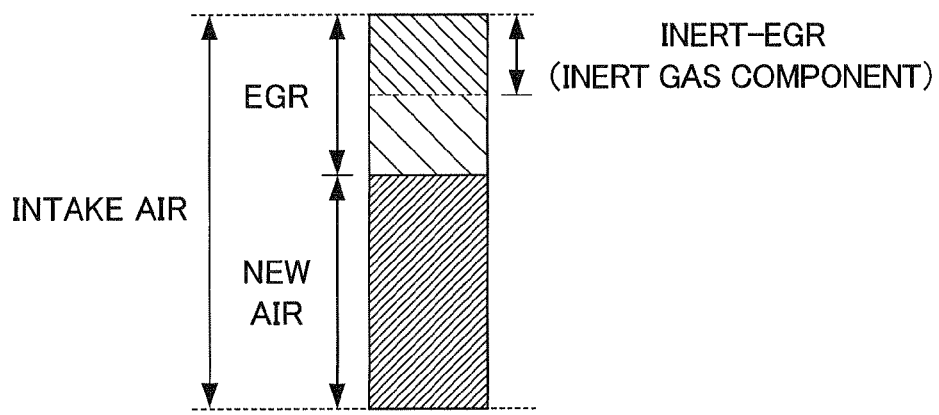
FIG. 2 is a graph showing the portion of intake air aspirated into the cylinders.

FIG. 2 is a graph showing the portion of intake air aspirated into the cylinders.

As shown in FIG. 2, the intake air is constituted by a part that is newly aspirated (new air component), and a part that is recirculated from the exhaust by the high-pressure EGR device and low-pressure EGR device (EGR component). However, diesel engines and lean-burn gasoline engines perform lean combustion, whereby residual oxygen in addition to inert gas exists in abundance in the exhaust. Therefore, among the EGR component, only the component of this inert gas is indicated and referred to as Inert-EGR, as shown in FIG. 2. In addition, the amount of this inert gas is referred to as Inert-EGR amount.

Figure 3:
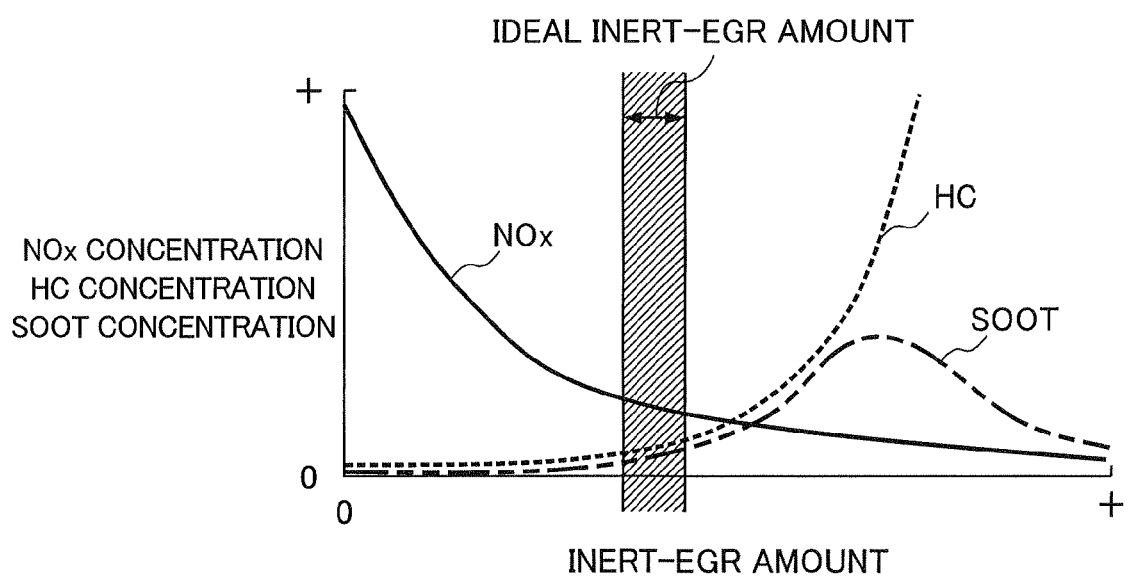
FIG. 3 is a graph showing relationships between an Inert-EGR amount and the amounts of NOx, HC and soot discharged from the engine.

FIG. 3 is a graph showing relationships between the Inert-EGR amount defined as above, and the concentration of NOx, HC and soot in the exhaust emitted from the engine. As shown in FIG. 3, there is a strong correlation between the Inert-EGR amount, and the NOx concentration, HC concentration and soot concentration.

More specifically, when the Inert-EGR amount is large, the combustion temperature declines due to the specific heat capacity of the mixed gas increasing, and the NOx concentration decreases. In addition, the concentrations of HC and soot increase accompanying such a decline in combustion temperature. Moreover, if the Inert-EGR amount increases further, the soot concentration will decrease since unburned HC will increase from the decline in combustion temperature. Therefore, in order to reduce all of these concentrations of NOx, HC and soot as much as possible, it is preferable to control the Inert-EGR amount to within the region indicated by hatching in FIG. 3.

With the exhaust purification system 2 such as that shown in FIG. 1, the concentration of inert gas increases by causing the temperature of exhaust to be recirculated to decline using the EGR coolers 43 and 48, whereby the Inert-EGR amount can be increased. In addition, the Inert-EGR amount can be increased also by recirculating exhaust for which thermal energy has been lost and the temperature has declined from driving the turbines 51 and 56, for example, via the low-pressure EGR channel 46.

Herein, it is considered to perform feedback control of the Inert-EGR amount to the exhaust purification system 2 of FIG. 1 so that the NOx concentration, HC concentration and soot concentration of the exhaust become optimal. In this case, although it is necessary to detect the Inert-EGR amount aspirated into the cylinders in each combustion cycle, a sensor that can detect the Inert-EGR amount in the cylinders with the required precision and having the durability to be able to endure use under the actual operating conditions of an engine does not exist. As a result, it is necessary to estimate based on the aforementioned intake air pressure P2, exhaust pressures P3 and P3L and other physical quantities indicating the state of the exhaust purification system 2.

Conventionally, in a case of estimating a physical quantity, a physical model reproducing the behavior of this physical quantity is developed, and an arithmetic expression is used based on this model. However, in a case of estimating the Inert-EGR amount based on a physical model, there are the following such problems.

(1) First, the actual Inert-EGR amount exhibits behavior that is non-linear and difficult to predict. In particular, the behavior at transient times is complex, and developing a simple physical model that can reproduce such behavior with adequate precision is not easy.

(2) In addition, dealing with aging and variability in solids of the exhaust purification system 2 is difficult, even if it is assumed that such a physical model could be developed. Therefore, in a case of deposits having formed in the EGR valves and port portions, each intake shutter, and the like, the estimated value of the Inter-EGR amount will shift from the actual value, a result of which the exhaust purification performance may decline.

Hereinafter, the configuration of the control device of the exhaust purification system 2 made taking the above two such problems of (1) and (2) into account will be explained.

Figure 4:
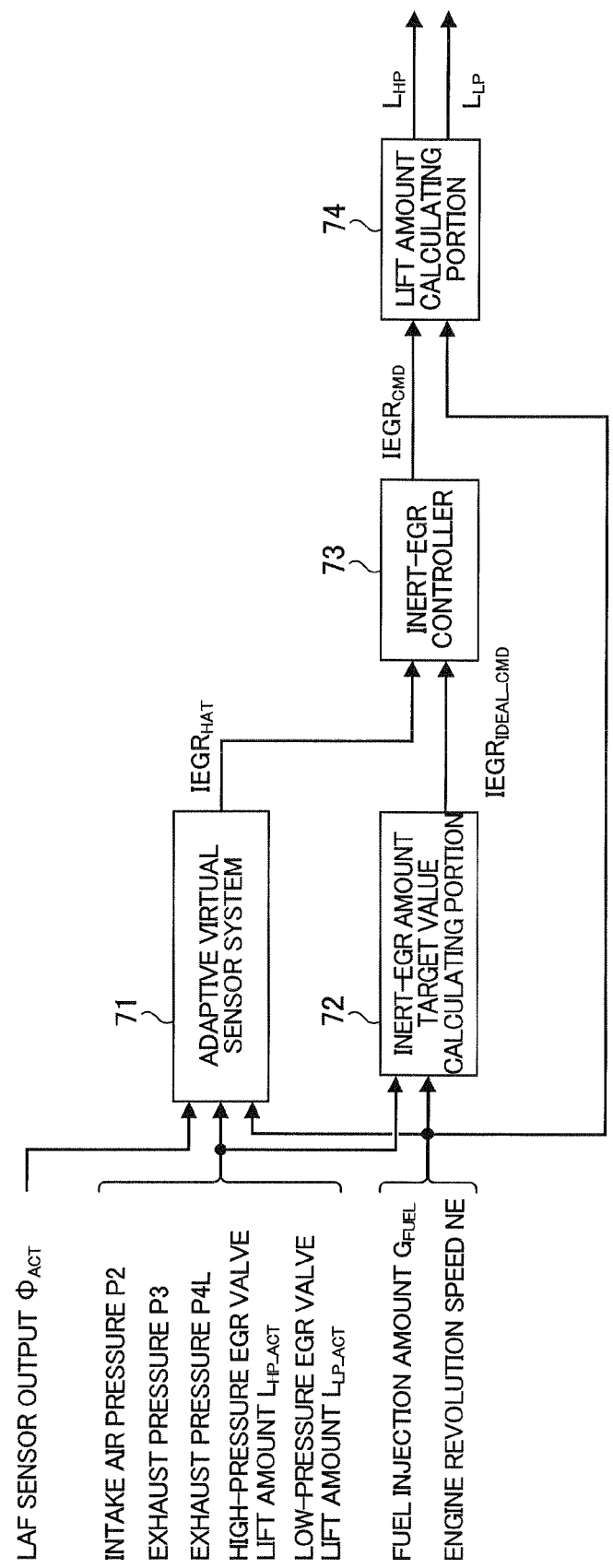
FIG. 4 is a block diagram showing a configuration of a control device of the exhaust purification system according to the embodiment.

FIG. 4 is a block diagram showing a configuration of the control device of the exhaust purification system 2. It should be noted that only the configuration of the exhaust purification system 2 relating to the feedback control of the Inert-EGR amount is illustrated in FIG. 4. More specifically, only the module configured by the ECU relating to determination of the lift amount $L_{HP}$ of the high-pressure EGR valve and the lift amount $L_{LP}$ of the low-pressure EGR valve are illustrated.

This module is configured to include an adaptive virtual sensor system 71, Inert-EGR amount target value calculating portion 72, Inert-EGR controller 73 and lift amount calculating portion 74.

The adaptive virtual sensor system 71 calculates an estimated value $IEGR_{HAT}$ of the Inert-EGR amount based on the detected values P2, P3, P3L, $\Phi_{ACT}$, $L_{HP\_ACT}$, $L_{LP\_ACT}$ of the plurality of sensors 24, 32, 33, 34, 13 and 14 respectively, as well as the fuel injection amount $G_{FUEL}$ and engine revolution speed NE. It should be noted that the detailed configuration of this adaptive virtual sensor system 71 will be explained later while referring to FIGS. 5 to 11.

The Inert-EGR amount target value calculating portion 72 calculates a target value $IEGR_{IDEAL\_CMD}$ of the Inert-EGR amount based on the detected values P2, P3, P3L, $\Phi_{ACT}$, $L_{HP\_ACT}$, $L_{LP\_ACT}$ of the plurality of sensors 24, 32, 33, 34, 13 and 14, respectively, as well as the fuel injection amount $G_{FUEL}$ and engine revolution speed NE. Herein, the target value $IEGR_{IDEAL\_CMD}$ of the Inert-EGR amount is determined based on a map established in advance so as to decrease along with the concentrations of NOx, HC and soot in exhaust, as mentioned above.

The lift amount calculating portion 74 is provided with a map in which the high-pressure EGR valve lift amount $L_{HP}$ and low-pressure EGR valve lift amount $L_{LP}$ are set relative to the target value of the Inert-EGR amount, as well as the engine revolution speed NE and fuel injection amount $G_{FUEL}$, and determines the valve lift amounts $L_{HP}$ and $L_{LP}$ based on this map.

The Inert-EGR controller 73 corrects the input to the aforementioned map of the lift amount calculating portion 74 so that deviation $E_{IE}$ (refer to the following formula (1)) between the estimated value $IEGR_{HAT}$ of the Inert-EGR amount and the target value $IEGR_{IDEAL\_CMD}$ of the Inert-EGR amount becomes "0". More specifically, the corrected target value IEGR$_{CMD}$ for the target value IEGR$_{IDEAL\_CMD}$ of the Inert-EGR amount is calculated based on a response specific control algorithm such as that shown below. In the present embodiment, the corrected target value IEGR$_{CMD}$ is calculated based on a response specific control algorithm such as that shown below.

$$E_{IE}(k)=\text{IEGR}_{HAT}(k)-\text{IEGR}_{IDEAL\_CMD}(k) \quad (1)$$

Herein, the notation (k) is a notation expressing discretized time, and indicates being data detected or calculated every predetermined control cycle. In other words, in a case of the symbol (k) being data detected or calculated in a current control timing, the notation (k−1) indicates being data detected or calculated in a previous control timing. It should be noted that the notation (k) is omitted as appropriate in the following explanation.

First, as shown in the following formula (2), the sum of the product of a conversion function setting parameter POLE$_{IE}$ and deviation E$_{IE}$(k−1) of a previous control timing, and the deviation E$_{IE}$(k) of a previous control timing is calculated, and this is defined as a conversion function σ$_{IE}$(k). It should be noted that, for the conversion function setting parameter POLE$_{IE}$, a parameter set between −1 and 0 based on a predetermined setting table is used.

$$\sigma_{IE}(k)=E_{IE}(k)+\text{POLE}_{IE}(k)E_{IE}(k-1) \quad (2)$$

Next, based on the conversion function σ$_{IE}$(k), a reaching-law input U$_{RCH\_IE}$(k) and adaptive-law input U$_{ADP\_IE}$(k) are calculated. More specifically, the reaching-law input U$_{RCH\_IE}$(k) is an input for placing a deviation condition amount on the conversion line, and is calculated by multiplying a predetermined reaching-law control gain K$_{RCH\_IE}$ by the conversion function σ$_{IE}$(k), as shown in the following formula (3).

$$U_{RCH\_IE}(k)=K_{RCH\_IE}\sigma_{IE}(k) \quad (3)$$

The adaptive-law input U$_{ADP\_IE}$(k) suppresses the influences of modeling error and noise, is an input for placing the deviation condition amount on the conversion line, and is calculated as the sum of the adaptive-law input during a previous control U$_{UDP\_IE}$(k−1) and the product of the conversion function σ$_{IE}$(k) and a predetermined adaptive-law gain K$_{ADP\_IE}$, as shown in the following formula (4).

$$U_{ADP\_IE}(k)=U_{ADP\_IE}(k-1)+K_{ADP\_IE}\sigma_{IE}(k) \quad (4)$$

Then, as shown in the following formula (5), the sum of this U$_{RCH}$(k) and U$_{ADP}$(k) is calculated, and this is defined as the correction factor KEGR(k).

$$\text{KEGR}(k)=U_{IE}(k)=1+U_{RCH\_IE}(k)+U_{ADP\_IE}(k) \quad (5)$$

Furthermore, as shown in the following formula (6), a corrected target value IEGR$_{IDEAL\_CMD}$(k) of the Inert-EGR amount is calculated by multiplying the correction factor KEGR(k) thus calculated by the target value IEGR$_{IDEAL\_CMD}$ of the Inert-EGR amount.

$$\text{IEGR}_{CMD}(k)=\text{KEGR}(k)\text{IEGR}_{IDEAL\_CMD}(k) \quad (6)$$

By configuring in the above such way, the high-pressure EGR valve lift amount L$_{HP}$ and low-pressure EGR valve lift amount L$_{LP}$ are determined so that the estimated value IEGR$_{HAT}$ of the Inert-EGR amount matches the target value IEGR$_{IDEAL\_CMD}$.

Hereinafter, the configuration of the adaptive virtual sensor system 71 will be explained in detail while referring to FIGS. 5 to 11.

Figure 5:
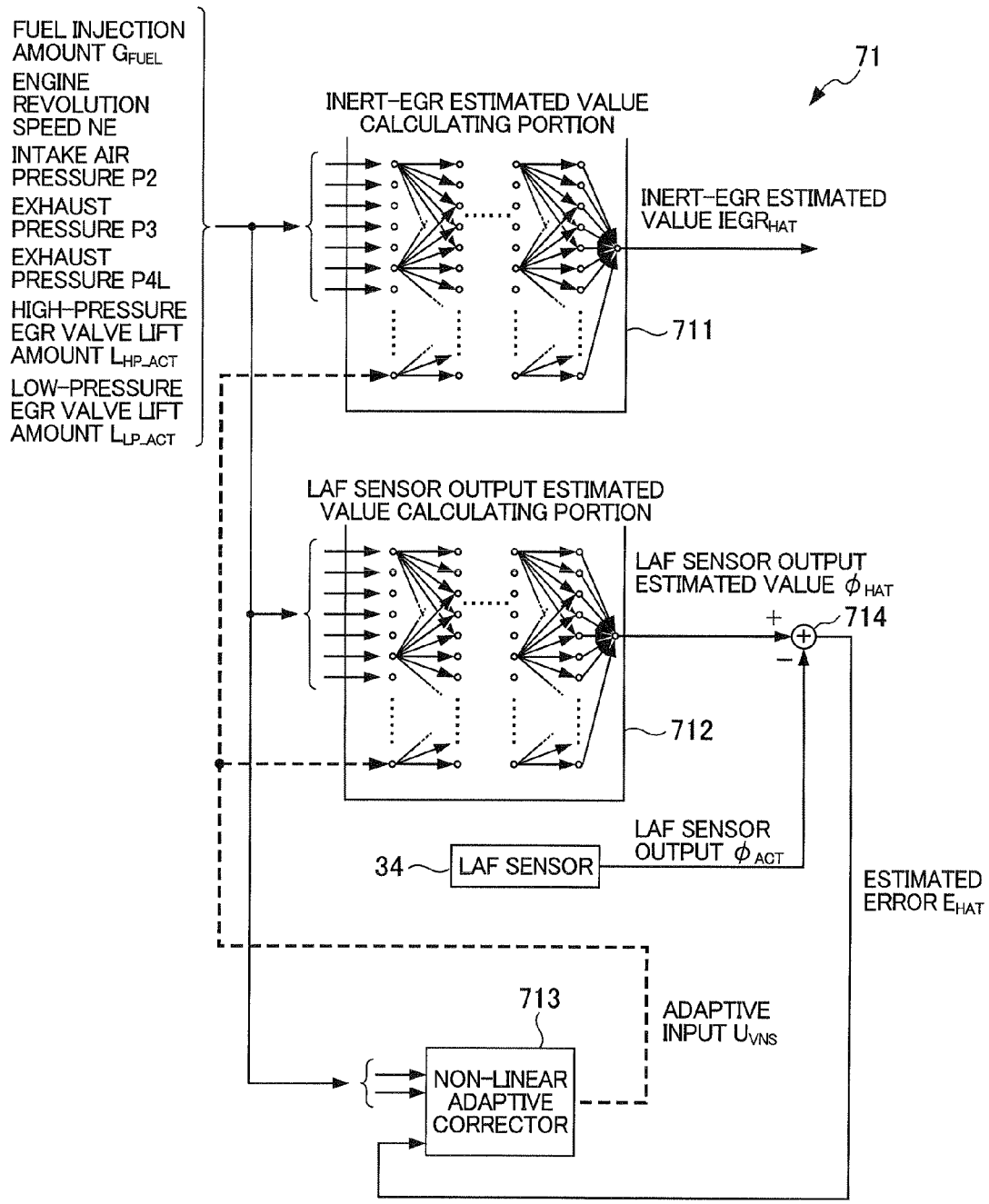
FIG. 5 is a block diagram showing a configuration of an adaptive virtual sensor system according to the embodiment.

FIG. 5 is a block diagram showing the configuration of the adaptive virtual sensor system 71.

The adaptive virtual sensor system 71 is configured to include an Inert-EGR estimated value calculating portion 711 that calculates the estimated value IEGR$_{HAT}$ of the Inert-EGR amount, an LAF sensor output estimated value calculating portion 712 that calculates the estimated value Φ$_{HAT}$ for the output (exhaust air/fuel ratio) of the LAF sensor 34, and a non-linear adaptive corrector 713 that calculates the adaptive input U$_{VNS}$.

Figure 6:
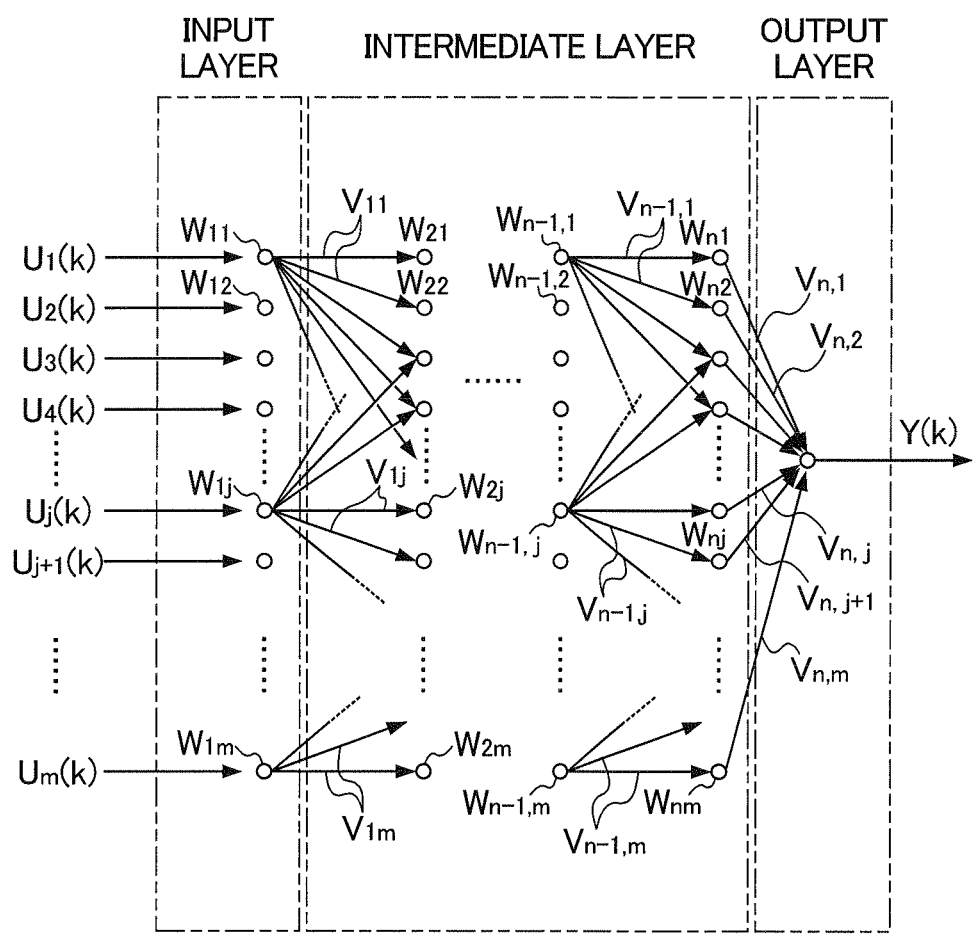
FIG. 6 is an illustration showing a neural network structure of an Inert-EGR estimated value calculating portion according to the embodiment.

In order to solve the aforementioned problem (1), the Inert-EGR estimated value calculating portion 711 calculates the estimated value IEGR$_{HAT}$ of the Inert-EGR amount using a neural network that excels in reproducibility of non-linear dynamic characteristics, as shown in FIG. 5 and FIG. 6 described later.

In addition, with this adaptive virtual sensor system 71, in order to solve the aforementioned problem (2), i.e. in order to handle degradation and variability in solids of the exhaust purification system, the estimated value Φ$_{HAT}$ of the exhaust air/fuel ratio, which is a physical quantity separate from the Inert-EGR amount and a physical quantity correlated to the Inert-EGR amount, is calculated by the LAF sensor output estimated value calculating portion 712, which has a neural network structure similar to the Inert-EGR estimated value calculating portion 711.

Furthermore, as shown in the following formula (7), the estimated error E$_{HAT}$(k) between the estimated value Φ$_{HAT}$(k) of the exhaust air/fuel ratio thus calculated and the detected value Φ$_{ACT}$(k) of the LAF sensor 34 is calculated by an adder 714.

$$E_{HAT}(k)=\Phi_{HAT}(k)-\Phi_{ACT}(k) \quad (7)$$

Moreover, with the non-linear adaptive corrector 713, as described in detail referring to FIGS. 8 to 11 later, the adaptive input U$_{VNS}$ to be commonly input to the Inert-EGR estimated value calculating portion 711 and the LAF sensor output estimated value calculating portion 712 is calculated so that the estimated error E$_{HAT}$ thus calculated is minimized.

This adaptive input U$_{VNS}$ is set between "0" and "1", for example, and is an input to be set during the learning of the neural networks in the Inert-EGR estimated value calculating portion 711 and LAF sensor output estimated value calculating portion 712, as a value indicating the shift from a reference article due to degradation and variability in solids of the exhaust purification system, as described in detail later.

In other words, with this adaptive virtual sensor system 71, the deviation in the estimated value of the Inert-EGR amount arising from degradation and variability in solids of the exhaust purification system is intuitively detected indirectly from the estimated error E$_{HAT}$ of a physical quantity correlated to the Inert-EGR amount. Then, the adaptive input U$_{VNS}$ prepared in advance as an input indicating the shift from the reference article is calculated so that this error is minimized, and this adaptive input U$_{VNS}$ is input to the Inert-EGR estimated value calculating portion 711 and LAF sensor output estimated value calculating portion 712. It is thereby possible to realize an adaptive characteristic relative to the degradation and variability in solids of the exhaust purification system in the neural network structures of the Inert-EGR estimated value calculating portion 711 and LAF sensor output estimated value calculating portion 712.

Herein, the relationship between the Inert-EGR amount and exhaust air/fuel ratio in the adaptive virtual sensor system 71 of the present embodiment will be explained. With this adaptive virtual sensor system 71, what is required as an output is the estimated value IEGR$_{HAT}$ of the Inert-EGR amount. In contrast, the estimated value Φ$_{HAT}$ of the Inert-EGR amount is supplementarily calculated in order to solve the aforementioned problem (2) and reduce the error between the estimated value $IEGR_{HAT}$ of the Inert-EGR amount and the true value.

In other words, in a case of the exhaust purification system degrading and variability in solids occurring, it is preferable for the influence exerted on the Inert-EGR amount and the influence exerted on the physical quantity supplementarily detected to be substantially equal.

Therefore, as such a supplementarily detected physical quantity, it is preferable for there to be the aforementioned such correlation with the physical quantity needed to estimate in the aforementioned way, and to be a physical quantity that can usually be detected by a sensor. So long as being a physical quantity satisfying such conditions, the physical quantity supplementarily detected is not limited to the exhaust air/fuel ratio.

Hereinafter, the configurations of the Inert-EGR estimated value calculating portion 711, LAF sensor output estimated value calculating portion 712, and non-linear adaptive corrector 713 will be explained in order.

Inert-EGR Estimated Value Calculating Portion

FIG. 6 is an illustration showing the neural network structure of the Inert-EGR estimated value calculating portion 711.

This neural network is configured by joining a plurality of neurons that output according to predetermined functions, and outputs a value Y(k) depending on an input vector U(k) of an m component. As shown in FIG. 6, this neural network is of hierarchical type configured to include the three layers of an input layer configured by m number of neurons $W_{1j}$ (j=1 to m), an intermediate layer configured by m×(n−1) number of neurons $W_{ij}$ (i=2 to n, j=1 to m), and an output layer configured by one neuron Y.

Input layer: $W_{1j}$ (j=1, 2, . . . m)
Intermediate layer: $W_{ij}$ (i=2, 3, . . . n, j=1, 2, . . . m)
Output layer: Y Operations of the m number of neurons $W_{1j}$ (j=1 to m) of the input layer will be explained.

A signal $T_{1j}(k)$ is input to the neurons $W_{1j}$ of the input layer. The $j^{th}$ component U(k) of the input vector U(k) is used in this input signal $T_{1j}(k)$, respectively, as shown in the following formula (8).

$$T_{1j}(k)=U_j(k) \; (j=1,2,\ldots,m) \tag{8}$$

The neurons $W_{1j}$ of the input layer are joined by a predetermined weight to the m number of neurons $W_{2j}$ (j=1 to m) of the intermediate layer, and output signals $V_{1j}(k)$ to these m number of joined neurons $W_{2j}$. In other words, this neuron outputs the signal $V_{1j}(k)$ depending on the input signal $T_{1j}(k)$, according to a sigmoidal function f(x), as shown in the following formulas (9) and (10).

$$V_{1j}(k) = f(T_{1j}(k)) \; (j=1,2,\ldots,m) \tag{9}$$

$$f(x) = \frac{1}{1+\exp(-\beta x)} + \varepsilon \tag{10}$$

Figure 7:
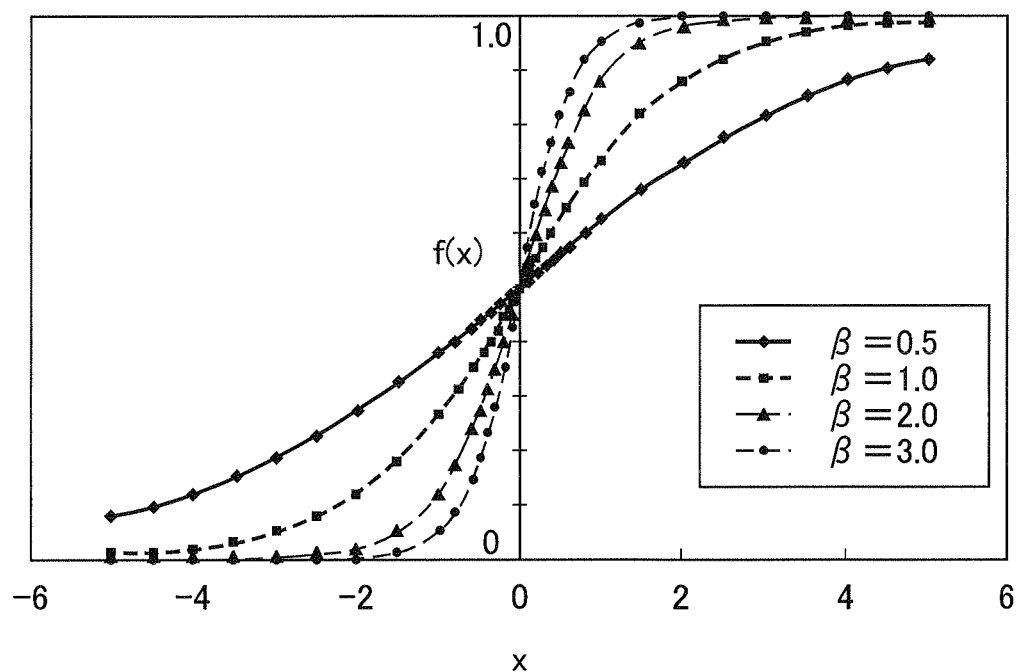
FIG. 7 is a graph showing a sigmoidal function according to the embodiment.

FIG. 7 is a graph showing the sigmoidal function f(x). In FIG. 7, cases are shown in which $\epsilon=0$ and $\beta=0.5, 1.0, 2.0$ and $3.0$ in the above formula (10).

The codomain of the sigmoidal function f(x) becomes ($\epsilon$, $\epsilon$+1). In addition, as shown in FIG. 7, the sigmoidal function f(x) approximates a step function centered around x=0 as $\beta$ is increased.

In the above formula (10), the coefficient $\beta$ indicates the slope gain of the sigmoidal function f(x), and the coefficient $\epsilon$ indicates the offset value of the sigmoidal function f(x). The slope gain $\beta$ is set by the learning of the neural network described later. The offset value $\epsilon$ is set by the learning of the neural network described layer, or to a predetermined value.

Next, operations of the (n−1)×m number of neurons $W_{ij}$ (i=2 to n, j=1 to m) of the intermediate layer will be explained.

The sum of signals arrived at by multiplying predetermined weights $\omega_{i-1,j}$ (j=1 to m) by m number of signals $V_{i-1,j}$ (j=1 to m) output from the joined neurons, respectively, is input to the neurons $W_{ij}$ (i=2 to n, j=1 to m) of the intermediate layer. Therefore, signals $T_{ij}(k)$ such as that shown in the following formula (11) are input to the neurons $W_{ij}$ of the intermediate layer.

$$T_{ij}(k) = \sum_{k=1}^{m} \omega_{i-1,k}(k) V_{i-1,k}(k) \tag{11}$$

$$(i=2,3,\ldots,n, \; j=1,2,\ldots,m)$$

Among the neurons of the intermediate layer, the neurons except for the m number joined to the output layer, i.e. (n−2)×m number of neurons $W_{ij}$ (i=2 to n−1, j=1 to m), join by a weight $\omega_{ij}$ to the m number of neurons $W_{i+1,j}$ (j=1 to m) of the intermediate layer, and output signals $V_{ij}(k)$ to these joined neurons $W_{i+1,j}$. In other words, this neuron $W_{ij}$ (i=2 to n−1, j=1 to m) outputs a signal $V_{ij}(k)$ depending on the input signal $T_{ij}(k)$ to the m number of neurons $W_{i+1,j}$, according to the sigmoidal function f(x), as shown in the following formula (12).

$$V_{ij}(k)=f(T_{ij}(k)) \; (j=1,2,\ldots,m) \tag{12}$$

In addition, the m number of neurons $W_{nj}$ (j=1 to m) of the intermediate layer join by the weight $\omega_{nj}$ to the neuron Y of the output layer, and output a signal $V_{nj}(k)$ to this neuron Y of the output layer. In other words, these neurons $W_{nj}$ (j=1 to m) output a signal $V_{nj}(k)$ depending on the input signal $T_{nj}(k)$ to the neuron Y, according to the sigmoidal function f(x), as shown in the following formula (13).

$$V_{nj}(k)=f(T_{ij}(k)) \; (j=1,2,\ldots,m) \tag{13}$$

Next, operations of the neuron Y of the output layer will be explained.

The sum of signals arrived at by multiplying predetermined weights $\omega_{nj}$ (j=1 to m) by the m number of signals $V_{nj}$ (j=1 to m) output from the joined neurons of the intermediate layer is output to the neuron Y of the output layer. Therefore, a signal T(k) such as that shown in the following formula (14) is input to the neuron Y of the output layer.

$$T(k) = \sum_{k=1}^{m} \omega_{n,k}(k) V_{n,k}(k) \tag{14}$$

The neuron Y of the output layer outputs a signal Y(k) depending on the input signal T(k), according to a sigmoidal function g(x), as shown in the following formulas (15) and (16).

$$Y(k) = g(T(k)) \tag{15}$$

$$g(x) = \frac{\alpha}{1+\exp(-\gamma x)} + \delta \tag{16}$$

The sigmoidal function g(x) shows qualitatively the same behavior as the aforementioned function f(x) shown in FIG. 7; however, it differs from the sigmoidal function f(x) in the aspect of the codomain being ($\delta$, $\delta+\alpha$). In the above formula (16), the coefficient $\gamma$ indicates the slope gain of the sigmoidal function g(x), and the coefficient $\delta$ indicates the offset value of the sigmoidal function g(x). In addition, the coefficient $\alpha$ indicates the output gain for setting the available degrees of freedom of the output of the neural network. The slope gain $\gamma$ and output gain $\alpha$ are set by the learning of the neural network described later. The offset value $\delta$ is set by the learning of the neural network described later or set to a predetermined value.

Next, the learning of the neural network for estimating the Inert-EGR amount will be explained.

First, components of the input vector U(k) to the neural network are defined as shown in the following formula (17). In this way, the components of the input vector U(k) include a plurality of physical quantities required for estimating the Inert-EGR amount (fuel injection amount $G_{FUEL}$, intake air pressure P2, exhaust pressure P3, exhaust pressure P3L, detected value $L_{HP\_ACT}$ of high-pressure EGR valve lift amount, detected value $L_{LP\_ACT}$ of low-pressure EGR valve lift amount, and engine revolution speed NE), and the aforementioned adaptive input $U_{VNS}$. In addition, data related to such a variety of different physical quantities are included, as well as data related to physical quantities at different times are included in the components of the input vector.

$$U(k) = \begin{pmatrix} G_{FUEL}(k) \\ G_{FUEL}(k-1) \\ G_{FUEL}(k-2) \\ P2(k) \\ P2(k-1) \\ P3(k) \\ P3(k-1) \\ P4L(k) \\ P4L(k-1) \\ L_{LP\_ACT}(k) \\ L_{LP\_ACT}(k-1) \\ L_{HP\_ACT}(k) \\ L_{HP\_ACT}(k-1) \\ NE(k) \\ NE(k-1) \\ NE(k-2) \\ U_{VNS}(k-1) \end{pmatrix} \quad (17)$$

Moreover, the output Y(k) of the neural network relative to such an input vector U(k) is defined as the estimated value $IEGR_{HAT}(k)$ of the Inert-EGR amount, as shown in the following formula (18).

$$IEGR_{HAT}(k) = Y(k) \quad (18)$$

Next, a sensor that can actually detect the Inert-EGR amount, and at least two classes of exhaust purification systems of different states are prepared. One is an exhaust purification system of a new article serving as a reference (hereinafter referred to simply as "reference article"), and the other one is an exhaust purification system having properties greatly differing from the reference article due to reasons such as variability in solids and degradation (hereinafter referred to simply as "degraded article"). Then, the relationships between the components ($G_{FUEL}$, P2, P3, P3L, $L_{HP\_ACT}$, $L_{LP\_ACT}$, NE) of the input vector U of the above formula (17) and the detected value of the Inert-EGR amount detected by the aforementioned sensor are recorded, by actually operating an exhaust purification system prepared. It should be noted that the data showing the relationship between the components of this input vector and the detected value of the Inert-EGR amount is acquired for every exhaust purification system of a different state prepared.

Next, learning of the neural network is performed based on the data acquired. In other words, the various gains ($\alpha$, $\beta$, $\gamma$, $\delta$, $\epsilon$) of the functions f(x) and g(x) of the neurons are set, as well as the weights $\omega_{ij}$ (i=1 to n, j=1 to m) indicating the strength of the connection of each neuron, so that the relationships between the components ($G_{FUEL}$, P2, P3, P3L, $L_{HP\_ACT}$, $L_{LP\_ACT}$, NE) of the input vector U and the detected value of the Inert-EGR amount are reproduced by the neural network. It should be noted that a well-known method is used in the algorithm of learning of the neural network. More specifically, in addition to a learning algorithm such as back propagation method, for example, an optimized algorithm such as a genetic algorithm can be exemplified.

Herein, the setting of the adaptive input $U_{VNS}$ when performing the aforementioned such learning will be explained. For example, a case of preparing the two articles of the reference article and degraded article as exhaust purification systems for acquiring data will be explained. First, when performing learning based on data of the reference article, the adaptive input $U_{VNS}$ is set to "1". In addition, when performing learning based on data of the degraded article, the adaptive input $U_{VNS}$ is set to "0".

Reference article: adaptive input $U_{VNS}\leftarrow 1$

Degraded article: adaptive input $U_{VNS}\leftarrow 0$

By performing learning of the neural network using the input vector U including the adaptive input $U_{VNS}$ set in the above such way, in a case of causing the adaptive input $U_{VNS}$ to continuously change between "0" and "1", it is possible to cause the estimated value $IEGR_{HAT}$ of the Inert-EGR amount and the estimated value $\Phi_{HAT}$ of the output of the LAF sensor to continuously change from the reference article to the degraded article.

By performing learning of the neural network upon setting the adaptive input $U_{VNS}$ in the above way, it is possible to construct an adaptive virtual sensor system for which the adaptive characteristic relative to degradation and variability in solids of the exhaust purification system is realized.

In addition, in a case of preparing an exhaust purification system having an intermediate characteristic between the reference article and the degraded article, for example, learning of the neural network is performed upon setting the adaptive input $U_{VNS}$ to values between "1" and "0", e.g., to values such as "0.3" and "0.6". It is thereby possible to more realistically realize an adaptive characteristic to the degradation and variability in solids of the exhaust purification system.

LAF Sensor Output Estimated Value Calculating Portion

Referring back to FIG. 5, the configuration of the LAF sensor output estimated value calculating portion 712 will be explained.

Similarly to the Inert-EGR estimated value calculating portion 711, the LAF sensor output estimated value calculating portion 712 calculates an estimated value $\Phi_{HAT}$ of the output of the LAF sensor 34 by way of a neural network. It should be noted that the neural network structure of the LAF sensor output estimated value calculating portion 712 is substantially the same as the neural network structure of the Inert-EGR estimated value calculating portion 711 described in detail referring to FIGS. 6 and 7, and thus a detailed explanation thereof will be omitted.

In addition, the components of the input vector U are defined similarly to the above formula (17) as well. In other words, the components of the input vector U include a plurality of physical quantities required for estimating the exhaust air/fuel ratio (fuel injection amount $G_{FUEL}$, intake air pressure P2, exhaust pressure P3, exhaust pressure P3L, detected value $L_{HP\_ACT}$ of high-pressure EGR valve lift amount, detected value $L_{LP\_ACT}$ of low-pressure EGR valve lift amount, and engine revolution speed NE), and the adaptive input $U_{VNS}$. It should be noted that, although the same input vector U as the Inert-EGR estimated value calculating portion is used in the present embodiment as the input vector U to the neural network of the LAF sensor output estimated value calculating portion, it is not limited thereto. It may be configured so that different physical quantities are included in the components of these input vectors; however, the adaptive input $U_{VNS}$ uses common components.

Furthermore, as shown in the following formula (19), an output Y(k) of the neural network is defined as an estimated value $\Phi_{HAT}(k)$ for the output of the LAF sensor.

$$\Phi_{HAT}(k) = Y(k) \tag{19}$$

In addition, learning in to the neural network is also performed by a similar sequence to the neural network of the Inert-EGR estimated value calculating portion 711. Therefore, a detailed explanation thereof will be omitted.

Similarly to the aforementioned Inert-EGR estimated value calculating portion 711, it is thereby possible to configure an adaptive virtual sensor system for which an adaptive characteristic to degradation and variability in solids of the exhaust purification system is realized.

Non-Linear Adaptive Corrector

Next, the configuration of the non-linear adaptive corrector 713 will be explained while referring to FIGS. 8 to 11.

Figure 8:
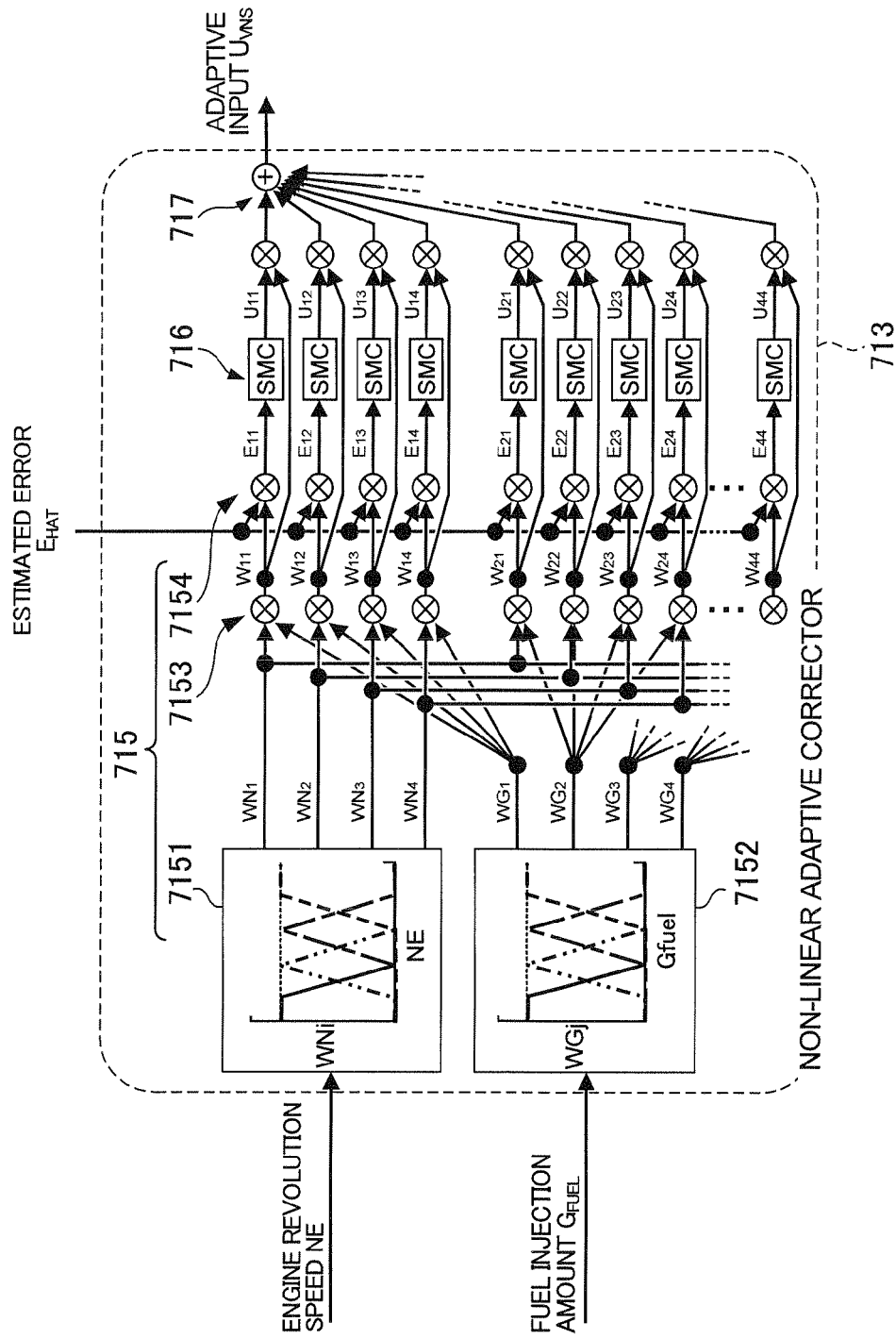
FIG. 8 is a block diagram showing a configuration of a non-linear adaptive corrector according to the embodiment.

FIG. 8 is a block diagram showing the configuration of the non-linear adaptive corrector 713.

The non-linear adaptive corrector 713 includes a weighting function setting portion 715, local adaptive input calculating portion 716, and adaptation coefficient calculating portion 717. The non-linear adaptive corrector 713 calculates the adaptive input $U_{VNS}$ so that the estimated error $E_{HAT}$ is minimized by such a configuration.

More specifically, with this non-linear adaptive corrector 713, a space with two reference parameters (engine revolution speed NE and fuel injection amount $G_{FUEL}$) as the base is defined, and this space is divided into a plurality of regions. Furthermore, the adaptive input $U_{VNS}$ is calculated by calculating a local adaptive input $U_{ij}$ (i=1 to 4, j=1 to 4) described later for every region, and weighted coupling these local adaptive inputs U by weighting functions W (i=1 to 4, j=1 to 4) described later.

However, the influence that aging degradation and variability in solids of the exhaust purification system exerts on the error in the estimated values of the inert-EGR amount and exhaust air/fuel ratio is considered to differ at every operating condition of the engine, i.e. value of the reference parameters. With this non-linear adaptive corrector 713, it is possible to calculate the adaptive input $U_{VNS}$ taking account of the aforementioned influences on error differing at every value of reference parameter, by calculating the local adaptive inputs $U_{ij}$ in every region within the space with the reference parameters as the base.

Figure 9:
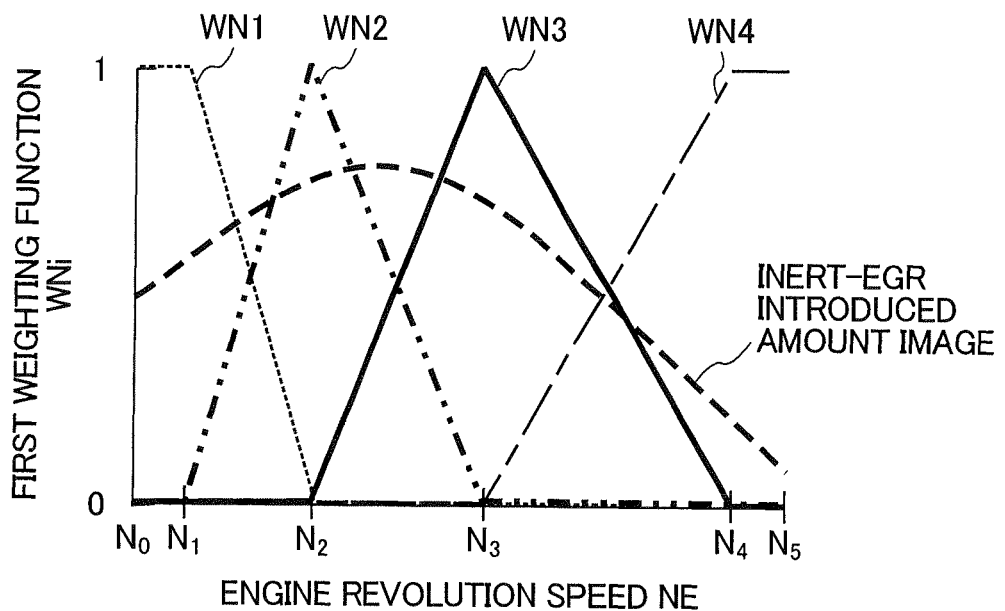
FIG. 9 is a graph showing four first weighting functions with the engine revolution speed as the domain according to the embodiment.

FIG. 9 is a graph showing four first weighting functions $WN_i$ (i=1 to 4) with the engine revolution speed NE as the domain. As shown in FIG. 9, the four first weighting functions $WN_i$ are set so as to define four regions overlapping each other in the domain, and to have values that are not "0" in these regions, respectively.

More specifically, the domain is divided into $(N_0, N_2)$, a second region $(N_1, N_3)$, a third region $(N_2, N_4)$, and a fourth region $(N_3, N_5)$. Herein, the relationship is defined $N_0 < N_1 < N_2 < N_3 < N_4 < N_5$, as shown in FIG. 9. Therefore, the first region and the second region overlap in the segment $(N_1, N_2)$, the second region and the third region overlap in the segment $(N_2, N_3)$, and the third region and the fourth region overlap in the segment $(N_3, N_4)$.

A function $WN_1$ is set so as to have a value that is not "0" in the first region $(N_0, N_2)$. More specifically, the function $WN_1$ is set to "1" in the segment $(N_0, N_1)$, and is set so as to decrease from "1" to "0" in the segment $(N_1, N_2)$.

A function $WN_2$ is set so as to have a value that is not "0" in the second region $(N_1, N_3)$. More specifically, the function $WN_2$ is set so as to increase from "1" to "0" in the segment $(N_1, N_2)$, and is set so as to decrease from "1" to "0" in the segment $(N_2, N_3)$. Therefore, the function $WN_1$ and the function $WN_2$ intersect in the center of the segment $(N_1, N_2)$.

A function $WN_3$ is set so as to have a value that is not "0" in the third region $(N_2, N_4)$. More specifically, the function $WN_3$ is set so as to increase from "1" to "0" in the segment $(N_2, N_3)$, and is set so as to decrease from "1" to "0" in the segment $(N_3, N_4)$. Therefore, the function $WN_2$ and the function $WN_3$ intersect in the center of the segment $(N_2, N_3)$.

A function $WN_4$ is set so as to have a value that is not "0" in the fourth region $(N_3, N_5)$. More specifically, the function $WN_4$ is set so as to increase from "1" to "0" in the segment $(N_3, N_4)$, and is set to "1" in the segment $(N_4, N_5)$. Therefore, the function $WN_3$ and the function $WN_4$ intersect in the center of the segment $(N_3, N_4)$.

In addition, the qualitative behavior of the Inert-EGR amount relative to engine revolution speed NE is represented by a dotted line in FIG. 9. As shown in this figure, there is a tendency for the Inert-EGR amount at low revolution speed to be larger than the Inert-EGR amount at high revolution speed. Therefore, in the present embodiment, the segment $(N_1, N_2)$ is set so as to be narrower than the segment $(N_3, N_4)$, in accordance with such a non-linear nature of the Inert-EGR amount.

In addition, for the first weighting functions $WN_i$ configured in the above way, the sum total function thereof is normalized so as to become "1" irrespective of the engine revolution speed NE, as shown in the following formula (20).

$$\sum_{i=1}^{4} WN_i = 1 \tag{20}$$

Figure 10:
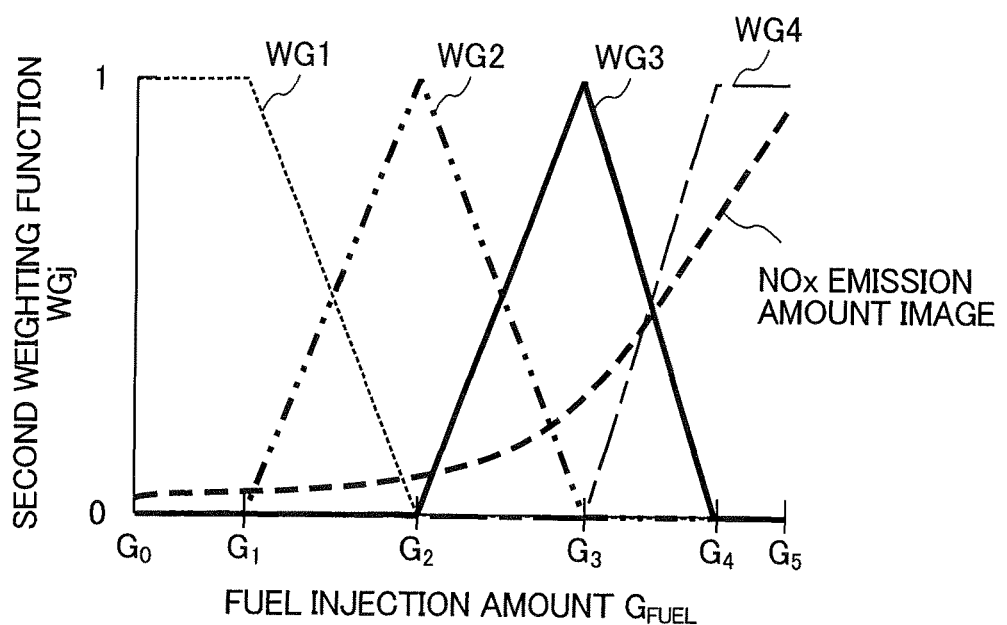
FIG. 10 is a graph showing four second weighting functions with the fuel injection amount as the domain according to the embodiment.

FIG. 10 is a graph showing four second weighting functions $WG_j$ (j=1 to 4) with the fuel injection amount $G_{FUEL}$ as the domain.

As shown in FIG. 10, the four second weighting functions $WG_j$ are set so as to define four regions overlapping each other in the domain, and to have values that are not "0" in these regions, respectively.

More specifically, the domain is divided into $(G_0, G_2)$, a second region $(G_1, G_3)$, a third region $(G_2, G_4)$, and a fourth region $(G_3, G_5)$. Herein, the relationship is defined $G_0 < G_1 < G_2 < G_3 < G_4 < G_5$, as shown in FIG. 10. Therefore, the first region and the second region overlap in the segment $(G_1, G_2)$, the second region and the third region overlap in the segment ($G_2$, $G_3$), and the third region and the fourth region overlap in the segment ($G_3$, $G_4$).

A function $WG_1$ is set so as to have a value that is not "0" in the first region ($G_0$, $G_2$). More specifically, the function $WG_1$ is set to "1" in the segment ($G_0$, $G_1$), and is set so as to decrease from "1" to "0" in the segment ($G_1$, $G_2$).

A function $WG_2$ is set so as to have a value that is not "0" in the second region ($G_1$, $G_3$). More specifically, the function $WG_2$ is set so as to increase from "1" to "0" in the segment ($G_1$, $G_2$), and is set so as to decrease from "1" to "0" in the segment ($G_2$, $G_3$). Therefore, the function $WG_1$ and the function $WG_2$ intersect in the center of the segment ($G_1$, $G_2$).

A function $WG_3$ is set so as to have a value that is not "0" in the third region ($G_2$, $G_4$). More specifically, the function $WG_3$ is set so as to increase from "1" to "0" in the segment ($G_2$, $G_3$), and is set to as to decrease from "1" to "0" in the segment ($G_3$, $G_4$). Therefore, the function $WG_2$ and the function $WG_3$ intersect in the center of the segment ($G_2$, $G_3$).

A function $WG_4$ is set so as to have a value that is not "0" in the fourth region ($G_3$, $G_5$). More specifically, the function $WG_4$ is set so as to increase from "1" to "0" in the segment ($G_3$, $G_4$), and is set to "1" in the segment ($G_4$, $G_5$). Therefore, the function $WG_3$ and the function $WG_4$ intersect in the center of the segment ($G_3$, $G_4$).

In addition, the qualitative behavior of the NOx emission amount of the engine relative to the fuel injection amount $G_{FUEL}$ is represented by a dotted line in FIG. 10. As shown in this figure, there is a tendency for the NOx emission amount to suddenly increase when the fuel injection amount exceeds a predetermined amount. Therefore, in the present embodiment, the segment ($G_3$, $G_4$) is set so as to be narrower than the segment ($G_1$, $G_2$), in accordance with such a non-linear nature of the NOx emission amount.

In addition, for the second weighting functions $WN_i$ configured in the above way, the sum total function thereof is normalized so as to become "1" irrespective of the fuel injection amount $G_{FUEL}$, as shown in the following formula (21).

$$\sum_{j=1}^{4} WG_j = 1 \tag{21}$$

Figure 11:
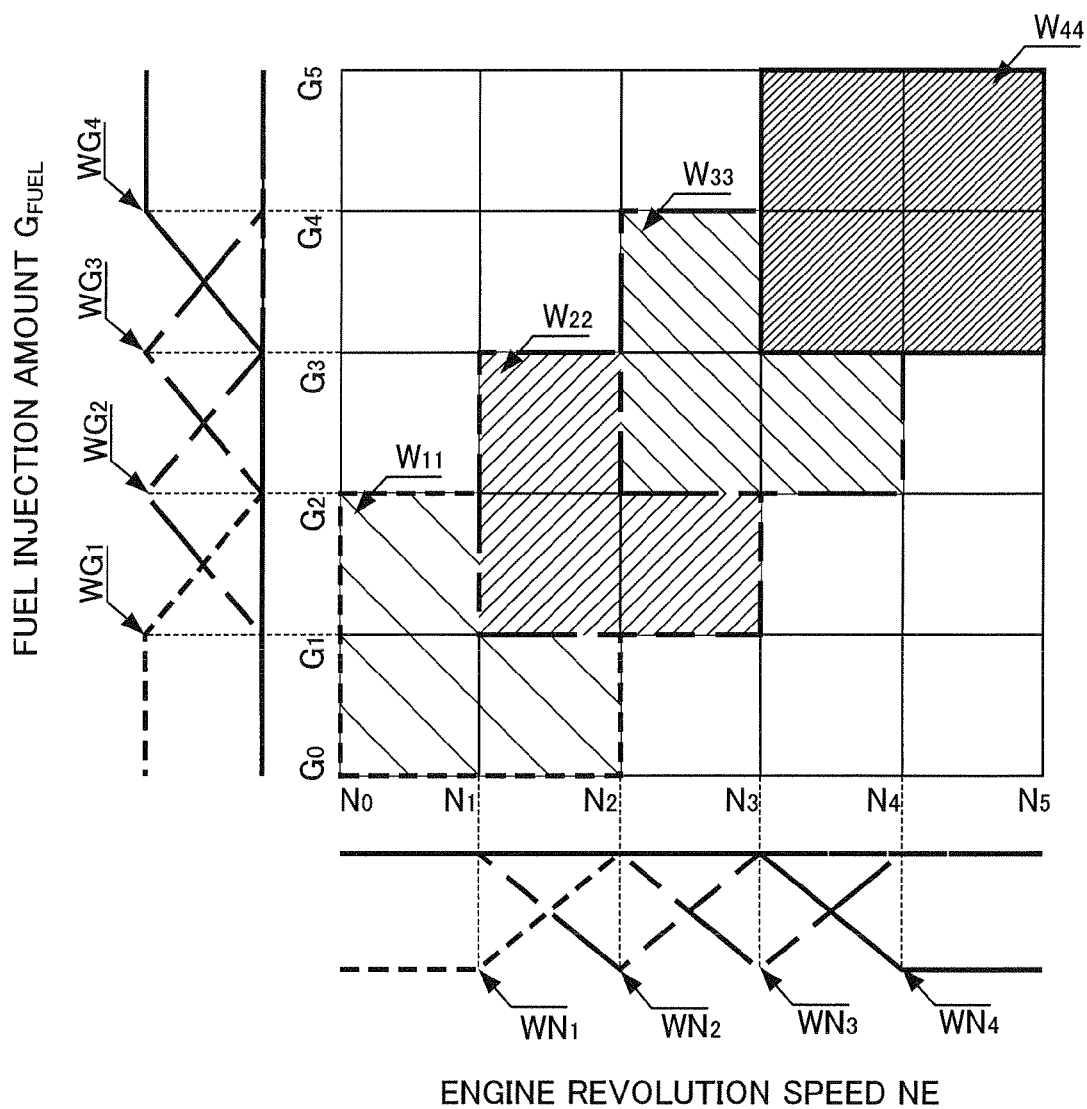
FIG. 11 is graph showing 16 weighting functions with two reference parameters as the domain according to the embodiment.

FIG. 11 is a graph showing sixteen weighting functions (i=1 to 4, j=1 to 4) with two reference parameters (NE, $G_{FUEL}$) as the domain. In FIG. 11, the horizontal axis represents the engine revolution speed NE, and the vertical axis represents the fuel injection amount $G_{FUEL}$. As shown in FIG. 11, sixteen regions overlapping each other are defined in the domain of the two reference parameters (NE, $G_{FUEL}$).

The sixteen weighting functions $W_{ij}$ are defined by the product of each component of the first weighting functions $WN_i$ and each component of the second weighting functions $WG_j$, as shown in the following formula (22). The weighting functions $W_{ij}$ having a value that is not "0" in the sixteen regions are thereby defined, respectively. It should be noted that only the four weighting functions $W_{11}$, $W_{22}$, $W_{33}$ and $W_{44}$ are illustrated in FIG. 11.

$$W_{ij} = WN_i WG_j \tag{22}$$

In addition, similarly to the above formulas (20) and (21), the sum total function of the weighting functions $W_{ij}$ is normalized so as to become "1" irrespective of the two reference parameters (NE, $G_{FUEL}$), as shown in the following formula (23).

$$\sum_{j=1}^{4} \sum_{i=1}^{4} W_{ij} = 1 \tag{23}$$

Referring back to FIG. 8, the weighting function setting portion 715 is configured to include a first weighting function calculating portion 7151 in which a plurality of the first weighting functions $WN_i$ is set, a second weighting function calculating portion 7152 in which a plurality of the second weighting functions $WG_j$ is set, a multiplier 7153 that calculates the weighting functions $W_{ij}$ based on these first weighting functions $WN_i$ and second weighting functions $WGj$, and a multiplier 7154 that weights the estimated error $E_{HAT}$ in every region.

The first weighting function calculating portion 7151 calculates values the $WN_i(k)$ of first weighting functions depending on the engine revolution speed $NE(k)$, by searching a control map such as that shown in FIG. 9.

The second weighting function calculating portion 7152 calculates values $WG_j(k)$ of the second weighting functions depending on the fuel injection amount $G_{FUEL}(k)$, by searching a control map such as that shown in FIG. 10.

The multiplier 7153 calculates values $W_{ij}(k)$ of the weighting functions by multiplying each component of the value $WN_i(k)$ of the first weighting function calculated by the first weighting function calculating portion 7151 with the value $WG_j(k)$ of the second weighting function, as shown in the following formula (24).

$$W_{ij}(k) = WN_i(k) WG_j(k) \tag{24}$$

The multiplier 7154 calculates a deviation signal $WEVNS_{ij}(k)$ weighted in every region, by multiplying each component of the value $W_{ij}(k)$ of the weighting function thus calculated by the estimated error $E_{HAT}(k)$, as shown in the following formula (25).

$$WEVNS_{ij}(k) = W_{ij}(k) E_{HAT}(k) \tag{25}$$

The local adaptive input calculating portion 716 calculates local adaptive inputs $U_{ij}$ (i=1 to 4, j=1 to 4) in every region so that the error signals $WEVNS_{ij}$ weighted in every region become "0".

In the present embodiment, the local adaptive inputs $U_{ij}$ are calculated according to a response specific control algorithm that can set a convergence rate of the error signals $WEVNS_{ij}$. This response specific control algorithm refers to the matter of a control algorithm that can specify both the convergence rate and the convergence behavior of deviation, based on a function specifying the convergence behavior of deviation.

The local adaptive input calculating portion 716 includes a plurality of sliding mode controllers configured to allow this respective specific control algorithm to be executed. Hereinafter, operations of these sliding mode controllers will be explained.

First, the sum of $WEVNS_{ij}(k)$ and the product of a conversion function setting parameter $POLE_v$ and the error signal $WEVNS_{ij}(k-1)$ of a previous control time is calculated, and this is defined as a conversion function $\sigma_{v\_ij}(k)$, as shown in the following formula (26). It should be noted that, for the conversion function setting parameter $POLE_v$, a value set between −1 and 0 is adopted based on a predetermined setting table.

$$\sigma_{v\_ij}(k) = WEVNS_{ij}(k) + POLE_v WEVNS_{ij}(k-1) \tag{26}$$

Next, based on the conversion function $\sigma_{v\_ij}(k)$, a reaching-law input $U_{RCH\_V\_ij}(k)$ and an adaptive-law input $U_{ADP\_V\_ij}(k)$ are calculated, the sum of this $U_{RCH}(k)$ and $U_{ADP}(k)$ is calculated as shown in the following formula (27), and this is defined as the local adaptive input $U_{ij}(k)$.

$$U_{V\_ij}(k) = U_{RCH\_V\_ij}(k) + U_{ADP\_V\_ij}(k) \qquad (27)$$

The reaching-law input $U_{RCH\_V\_ij}(k)$ is an input for placing the deviation condition amount on the conversion line, and is calculated by multiplying a predetermined reaching-law control gain $K_{RCH\_V}$ by the conversion function $\sigma_{V\_ij}(k)$, as shown in the following formula (28).

$$U_{RCH\_V\_ij}(k) = K_{RCH\_V} \sigma_{V\_ij}(k) \qquad (28)$$

The adaptive-law input $U_{ADP\_V\_ij}(k)$ suppresses the influences of modeling error and noise, is an input for placing the deviation condition amount on the conversion line, and is calculated as the sum of the adaptive-law input during a previous control $U_{ADP\_V\_ij}(k-1)$ and the product of the conversion function $\sigma_{V\_ij}(k)$ and a predetermined adaptive-law gain $K_{ADP\_V}$, as shown in the following formula (29).

$$U_{ADP\_V\_ij}(k) = U_{ADP\_V\_ij}(k-1) + K_{ADP\_V\_ij}(k) \qquad (29)$$

The adaptation coefficient calculating portion 717 calculates the adaptive input $U_{VNS}$ by adding "1" to the result of weight combining the local adaptive inputs $U_{ij}$ calculated in every region by the weighting functions $W_{ij}$. In other words, the adaptation coefficient calculating portion 717 calculates the adaptive input $U_{VNS}(k)$ by adding "1" to the sum total of the products of the local adaptive input $U_{ij}(k)$ and the values $W_{ij}$ of the weighting functions over the entire region (i=1 to 4, j=1 to 4), as shown in the following formula (30).

$$U_{VNS}(k) = 1 + \sum_{i=1}^{4} \sum_{j=1}^{4} W_{ij}(k) U_{ij}(k) \qquad (30)$$

Herein, the reason for adding "1" in the above formula (30) is because, upon setting the adaptive input $U_{VNS}=1$ as the condition of the reference article in the aforementioned way, the initial value of the adaptive-law input $U_{ADP\_V\_ij}$ is set to "0", and the initial value of the adaptive input $U_{VNS}$ is set to "1". It should be noted that, in a case of the initial value of the adaptive-law input $U_{ADP\_V\_ij}$ being set to "1", it is unnecessary to add "1" in the above formula (30). In addition, in the case of setting the initial value of the adaptive input $U_{VNS}$ to "0" indicating a degraded article, it is also unnecessary to add "1" in the above formula (30).

Moreover, the weighting functions $W_{ij}$ are calculated based on the product of functions $WN_i$ and $WG_j$ having values that are not "0" only in the respective regions; therefore, a region exists in which the value of the weighting functions becomes "0". Therefore, when computing the sum total over the entire region (i=1 to 4, j=1 to 4) in the above formula (30), computations relating to such regions in which the value $W_{ij}(k)$ of the weighting function becomes "0" may be excluded. It is thereby possible to reduce the computational load.

Next, the specific sequence of Inert-EGR amount control will be explained while referring to FIG. 12.

Figure 12:
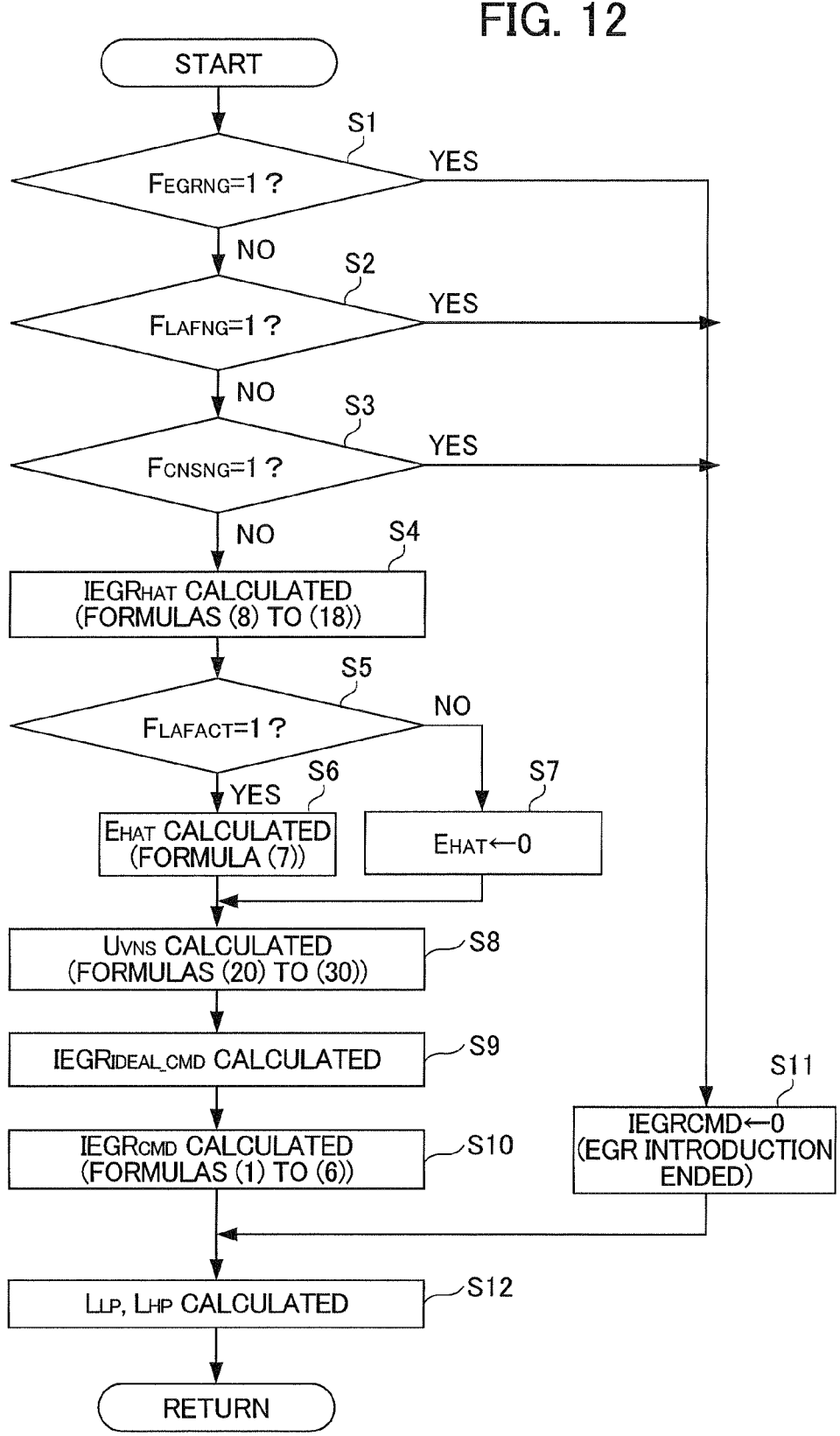
FIG. 12 is a flowchart showing a sequence of Inert-EGR amount control according to the embodiment.

FIG. 12 is a flowchart showing a sequence of Inert-EGR amount control according to the embodiment; This processing is executed every predetermined control cycle (e.g., 50 msec).

In Step S1, it is determined whether an EGR valve fault flag $F_{EGRNG}$ is "1". This EGR valve fault flag $F_{EGRNG}$ is set to "1" when it is determined that the high-pressure EGR valve or low-pressure EGR valve has failed in the determination processing, which is not illustrated, and is otherwise set to "0". In a case of this determination being YES, Step S11 is advanced to, and after the target value $IEGR_{CMD}$ of the Inert-EGR amount has been forcibly set to "0", Step S12 is advanced to. In a case of this determination being NO, Step S2 is advanced to.

In Step S2, it is determined whether an LAF sensor fault flag $F_{LAFNG}$ is "1". This LAF sensor fault flag $F_{LAFNG}$ is set to "1" when it is determined that the LAF sensor has failed in the determination processing, which is not illustrated, and is otherwise set to "0". In a case of this determination being YES, Step S11 is advanced to. In a case of this determination being NO, Step S3 is advanced to.

In Step S3, it is determined whether a pressure sensor fault flag $F_{CNSNG}$ is "1". This pressure sensor fault flag $F_{CNSNG}$ is set to "1" when it is determined that any of the pressure sensors have failed in the determination processing, which is not illustrated, and is otherwise set to "0". In a case of this determination being YES, Step S11 is advanced to. In a case of this determination being NO, Step S3 is advanced to.

In Step S4, the estimated value $IEGR_{HAT}$ of the Inert-EGR amount is calculated by the adaptive virtual sensor system (refer to the above formulas (8) to (18)).

In Step S5, it is determined whether an LAF sensor activity flag $F_{LAFACT}$ is "1". This LAF sensor activity flag $F_{LAFACT}$ is set to "1" when it is determined that the LAF sensor has reached an active state in the determination processing, which is not illustrated, and is otherwise set to "0". In a case of this determination being YES, Step S6 is advanced to, and the estimated error $E_{HAT}$ is calculated (refer to the above formula (7)). In addition, in a case of this determination being NO, Step S7 is advanced to, and the estimated error $E_{HAT}$ is forcibly set to "0".

In Step S8, the adaptive input $U_{VNS}$ is calculated (refer to the above formulas (20) to (30)).

In Step S9, the target value $IEGR_{IDEAL\_CMD}$ of the Inert-EGR amount is calculated by the Inert-EGR amount target value calculating portion 72.

In Step S10, the corrected target value $IEGR_{CMD}$ for the target value $IEGR_{IDEAL\_CMD}$ is calculated (refer to the above formulas (1) to (6)), and in Step S12, the high-pressure EGR valve lift amount $L_{HP}$ and the low-pressure EGR valve lift amount $L_{LP}$ are calculated based on the corrected target value $IEGR_{CMD}$, then this processing is ended.

Next, simulation results of Inert-EGR amount control of the present embodiment configured in the above such way will be described in detail while referring to FIGS. 13 to 16.

Figure 13:
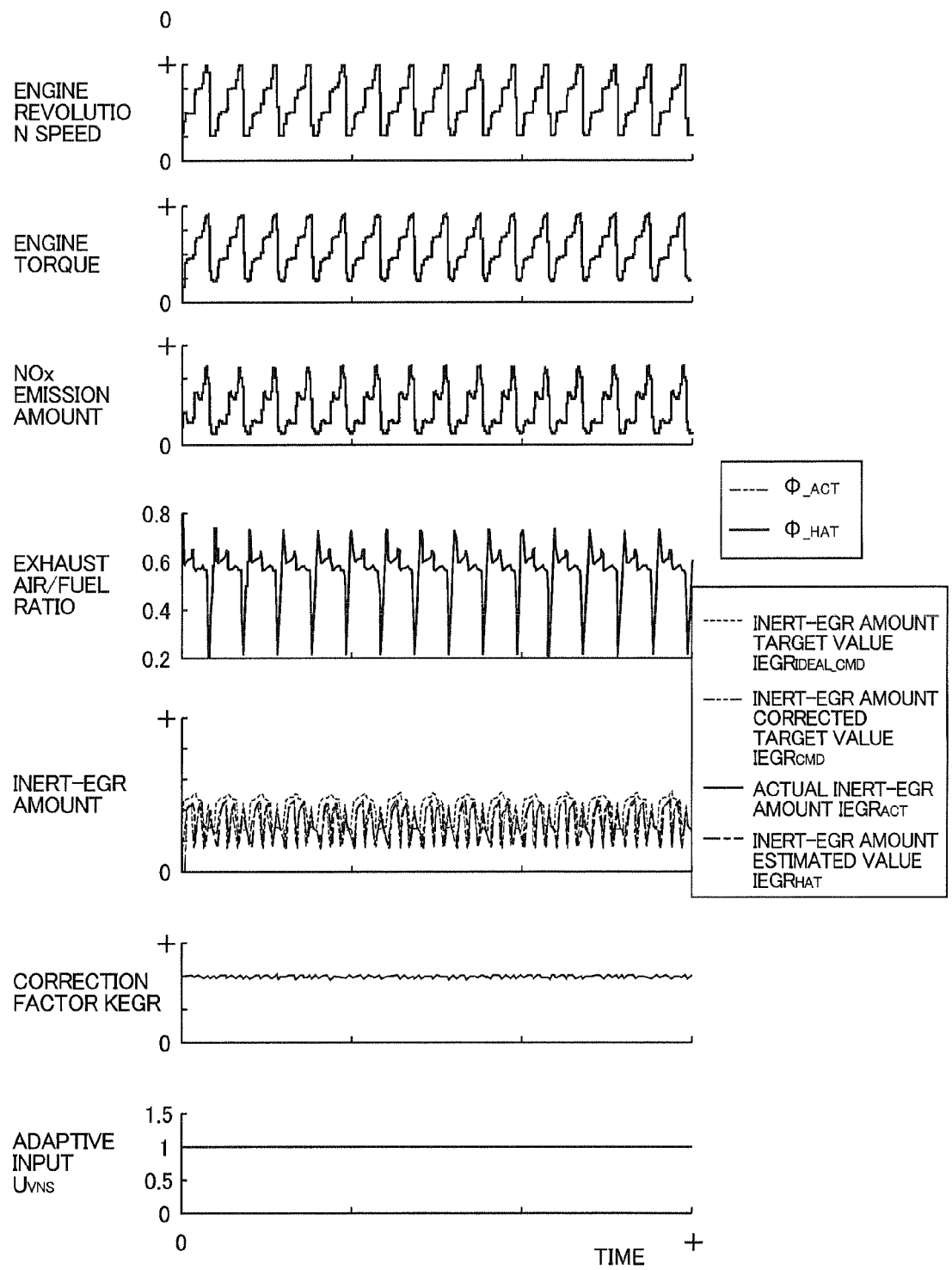
FIG. 13 provides graphs showing simulation results according to the embodiment.

FIG. 13 provides graphs showing simulation results in a case of fixing the adaptive input $U_{VNS}$ to "1", with the high-pressure EGR valve and low-pressure EGR valve of an exhaust purification system as reference articles.

In this case, since each EGR valve is set as a reference article, the estimated value $IEGR_{HAT}$ of the Inert-EGR amount matches the actual Inert-EGR amount $IEGR_{ACT}$, even if the adaptive input $U_{VNS}$ is forcibly fixed to "1". As a result, the actual Inert-EGR amount $IEGR_{ACT}$ can be precisely controlled to the target value $IEGR_{IDEAL\_CMD}$. Therefore, the NOx amount discharged from the engine is suppressed whenever possible.

Figure 14:
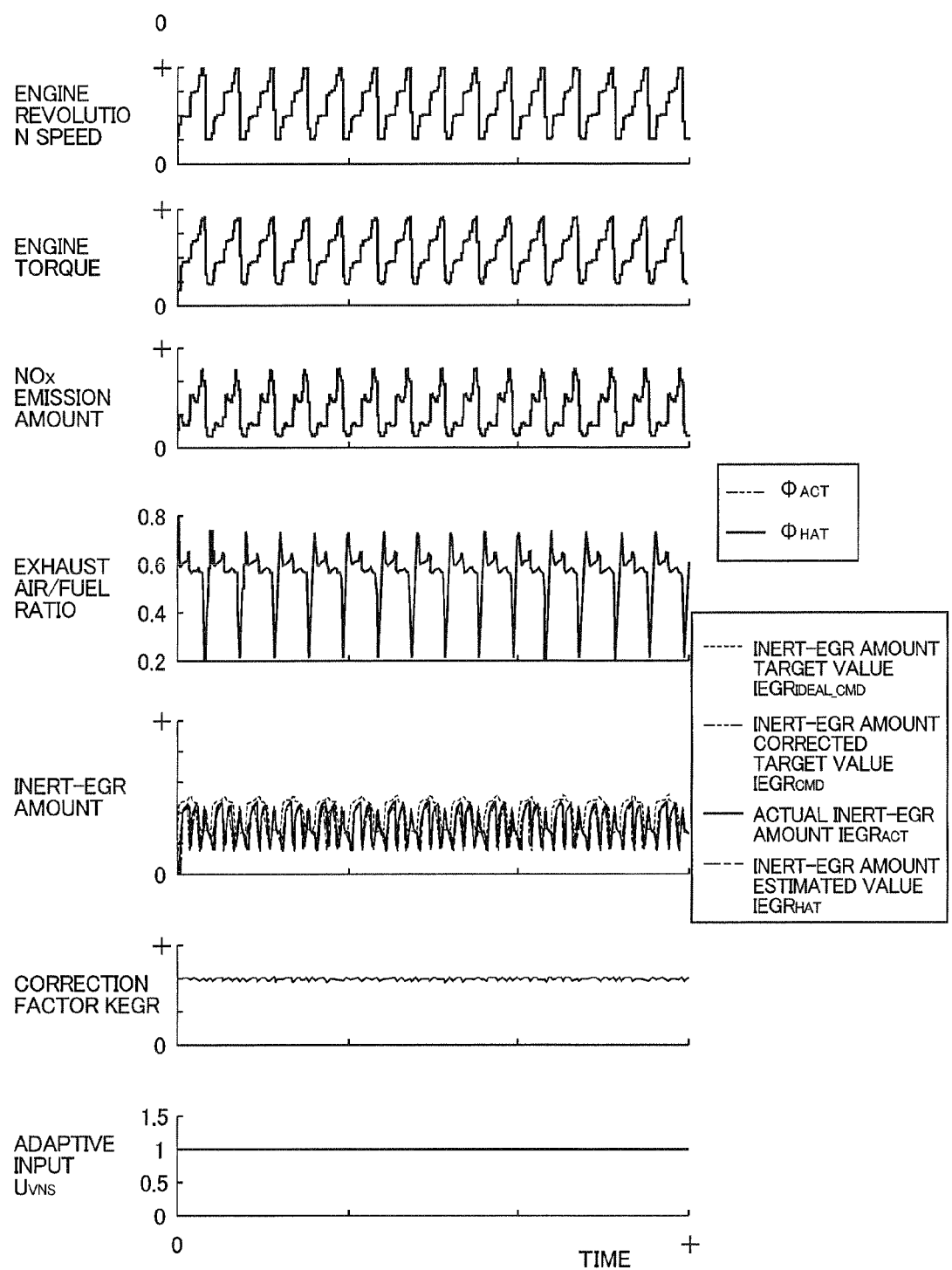
FIG. 14 provides graphs showing simulation results according to the embodiment.

FIG. 14 provides graphs showing simulation results in a case of having the adaptive input $U_{VNS}$ calculated by a non-linear adaptive corrector, with the high-pressure EGR valve and low-pressure EGR valve of an exhaust purification system as reference articles.

In this case, since each EGR valve is set as a reference article, even if the adaptive input $U_{VNS}$ is calculated by a non-linear adaptive corrector, it will remain unchanged at the initial value of "1". Therefore, the estimated value $IEGR_{HAT}$ of the Inert-EGR amount matches the actual Inert-EGR amount $IEGR_{ACT}$, substantially the same as the aforementioned results shown in FIG. 13. In addition, the actual Inert-EGR amount $IEGR_{ACT}$ can be precisely controlled to the target value $IEGR_{IDEAL\_CMD}$. Therefore, the NOx amount discharged from the engine is suppressed whenever possible.

Figure 15:
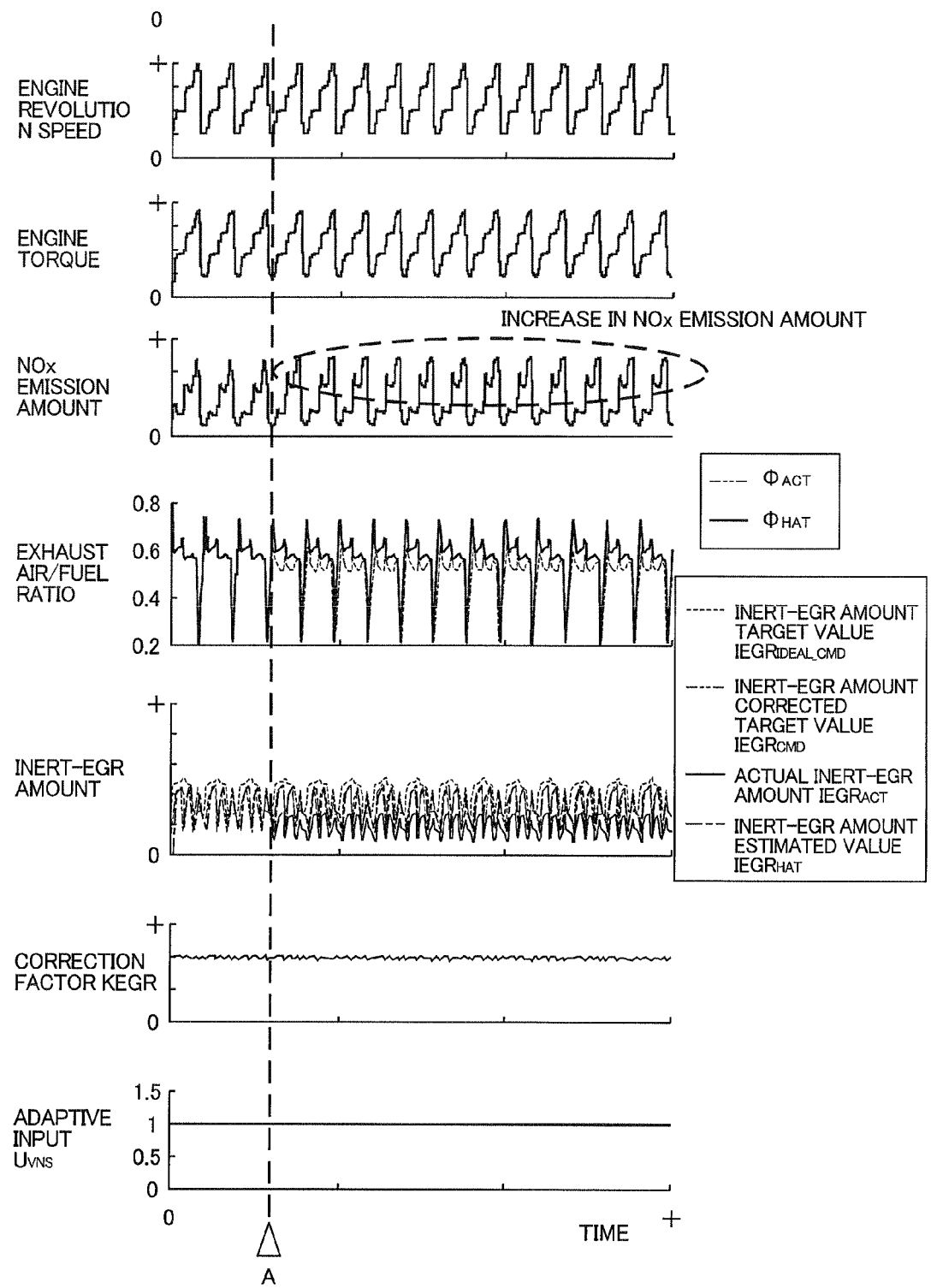
FIG. 15 provides graphs showing simulation results according to the embodiment.

FIG. 15 provides graphs showing simulation results in a case of virtually changing the high-pressure EGR valve and low-pressure EGR valve of the exhaust purification system from reference articles to degraded articles at time A, and fixing the adaptive input $U_{VNS}$ to "1".

In this case, from time A and onwards, error occurs between the estimated value $IEGR_{HAT}$ of the Inert-EGR amount and the actual Inert-EGR amount $IEGR_{ACT}$. In addition, error also occurs between the output $\Phi_{ACT}$ and estimated $\Phi_{HAT}$ of the LAF sensor. However, since the adaptive input $U_{VNS}$ was fixed to "1", the error arising in the estimated value $IEGR_{HAT}$ of the Inert-EGR amount remains. Due to this, the target value $IEGR_{IDEAL\_CMD}$ of the Inert-EGR amount is not corrected by the Inert-EGR controller. As a result, the NOx amount discharged from the engine increases. It should be noted that the increase in emission of this NOx amount is particularly obvious at the high-load side of the engine.

Figure 16:
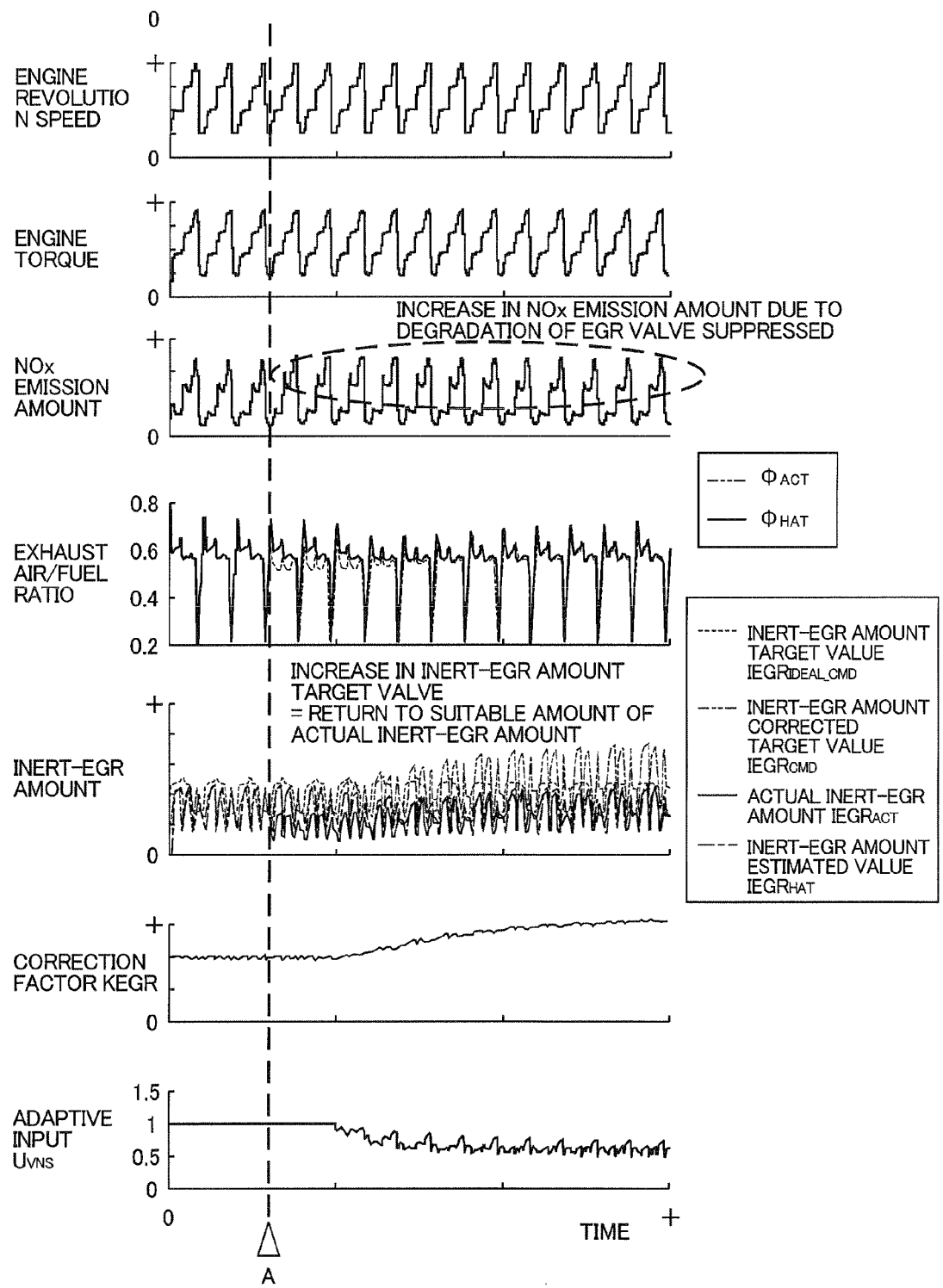
FIG. 16 provides graphs showing simulation results according to the embodiment.

FIG. 16 provides graphs showing simulation results in a case of virtually changing the high-pressure EGR valve and low-pressure EGR valve of the exhaust purification system from reference articles to degraded articles at time A, and calculating the adaptive input $U_{VNS}$ by way of a non-linear adaptive corrector.

In this case, from time A and onwards, error occurs between the estimated value $IEGR_{HAT}$ of the Inert-EGR amount and the actual Inert-EGR amount $IEGR_{ACT}$. In addition, error also occurs between the output $\Phi_{ACT}$ and estimated $\Phi_{HAT}$ of the LAF sensor. In accordance with this, the non-linear adaptive corrector corrects the adaptive input $U_{VNS}$ from "1" to a small value so as to make the error occurring a minimum. In addition, the error occurring between the estimated value $IEGR_{HAT}$ of the Inert-EGR amount and the estimated value $\Phi_{HAT}$ of the output of the LAF sensor gradually become small by the correction of this adaptive input $U_{VNS}$.

The Inert-EGR controller detects change in the actual Inert-EGR amount $IEGR_{ACT}$ through the estimated value amount $IEGR_{HAT}$, and corrects a correction factor KEGR so that the actual Inert-EGR amount $IEGR_{ACT}$ converges to the target Inert-EGR amount $IEGR_{IDEAL\_CMD}$. It is thereby possible to suppress an increase in the NOx amount discharged, even in a case of each EGR valve degrading and the Inert-EGR introduction amount declining, since this can be corrected to be maintained at a suitable Inert-EGR amount.

It has been confirmed from the above that the adaptive virtual sensor system of the present embodiment can demonstrate superior robustness against degradation of the exhaust purification system, and precisely calculate the estimated value $IEGR_{HAT}$ of the Inert-EGR amount. In addition, it is clear that this adaptive virtual sensor system can demonstrate superior robustness also against variability in solids of the exhaust purification system.

In the present embodiment, a detection means is configured by the LAF sensor 34; and a first estimated value calculating means, second estimated value calculating means, adaptive input calculating means, weighting function setting means, corrected value calculating means, determination means, and controller are configured by the ECU 7, for example.

More specifically, the first estimated value calculating means is configured by the Inert-EGR estimated value calculating portion 711, the second estimated value calculating means is configured by the LAF sensor output estimated value calculating portion 712, the adaptive input calculating means is configured by the non-linear adaptive corrector 713, the weighting function setting means is configured by the weighting function setting portion 715, the corrected value calculating means is configured by the local adaptive input calculating portion 716, and the determination means is configured by the adaptation coefficient calculating portion 717, for example. In addition, the controller is configured by the Inert-EGR amount target value calculating portion 72, Inert-EGR controller 73, and lift amount calculating portion 74, for example.

Second Embodiment

Next, a second embodiment of the present invention will be explained while referring to the drawings.

In the following explanation of the second embodiment, the same reference symbols are assigned for the same constituent elements as the first embodiment, and explanations thereof are omitted or abbreviated.

Figure 17:
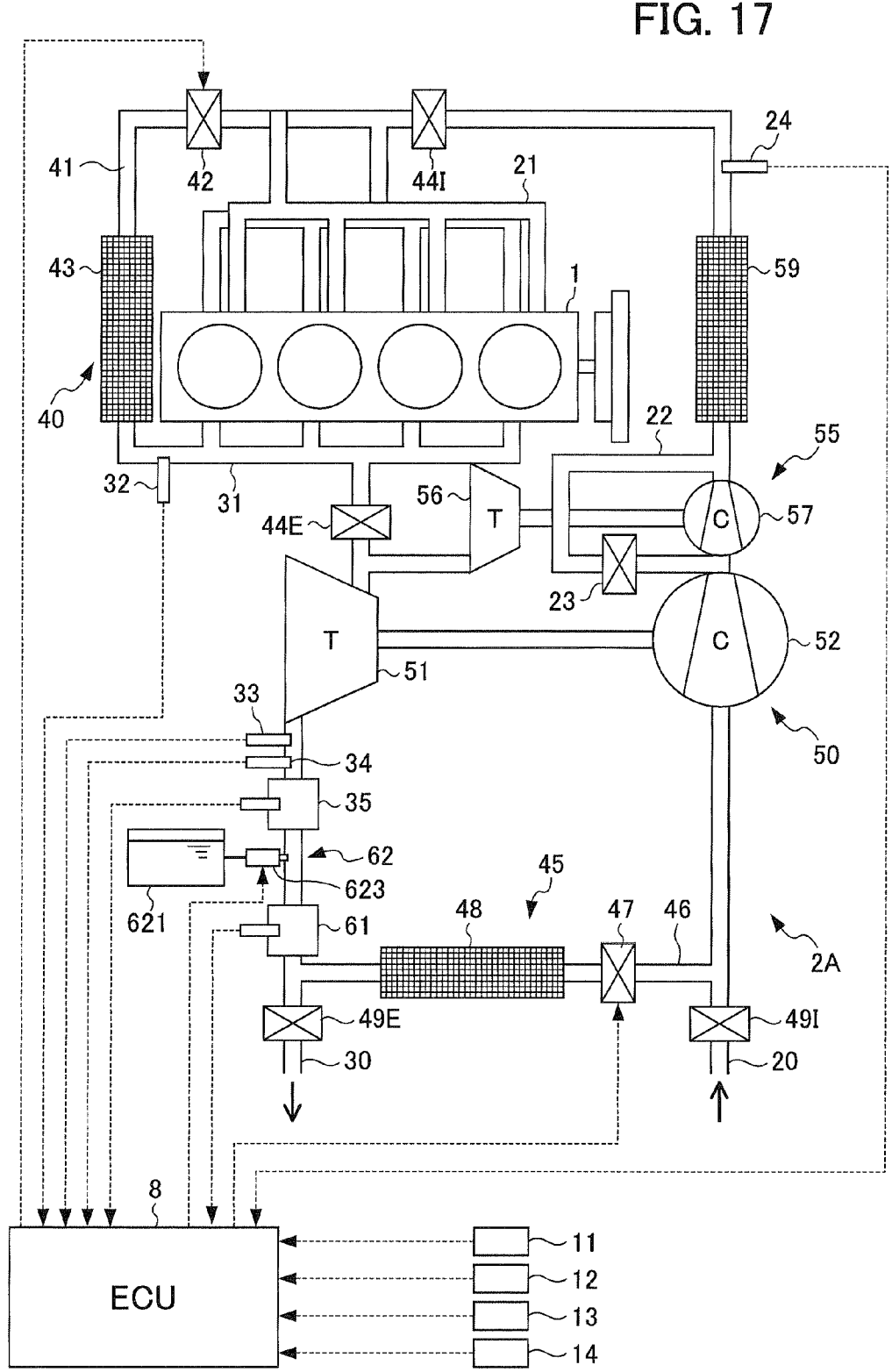
FIG. 17 is a schematic diagram showing configurations of an engine and an exhaust purification system thereof according to a second embodiment of the present invention.

FIG. 17 is a schematic diagram showing configurations of an engine 1 and an exhaust purification system 2A thereof according to the present embodiment.

As shown in FIG. 17, the present embodiment differs from the first embodiment in the aspect of including a selective reduction catalyst 61 and urea injection device 62, and the configuration of the ECU 8.

The exhaust purification system 2A includes the selective reduction catalyst 61 that is provided in the exhaust plumbing 30 on a downstream side of the oxidation catalyst 35 and purifies nitrogen oxides (hereinafter referred to as "NOx") in the exhaust flowing through this exhaust plumbing 30 under the presence of ammonia as a reducing agent, and the urea injection device 62 that supplies urea water, serving as a source of reducing agent, into the exhaust plumbing 30 on an upstream side of the selective reduction catalyst 61.

The urea injection device 62 includes a urea tank 621 and a urea injection valve 623.

The urea tank 621 stores urea water. The urea injection valve 623 is connected to the ECU 8, operates according to a control signal from the ECU 8, and injects urea water of an amount depending on this control signal into the exhaust plumbing 30 between the oxidation catalyst 35 and selective reduction catalyst 61. In other words, urea injection control is executed.

The oxidation catalyst 35 is provided more on an upstream side in the exhaust plumbing 30 than the selective reduction catalyst 61 and the urea injection valve 623, converts NO in the exhaust to $NO_2$, thereby promoting the reduction of NOx in the selective reduction catalyst 61.

The selective reduction catalyst 61 selectively reduces NOx in the exhaust under an atmosphere in which a reducing agent such as ammonia is present. More specifically, when urea water is injected by the urea injection device 62, ammonia is generated as a reducing agent by this urea water thermally decomposing or hydrolyzing due to the heat of the exhaust. The ammonia generated is supplied to the selective reduction catalyst 61, and NOx in the exhaust is selectively reduced by this ammonia.

However, this selective reduction catalyst 61 has a function of reducing NOx in the exhaust with the ammonia generated from urea water, as well as having a function of storing only a predetermined amount of the ammonia generated. Hereinafter, the ammonia amount stored in the selective reduction catalyst 61 is defined as a storage amount, and the ammonia amount that can be stored in the selective reduction catalyst 61 is defined as a maximum storage capacity.

The ammonia stored in this way is also consumed as appropriate in the reduction of NOx in the exhaust. As a result, the NOx reduction rate of the selective reduction catalyst 61 will increase accompanying the storage amount becoming larger. In addition, in a case of the supply amount of urea water being small relative to the amount of NOx discharged from the engine, the ammonia stored will be consumed in the reduction of NOx by serving to compensate for this insufficiency of urea water.

Herein, in a case of the ammonia generated exceeding the maximum storage capacity of the selective reduction catalyst 61, the ammonia generated is discharged to the downstream side of the selective reduction catalyst 61. The ammonia not being stored in the selective reduction catalyst 61 and discharging to the downstream side thereof in this way is hereinafter referred to as "ammonia slip".

As described in detail later, the occurrence of ammonia slip can also be suppressed to the utmost while maintaining the NOx purification rate of the selective reduction catalyst 61 to be high, by performing urea injection control so that the storage amount of the selective reduction catalyst 61 is maintained at a predetermined target value.

In addition to the crank angle position sensor 11, accelerator sensor 12, intake air pressure sensor 24, first exhaust pressure sensor 32, second exhaust pressure sensor 33, LAF sensor 34, first lift sensor 13 and second lift sensor 14, an oxidation catalyst temperature sensor 37 and a selective reduction catalyst temperature sensor 38 are connected to the ECU 8.

The oxidation catalyst temperature sensor 37 detects a temperature $T_{DOC}$ of the oxidation catalyst 35, and transmits a signal substantially proportional to the detected value to the ECU 8. The selective reduction catalyst temperature sensor 38 detects a temperature $T_{SCR}$ of the selective reduction catalyst 61, and transmits a signal substantially proportional to the detected value to the ECU 8.

Next, the issues focused on by the inventors of the present application upon configuring the ECU controlling the above such exhaust purification system 2A will be explained.

In a case of controlling such an exhaust purification system, conventionally, it has been known to provide a NOx sensor that detects a NOx amount in the exhaust between a urea injection device and selective reduction catalyst, and to decide the urea injection amount based on the detected value of this NOx sensor. However, there are the following such issues in a case of using a NOx sensor in this way.

(3) First, with existing NOx sensors, the monitoring resolution for NOx is not sufficient to perform urea injection control with high precision, and there is large variability in solids. As a result, there is concern over the urea injection amount being insufficient, whereby the NOx purification rate declines, or conversely, the urea injection amount becoming excessive, whereby excess ammonia slip occurs.

(4) In addition, with existing NOx sensors, the responsiveness is not sufficient to perform urea injection control with high precision. As a result, there is concern over a large sensing delay arising during a transition in particular, a result of which the urea injection amount is insufficient and the NOx purification rate declines.

(5) In addition, in order to prevent breaking of the sensor element, existing NOx sensors cannot suddenly rise in temperature. As a result, after startup of the engine, it may take several hundreds of seconds until the NOx sensor reaches activity. Therefore, there is concern that the NOx purification rate will decline and ammonia slip will occur in this duration due to the output of the NOx sensor not being able to be used.

Figure 18:
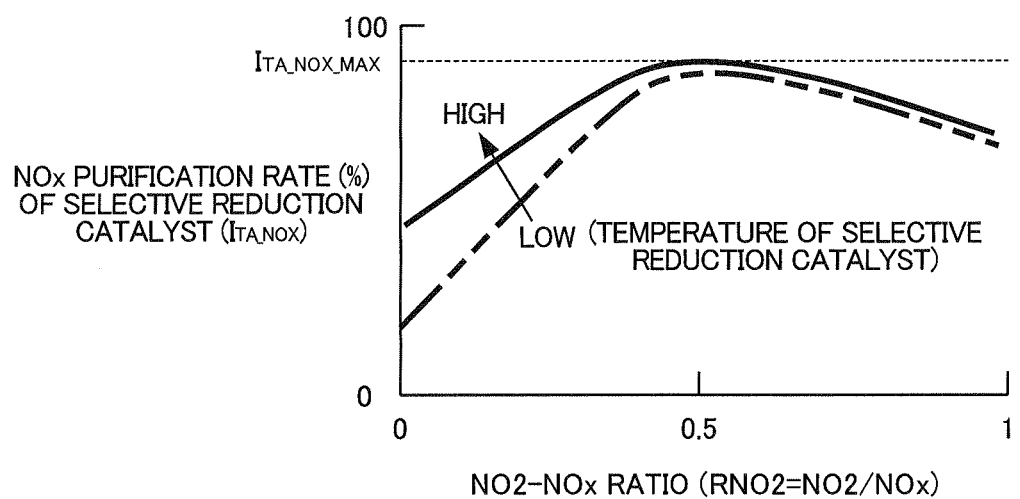
FIG. 18 is a graph showing relationships between a NOx purification rate of a selective reduction catalyst and a ratio of $NO_2$ to NOx according to the embodiment.

(6) FIG. 18 is a graph showing relationships between a NOx purification rate of the selective reduction catalyst and a ratio of $NO_2$ to NOx ($NO_2/NOx=RNO_2$).

As shown in FIG. 18, the NOx purification rate of the selective reduction catalyst differs greatly according to the ratio of $NO_2$ to NOx. In particular, fluctuation in the NOx purification rate relative to the ratio of $NO_2$ to NOx increases accompanying the temperature of the selective reduction catalyst lowering.

Regardless of there being such a characteristic in the selective reduction catalyst, the ratio of $NO_2$ to NOx cannot be detected with existing NOx sensors. Therefore, in a case of deciding the urea injection amount based on the output of such a NOx sensor, the injected urea water will not contribute to raising the NOx purification rate of the selective reduction catalyst and surplus will occur depending on the ratio of $NO_2$ to NOx, whereby ammonia slip may occur.

The advantages of providing a NOx sensor in order to perform urea injection control in the above way are few. In addition, although it has also been considered to decide the urea injection amount using a map established in advance without using the output of the NOx sensor, it is difficult to decide the urea injection amount with high precision in this case as well, and it is also difficult to cope with degradation and variability in solids of the engine and the exhaust purification system.

Hereinafter, the configuration of the control device of the exhaust purification system 2A made taking the above such problems into account will be explained. As explained in detail below, in the present embodiment, an adaptive virtual sensor network is developed that calculates an estimated value for the NOx amount in exhaust, similarly to the estimated value of the Inert-EGR amount in the exhaust purification system of the first embodiment. In other words, with the present embodiment, the NOx amount in the exhaust is estimated using a neural network, and furthermore, urea injection control is performed based on the estimated value of this NOx amount.

Figure 19:
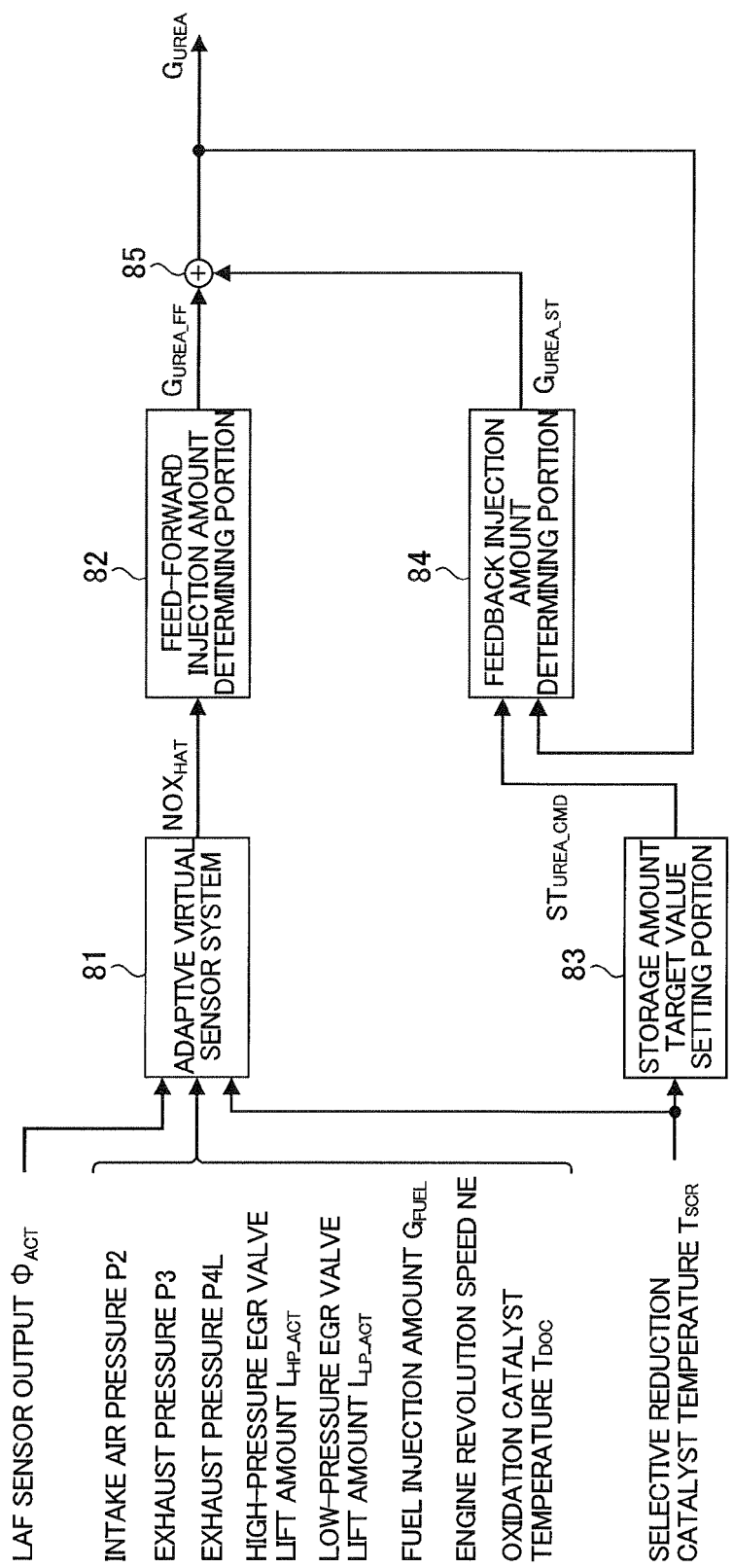
FIG. 19 is a block diagram showing a configuration of a control device of the exhaust purification system according to the embodiment.

FIG. 19 is a block diagram showing a configuration of the control device of the exhaust purification system 2A. It should be noted that only the configuration related to urea injection control of the exhaust purification system 2A is illustrated in FIG. 19. More specifically, only a module configured by the ECU relating to deciding the urea injection amount $G_{UREA}$ of the urea injection device is illustrated.

This module is configured to include the adaptive virtual sensor system 81, feed-forward injection amount determining portion 82, storage amount target value setting portion 83, and feedback injection amount determining portion 84.

In this module, the urea injection amount $G_{UREA}(k)$ is determined by calculating a sum of a feed-forward injection amount $G_{UREA\_FF}(k)$ and a feedback injection amount $G_{UREA\_ST}(k)$ by way of an adder 85, as shown in the following formula (31).

$$G_{UREA}(k)=G_{UREA\_FF}(k)+G_{UREA\_ST}(k) \qquad (31)$$

As explained in detail below, the feed-forward injection amount $G_{UREA\_FF}(k)$ is determined by the feed-forward injection amount determining portion 82 based on an estimated value $NOX_{HAT}$ of the NOx amount in the exhaust calculated by the adaptive virtual sensor system 81.

In addition, the feedback injection amount $G_{UREA\_ST}(k)$ is determined by the feedback injection amount determining portion 84 so as to maintain the storage amount at the target value $ST_{UREA\_CMD}(k)$ set by the storage amount target value setting portion 83.

The adaptive virtual sensor system 81 calculates the estimated value $NOX_{HAT}$ of the NOx amount of exhaust between the oxidation catalyst and selective reduction catalyst, based on the detected values P2, P3, P3L, $\Phi_{ACT}$, $L_{HP\_ACT}$, $L_{LP\_ACT}$, $T_{DOC}$ and $T_{SCR}$ of the plurality of sensors 24, 32, 33, 34, 13, 14, 37 and 38.

Figure 20:
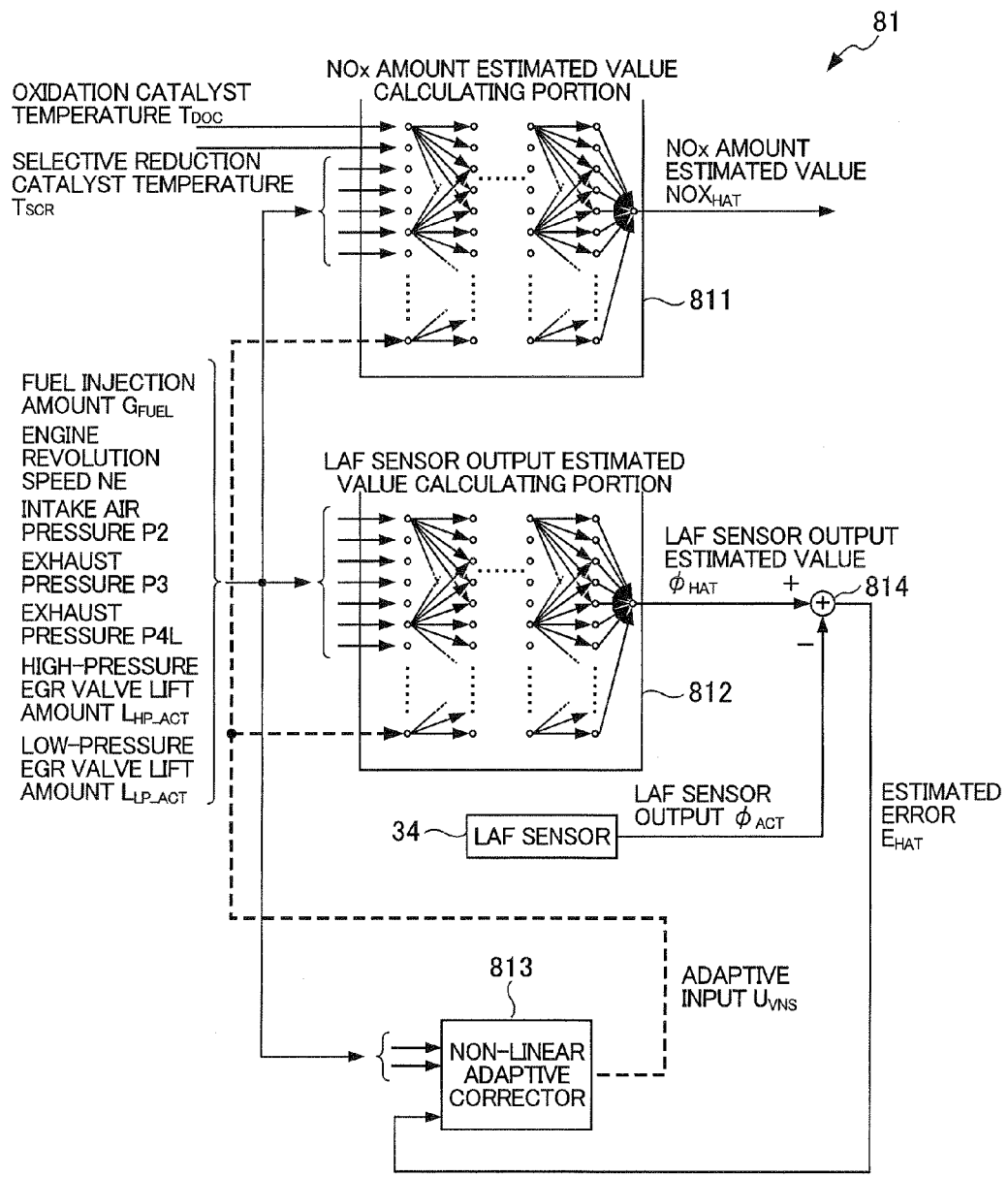
FIG. 20 is a block diagram showing a configuration of an adaptive virtual sensor system according to the embodiment.

FIG. 20 is a block diagram showing the configuration of the adaptive virtual sensor system 81.

The adaptive virtual sensor system 81 is configured to include a NOx amount estimated value calculating portion 811 that calculates the estimated value $NOX_{HAT}$ of the NOx amount, an LAF sensor output estimated value calculating portion 812 that calculates the estimated value $\Phi_{HAT}$ for the output (exhaust air/fuel ratio) of the LAF sensor 34, and a non-linear adaptive corrector 813 that calculates the adaptive input $U_{VNS}$.

In order to solve the aforementioned problems (3) to (5) with this adaptive virtual sensor system 81, the estimated value $NOX_{HAT}$ of the NOx amount is calculated similarly to the aforementioned estimation of the Inert-EGR amount in the first embodiment.

In other words, with the adaptive virtual sensor system 81 of the present embodiment, the estimated value $NOX_{HAT}$ of the NOx amount is calculated by the NOx amount estimated value calculating portion 811 constructed by the neural network. Furthermore, the estimated value $\Phi_{HAT}$ of the exhaust air/fuel ratio, which is a separate physical quantity from the NOx amount and is a physical quantity correlated to the NOx amount, is calculated by the LAF sensor output estimated value calculating portion 812, which has a neural network structure similar to the NOx amount estimated value calculating portion 811. It should be noted that the neural network structures of this NOx amount estimated value calculating portion 811 and LAF sensor output estimated value calculating portion 812 are each substantially the same configuration as the neural network structure of the Inert-EGR estimated value calculating portion 711 and LAF sensor output estimated value calculating portion 712; therefore, detailed explanations thereof will be omitted.

Furthermore, the estimated error $E_{HAT}(k)$ between the estimated value $\Phi_{HAT}(k)$ of the exhaust air/fuel ratio calculated and the detected value $\Phi_{ACT}(k)$ of the LAF sensor 34 is calculated by the adder 814, as shown in the following formula (32).

$$E_{HAT}(k)=\Phi_{HAT}(k)-\Phi_{ACT}(k) \quad (32)$$

Moreover, with the non-linear adaptive corrector 813, the adaptive input $U_{VNS}$ to be commonly input to the NOx amount estimated value calculating portion 811 and LAF sensor output estimated value calculating portion 812 is calculated so that the estimated error $E_{HAT}$ calculated becomes a minimum. It should be noted that this non-linear adaptive corrector 813 is substantially the same configuration as the non-linear adaptive corrector 713 of the first embodiment; therefore, a detailed explanation thereof will be omitted.

Next, learning of the neural network for estimating the NOx amount will be explained.

First, components of the input vector $U(k)$ to the neural network are defined as shown in the following formula (33). In this way, the components of the input vector $U(k)$ include a plurality of physical quantities required for estimating the NOx amount (oxidation catalyst temperature $T_{DOC}$, selective reduction catalyst temperature $T_{SCR}$, fuel injection amount $G_{FUEL}$, intake air pressure P2, exhaust pressure P3, exhaust pressure P3L, detected value $L_{HP\_ACT}$ of high-pressure EGR valve lift amount, detected value $L_{LP\_ACT}$ of low-pressure EGR valve lift amount, and engine revolution speed NE), and the adaptive input $U_{VNS}$. In addition, data related to such a variety of different physical quantities are included, as well as data related to physical quantities at different times are included in the components of the input vector. Moreover, the NOx amount on the downstream side of the oxidation catalyst also depends greatly on the oxidizing ability of the oxidation catalyst, and thus the oxidation catalyst temperature $T_{DOC}$ is included among the components of the input vector U.

$$U(k) = \begin{pmatrix} T_{DOC}(k) \\ T_{SCR}(k) \\ G_{FUEL}(k) \\ G_{FUEL}(k-1) \\ G_{FUEL}(k-2) \\ P2(k) \\ P2(k-1) \\ P3(k) \\ P3(k-1) \\ P4L(k) \\ P4L(k-1) \\ L_{LP\_ACT}(k) \\ L_{LP\_ACT}(k-1) \\ L_{HP\_ACT}(k) \\ L_{HP\_ACT}(k-1) \\ NE(k) \\ NE(k-1) \\ NE(k-2) \\ U_{VNS}(k-1) \end{pmatrix} \quad (33)$$

It should be noted that the temperature of the coolant of the engine may be included among the components of the input vector U, for example. It is thereby possible to improve the estimation accuracy of the NOx amount in the course of warming up the engine.

In addition, the output $Y(k)$ of the neural network relative to such an input vector $U(k)$ is defined as the estimated value $NOX_{HAT}(k)$ of the NOx amount, as shown in the following formula (34).

$$NOX_{HAT}(k)=Y(k) \quad (34)$$

Learning of the neural network sets the input vector $U(k)$ and output $Y(k)$ in the above described way, and is performed according to a similar sequence as the aforementioned first embodiment. In other words, the at least two of the reference article and degraded article of the exhaust purification system are prepared, and data showing the relationships between the components of the input vector U and the NOx amount of the exhaust between the oxidation catalyst and selective reduction catalyst is acquired for each exhaust purification system prepared. Then, learning of the neural network is performed based on this acquired data.

Herein, training data for the aforementioned data to be used in learning of the neural network will be explained.

Data of a corrected NOx amount $NOX_{MOD}(k)$ calculated by multiplying the correction coefficient $K_{MOD\_NO2}(k)$ by the output $NOX(k)$ of the NOx sensor detecting the amount of NOx between the oxidation catalyst and selective reduction catalyst, as shown in the following formula (35), is used in the training data, i.e. data to be reproduced by the output $NOX_{HAT}$ of the neural network.

$$NOX_{MOD}(k)=K_{MOD\_NO2}(k)NOX(k) \quad (35)$$

Herein, the correction coefficient $K_{MOD\_NO2}(k)$ is calculated by dividing a NOx purification rate $I_{TA\_NOX}(k)$ of the selective reduction catalyst determined based on the aforementioned map shown in FIG. 18, by a maximum purification rate $I_{TA\_NOX\_MAX}$, as shown in the following formulas (36) and (37). It should be noted that, for the ratio RNO2(k) of $NO_2$ to NOx, values measured by a Fourier transform infrared spectrometer (FTIR) or the like are used.

$$K_{MOD\_NO2}(k) = \frac{I_{TA\_NOX}(k)}{I_{TA\_NOX\_MAX}} \tag{36}$$

$$RNO2(k) = \frac{NO2(k)}{NOX(k)} \tag{37}$$

In other words, the aforementioned corrected NOx amount $NOX_{MOD}$ corresponds to a NOx amount in the exhaust between the oxidation catalyst and selective reduction catalyst that can be purified in the selective reduction catalyst. In the present embodiment, learning of the neural network is performed using the training data in which such corrected NOx amounts are recorded, and the output $NOX_{HAT}$ thereof is set. By determining the urea injection amount based on the output $NOX_{HAT}$ in which such an influence from the ratio of $NO_2$ to NOx is reflected in advance, it is possible to maintain the NOx purification rate of the selective reduction catalyst to be high, while suppressing the injection of surplus urea water and suppressing the occurrence of ammonia slip. Therefore, the aforementioned problem (6) can be solved.

In addition, learning in the neural network of the LAF sensor output estimated value calculating portion 812 is also performed according to a sequence similar to the aforementioned neural network of the NOx amount estimated value calculating portion 811.

The feed-forward injection amount determining portion 82 determines the feed-forward injection amount $G_{UREA\_FF}(k)$ by multiplying a conversion factor $K_{CONV\_NOX\_UREA}$ by the estimated value $NOX_{HAT}(k)$ of the NOx amount calculated by the adaptive virtual sensor system 81, as shown in the following formula (38). In the following formula (38), the conversion factor $K_{CONV\_NOX\_UREA}$ is a conversion factor that converts from NOx amount to urea injection amount. More specifically, the conversion factor $K_{CONV\_NOX\_UREA}$ is a urea injection amount required in order to reduce a predetermined amount of NOx.

$$G_{UREA\_FF}(k) = K_{CONV\_NOX\_UREA} NOX_{HAT}(k) \tag{38}$$

Herein, the influence of the NOx purification rate, which changes depending on the ratio of $NO_2$ to NOx and the selective reduction catalyst temperature $T_{SCR}$, is reflected in the estimated value $NOX_{HAT}$ of the NOx amount calculated by the adaptive virtual sensor system 81, as described above. Therefore, as shown in the above formula (38), it is possible to determine an appropriate feed-forward injection amount $G_{UREA\_FF}$ without surplus by simply multiplying a factor by the estimated value.

The storage amount target value setting portion 83 sets the target value $ST_{UREA\_CMD}(k)$ of the storage amount, based on the detected value $T_{SCR}(k)$ of the selective reduction catalyst temperature.

Figure 21:
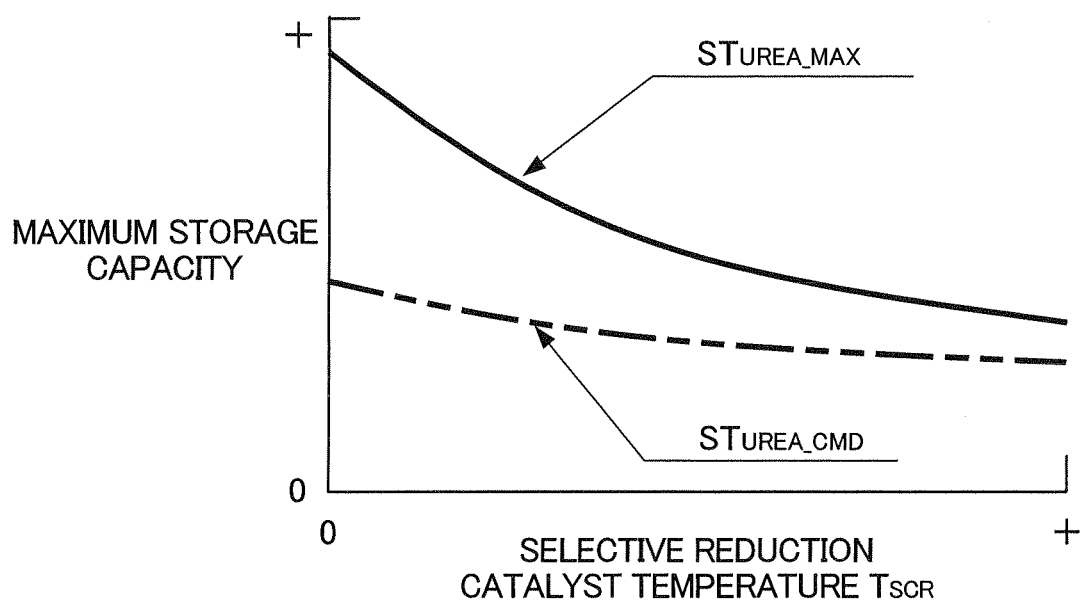
FIG. 21 is a graph showing a relationship between a maximum storage capacity and a selective reduction catalyst temperature according to the embodiment.

FIG. 21 is a graph showing a relationship between the maximum storage capacity $ST_{UREA\_MAX}$ and the selective reduction catalyst temperature $T_{SCR}$, and shows a map for setting the target value $ST_{UREA\_CMD}(k)$ of the storage amount based on the detected value $T_{SCR}(k)$.

As shown in this figure, the maximum storage capacity $ST_{UREA\_MAX}$ decreases accompanying the selective reduction catalyst temperature $T_{SCR}$ rising. Therefore, the target value $ST_{UREA\_CMD}$ of the storage amount is set to a somewhat smaller value than the maximum storage capacity $ST_{UREA\_MAX}$ so that ammonia slip does not occur.

Referring back to FIG. 19, with the storage amount target value setting portion 83, the target value $ST_{UREA\_CMD}(k)$ according to the detected value $T_{SCR}(k)$ is set based on a map such as that shown in FIG. 21.

The feedback injection amount determining portion 84 estimates the storage amount $ST_{UREA}$ based on a predetermined storage model of the selective reduction catalyst, as well as determining the feedback injection amount $G_{UREA\_ST}$ so that this estimated value $ST_{UREA}$ of the storage amount matches the target value $ST_{UREA\_CMD}$ set.

Figure 22:
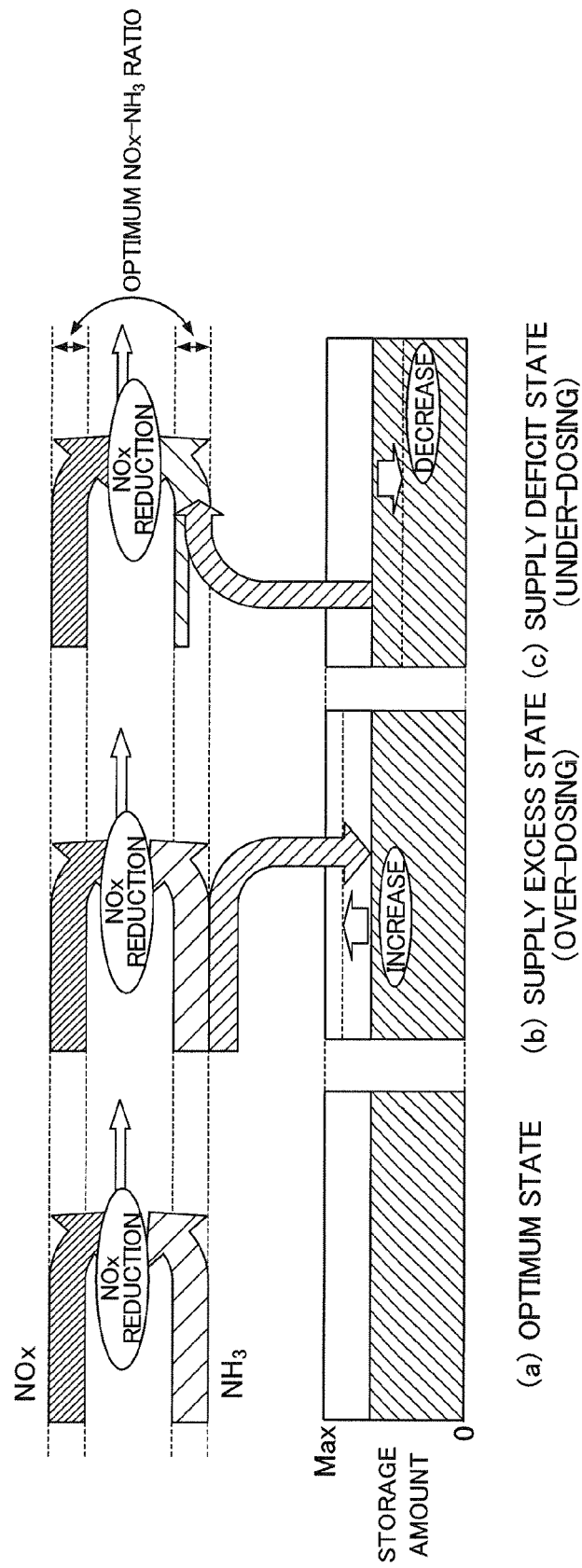
FIG. 22 is a schematic diagram showing the concept of a storage model for the selective reduction catalyst according to the embodiment.

FIG. 22 is a schematic diagram showing the concept of the storage model for the selective reduction catalyst.

This ammonia storage model is a model that estimates the change in the storage amount of ammonia in the selective reduction catalyst in response to a urea injection amount relative to the NOx amount in the exhaust flowing into the selective reduction catalyst. More specifically, the state of change in the storage amount of the selective reduction catalyst is classified into the three states of a state in which the urea injection amount is ideal for a predetermined NOx amount (refer to FIG. 22(a)), a state in which the urea injection amount is excessive (refer to FIG. 22(b)), and a state in which the urea injection amount is insufficient (refer to FIG. 22(c)).

As shown in FIG. 22(a), in a case of being in the state in which the urea injection amount relative to the NOx flowing into the selective reduction catalyst is ideal, i.e. in a case of the amount of ammonia that can most efficiently reduce the NOx in the exhaust and the amount of ammonia generated from the urea water supplied substantially matching, there is no change in the storage amount.

As shown in FIG. 22(b), in a case of being in the state in which the urea injection amount relative to the NOx flowing into the selective reduction catalyst is excessive, i.e. in a case of the amount of ammonia generated from the urea water supplied being greater than the amount that can most efficiently reduce the NOx in the exhaust, this surplus ammonia is stored in the selective reduction catalyst. Therefore, in such a supply excess (over-dosing) state, the storage amount increases.

As shown in FIG. 22(c), in a case of being the state in which the urea injection amount relative to the NOx flowing into the selective reduction catalyst is insufficient, i.e. in a case of the amount of ammonia generated from the urea water supplied being less than the amount that can most efficiently reduce NOx in the exhaust, this deficit is compensated from the ammonia stored. Therefore, in such a supply deficit (under-dosing) state, the storage amount decreases.

With the feedback injection amount determining portion 84, the estimated value $ST_{UREA}$ of the storage amount is calculated based on the above such storage model. More specifically, it is calculated based on the following formulas (39) to (42).

First, the urea injection amount $G_{UREA\_IDEAL}(k)$ of the amount required in order to reduce the NOx flowing into the selective reduction catalyst is calculated based on the estimated value $NOX_{HAT}$ of the NOx amount, as shown in the following formula (39).

$$G_{UREA\_IDEAL}(k) = G_{UREA\_FF}(k) = K_{CONV\_NOX\_UREA} NOX_{HAT}(k) \tag{39}$$

The surplus $D_{UREA}(k)$ of the urea injection amount that is the main cause fluctuating the storage amount is calculated by subtracting the urea injection amount $G_{UREA\_IDEAL}(k)$ required for reduction, from the actual urea injection amount $G_{UREA}(k)$, as shown in the following formula (40).

$$D_{UREA}(k)=G_{UREA}(k-1)-G_{UREA\_IDEAL}(k-1) \qquad (40)$$

Therefore, the estimated value $ST_{UREA}(k)$ of the storage amount is calculated based on the surplus $D_{UREA}(k)$ of the urea injection amount, with the maximum storage capacity $ST_{UREA\_MAX}(k)$ as an upper limit value, as shown in the following formulas (41) and (42).

$$ST_{UREA\_TMP}(k) = ST_{UREA\_TMP}(k-1) + D_{UREA}(k) \qquad (41)$$

$$ST_{UREA}(k) = \begin{cases} ST_{UREA\_MAX}(k) & (ST_{UREA\_MAX}(k) < ST_{UREA\_TMP}(k)) \\ ST_{UREA\_TMP}(k) & (ST_{UREA\_TMP}(k) > 0) \\ 0 & (ST_{UREA\_TMP}(k) \leq 0) \end{cases} \qquad (42)$$

Herein, the maximum storage capacity $ST_{UREA\_MAX}(k)$ is set by searching a map such as the aforementioned one shown in FIG. 21, according to the selective reduction catalyst temperature $T_{SCR}(k)$.

The feedback injection amount determining portion 84 determines the feedback injection amount $G_{UREA\_ST}(k)$ by way of expanded I-P control such as that shown below in the following formulas (43) to (46), so that the estimated value $ST_{UREA}(k)$ calculated in the above described way matches the target value $ST_{UREA\_CMD}(k)$.

First, the deviation $E_{ST}(k)$ between the estimated value $ST_{UREA}(k)$ of the storage amount and the target value $ST_{UREA\_CMD}(k)$ is calculated, as shown in the following formula (43).

$$E_{ST}(k)=ST_{UREA}(k)-ST_{UREA\_CMD}(k) \qquad (43)$$

Next, the product of the integral gain $KI_{ST}$ being multiplied by the deviation $E_{ST}(k)$ is defined as the integral term $G_{UREA\_ST\_I}(k)$, as shown in the following formula (44).

$$G_{UREA\_ST\_I}(k)=KI_{ST}E_{ST}(k) \qquad (44)$$

On the other hand, the derivative value of the estimated value of the storage amount $ST_{UREA}(k)-ST_{UREA}(k-1)$ is calculated, and the product of multiplying the proportional gain $KP_{ST}$ by this derivative value is defined as the proportional term $G_{UREA\_ST\_P}(k)$, as shown in the following formula (45).

$$G_{UREA\_ST\_P}(k)=KP_{ST}(ST_{UREA}(k)-ST_{UREA}(k-1)) \qquad (45)$$

Next, as shown in the following formula (46), the sum of the proportional term $G_{UREA\_ST\_P}(k)$ and the integral term $G_{UREA\_ST\_I}(k)$ is calculated, and this is determined as the feedback injection amount $G_{UREA\_ST}(k)$.

$$G_{UREA\_ST}(k)=G_{UREA\_ST\_P}(k)+G_{UREA\_ST\_I}(k) \qquad (46)$$

Next, the simulation results of urea injection control of the present embodiment configured in the above way will be described in detail while referring to FIGS. 23 to 26.

Figure 23:
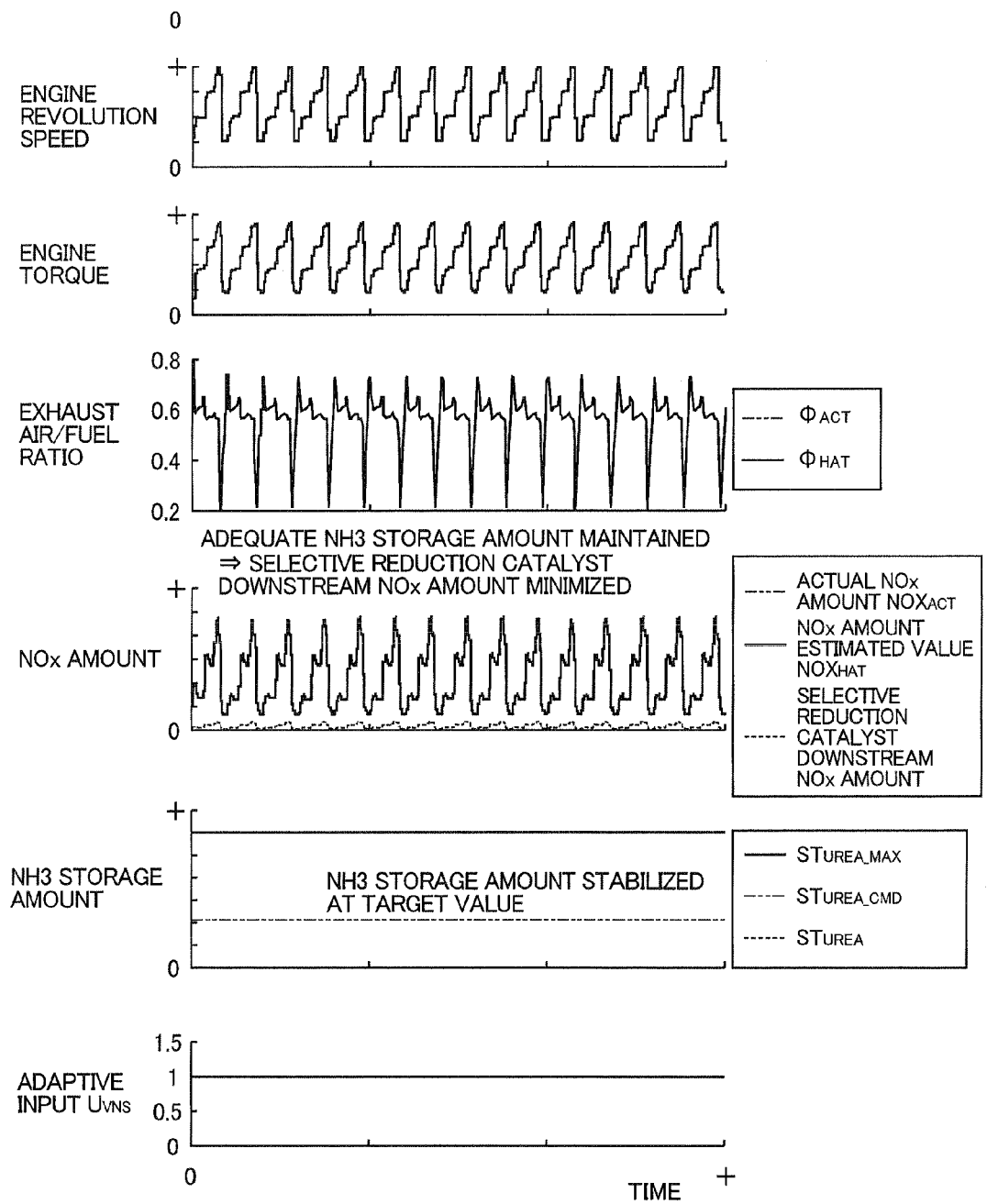
FIG. 23 provides graphs showing simulation results according to the embodiment.

FIG. 23 provides graphs showing simulation results in a case of fixing the adaptive input $U_{VNS}$ to "1", with the exhaust purification system as a reference article.

In this case, since the exhaust purification system is set as a reference article, the estimated value $NOX_{HAT}$ of the NOx amount will match the actual NOx amount $NOX_{ACT}$, even if the adaptive input $U_{VNS}$ is forcibly fixed to "1". As a result, the estimated value $ST_{UREA}$ of the storage amount is maintained at the target value $ST_{UREA\_CMD}$. Since the actual storage amount is also maintained at the target value $ST_{UREA\_CMD}$, it is possible to maintain the NOx purification rate of the selective reduction catalyst to be high. Therefore, the NOx amount on the downstream side of the selective reduction catalyst is suppressed whenever possible.

Figure 24:
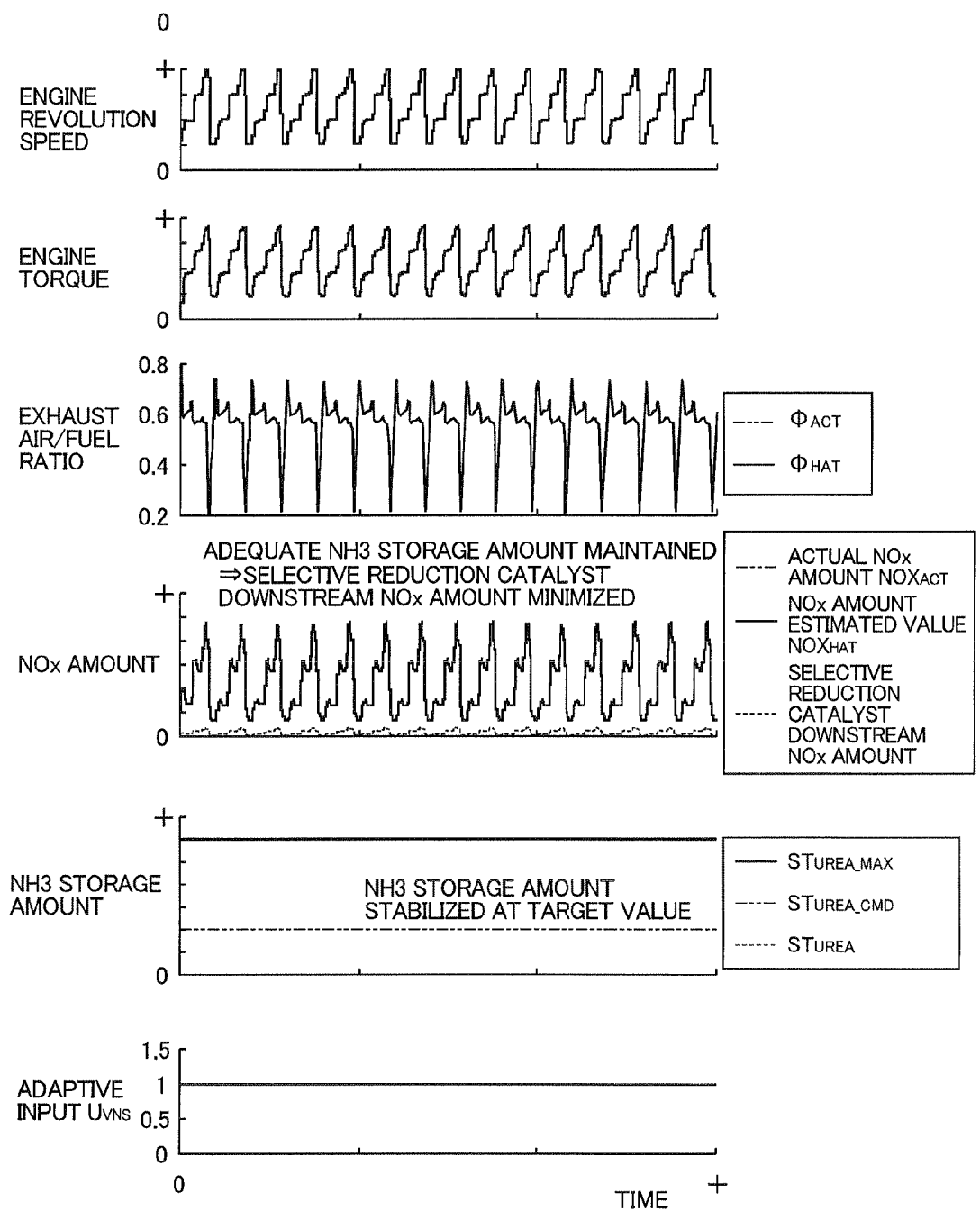
FIG. 24 provides graphs showing simulation results according to the embodiment.

FIG. 24 provides graphs showing simulation results in a case of having the adaptive input $U_{VNS}$ calculated by a non-linear adaptive corrector with the exhaust purification system as a reference article.

In this case, since each exhaust purification system is set as a reference article, even if the adaptive input $U_{VNS}$ is calculated by a non-linear adaptive corrector, it will remain unchanged at the initial value of "1". Therefore, the estimated value $NOX_{HAT}$ of the NOx amount will match the actual NOx amount $NOX_{ACT}$, substantially the same as the aforementioned results shown in FIG. 23. In addition, the estimated value $ST_{UREA}$ of the storage amount is maintained at the target value $ST_{UREA\_CMD}$. At this time, since the actual storage amount is also maintained at the target value $ST_{UREA\_CMD}$, it is possible to maintain the NOx purification rate of the selective reduction catalyst to be high. Therefore, the NOx amount on the downstream side of the selective reduction catalyst is suppressed whenever possible.

Figure 25:
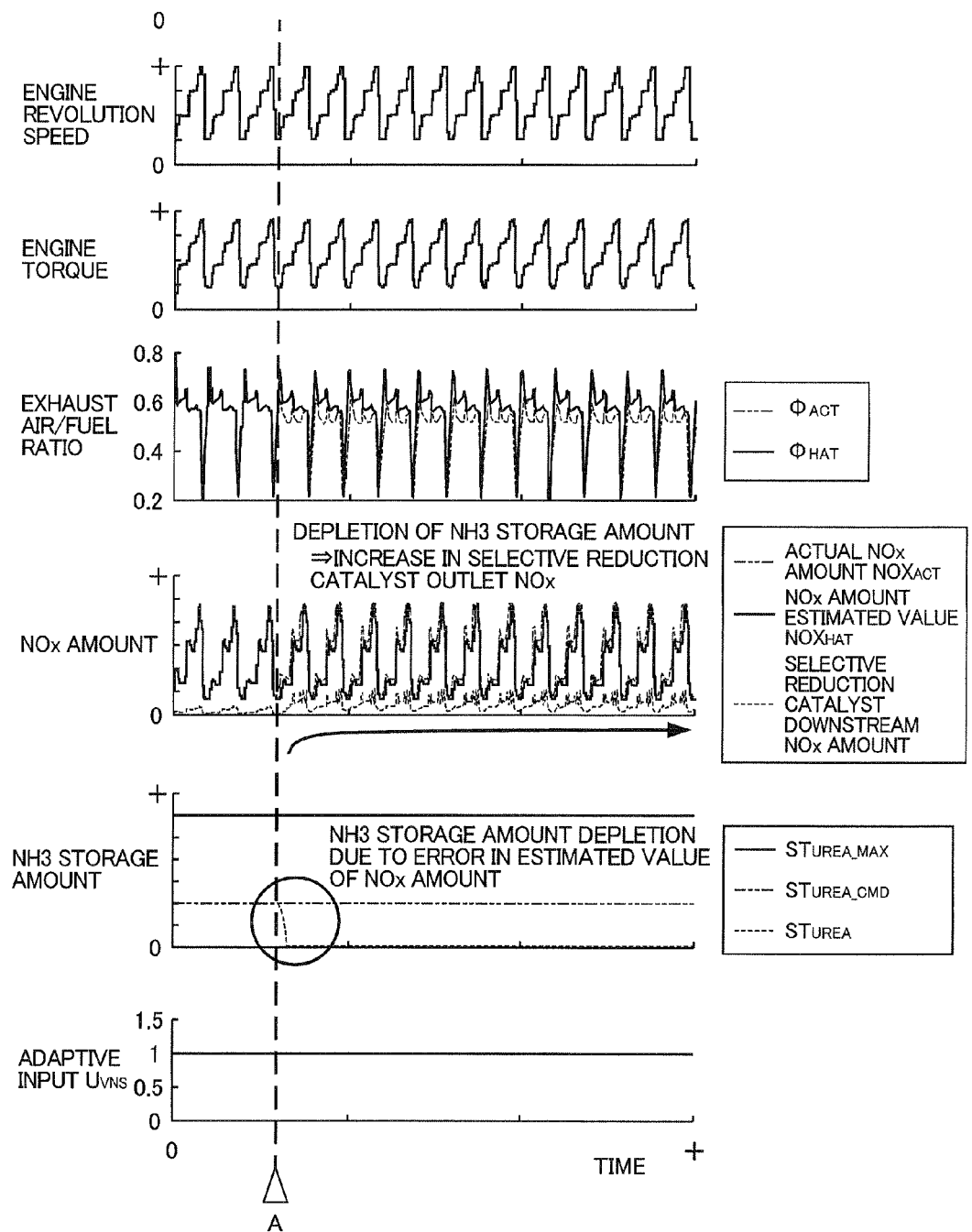
FIG. 25 provides graphs showing simulation results according to the embodiment.

FIG. 25 provides graphs showing simulation results in a case of virtually changing the exhaust purification system from a reference article to a degraded article at time A, and fixing the adaptive input $U_{VNS}$ to "1".

In this case, from time A and onwards, error occurs between the estimated value $NOX_{HAT}$ of the NOx amount and the actual NOx amount $NOX_{ACT}$. In addition, error also occurs between the output $\Phi_{ACT}$ and estimated $\Phi_{HAT}$ of the LAF sensor. However, since the adaptive input $U_{VNS}$ was fixed to "1", the error arising in the estimated value $NOX_{HAT}$ of the NOx amount remains. As a result, the feed-forward injection amount $G_{UREA\_FF}$ enters a state insufficient relative to the actual NOx amount $NOX_{ACT}$, and the feedback injection amount $G_{UREA\_ST}$ is no longer determined adequate so as to maintain the storage amount at the target value $ST_{UREA\_CMD}$. Due to this, the storage amount of the selective reduction catalyst will suddenly decrease, after which it will not recover. As a result, the NOx purification rate of the selective reduction catalyst will decline, and the NOx amount on the downstream side of the selective reduction catalyst will increase.

Figure 26:
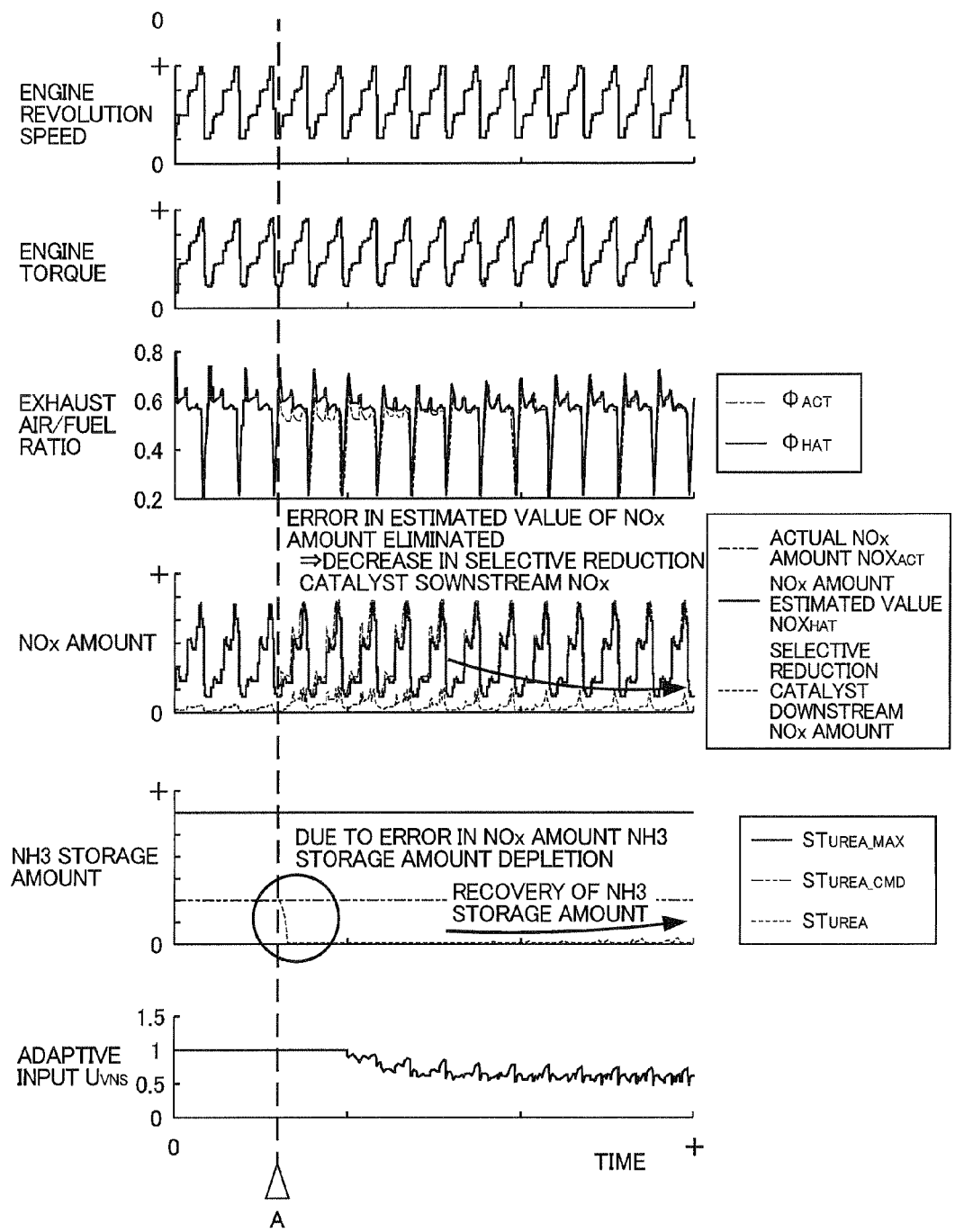
FIG. 26 provides graphs showing simulation results according to the embodiment.

FIG. 26 provides graphs showing simulation results in a case of virtually changing the exhaust purification system from a reference article to a degraded article at time A, and having the adaptive input $U_{VNS}$ calculated by a non-linear adaptive corrector.

In this case, from time A and onwards, error occurs between the estimated value $NOX_{HAT}$ of the NOx amount and the actual NOx amount $NOX_{ACT}$. In addition, error also occurs between the output $\Phi_{ACT}$ and estimated $\Phi_{HAT}$ of the LAF sensor. In accordance with this, the non-linear adaptive corrector corrects the adaptive input $U_{VNS}$ from "1" so as to make the error occurring a minimum. In addition, the error occurring between the estimated value $NOX_{HAT}$ of the NOx amount and the estimated value $\Phi_{HAT}$ of the output of the LAF sensor gradually becomes small by the correction of this adaptive input $U_{VNS}$. As a result, the feed-forward injection amount $G_{UREA\_FF}$ is determined to be adequate relative to the actual NOx amount $NOX_{ACT}$, and an increase in the NOx amount on the downstream side of the selective reduction catalyst is suppressed. In addition, the feedback injection amount $G_{UREA\_ST}$ is also determined so as to maintain the storage amount at the target value $ST_{UREA\_CMD}$. According to this, at time A, the storage amount suddenly decreases temporarily; however, it begins to gradually recover to the target value $ST_{UREA\_CMD}$ of the storage amount.

It has been confirmed from the above that the adaptive virtual sensor system of the present embodiment can demonstrate superior robustness against degradation of the exhaust purification system, and precisely calculate the estimated value $NOX_{HAT}$ of the NOx amount. In addition, it is clear that this adaptive virtual sensor system can demonstrate superior robustness also against variability in solids of the exhaust purification system.

In the present embodiment, the detection means is configured by the LAF sensor 34; and a first estimated value calculating means, second estimated value calculating means, adaptive input calculating means, and controller are configured by the ECU 8, for example.

More specifically, the first estimated value calculating means is configured by the NOx amount estimated value calculating portion 811, the second estimated value calculating means is configured by the LAF sensor output estimated value calculating portion 812, and the adaptive input calculating means is configured by the non-linear adaptive corrector 813, for example. In addition, the controller is configured by the feed-forward injection amount determining portion 82, storage amount target value setting portion 83, feedback injection amount determining portion 84, and adder 85, for example.

Third Embodiment

Next, a third embodiment of the present invention will be explained while referring to the drawings.

In the following explanation of the third embodiment, the same reference symbols are assigned for the same constituent elements as the first embodiment, and explanations thereof are omitted or abbreviated.

Figure 27:
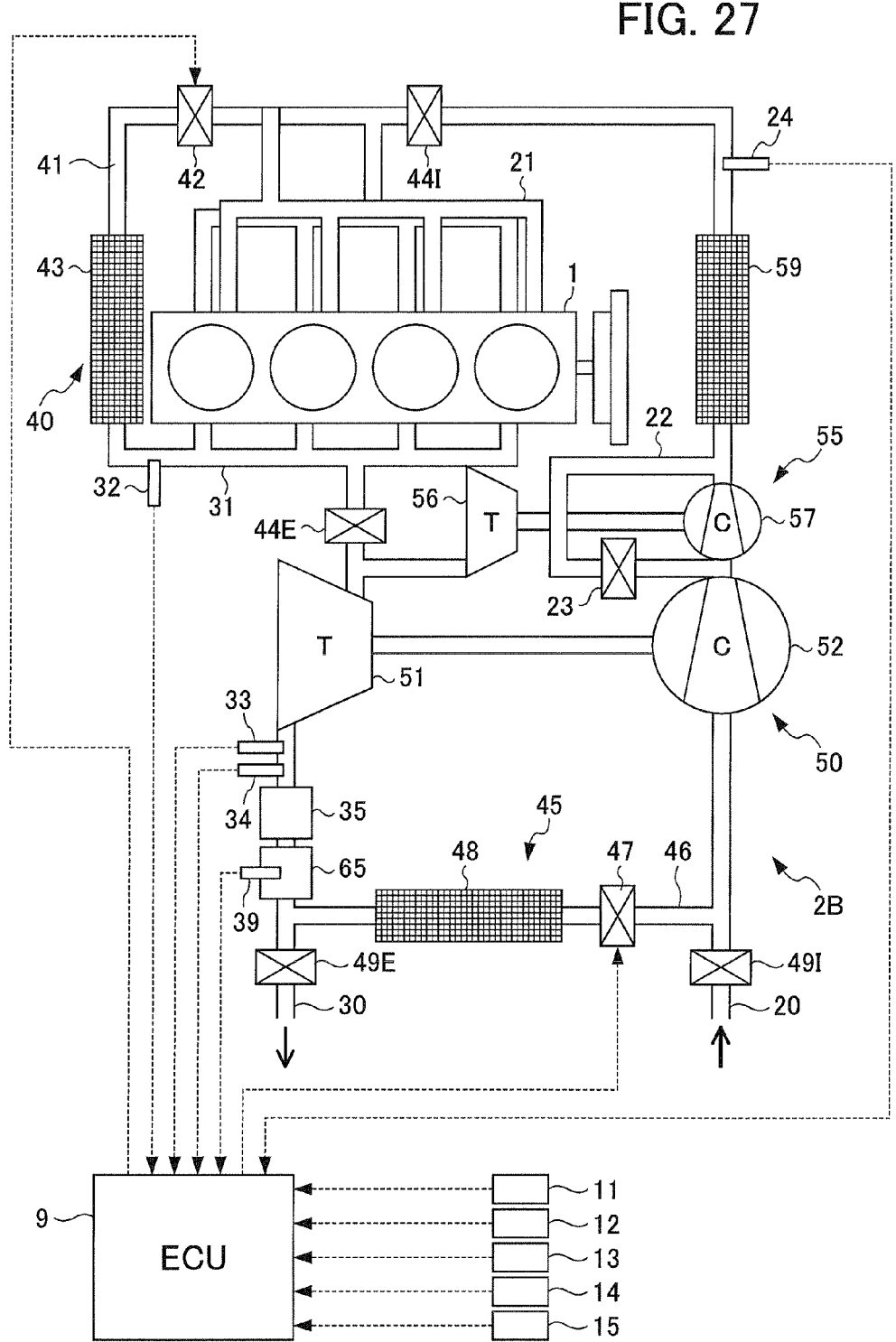
FIG. 27 is a schematic diagram showing configurations of an engine and an exhaust purification system thereof according to a third embodiment of the present invention.

FIG. 27 is a schematic diagram showing configurations of an engine 1 and an exhaust purification system 2B thereof according to the present embodiment.

As shown in FIG. 27, the present embodiment differs from the first embodiment in the aspect of including a NOx purification catalyst 65, and the configuration of an ECU 9.

The exhaust purification system 2B includes the NOx purification catalyst 65 provided in the exhaust plumbing 30 on a downstream side of the oxidation catalyst 35, and purifies NOx in the exhaust flowing through this exhaust plumbing 30.

The NOx purification catalyst 65 adsorbs or occludes NOx in the exhaust when the mixture combusted by the engine is set to leaner than the theoretic air/fuel ratio, and reduces the NOx thus adsorbed or occluded under a reducing atmosphere.

Herein, under a reducing atmosphere refers to an atmosphere of exhaust when the mixture combusted by the engine 1 is set to richer than the theoretical air/fuel ratio (under rich combustion atmosphere), or an atmosphere of exhaust in which a reducing agent is present (reducing agent atmosphere). In addition, this reducing agent atmosphere can occur by leaving the mixture combusted by the engine 1 set to leaner than the theoretical air/fuel ratio, and injecting fuel in the exhaust stroke or expansion stroke (post injection), and by directly injecting fuel into the exhaust plumbing 30.

Hereinafter, the processing to purify NOx in exhaust by setting the exhaust flowing into the NOx purification catalyst 65 to a reducing atmosphere by the aforementioned such methods is referred to as reducing control processing.

As this NOx purification catalyst 65, for example, a catalyst is used that is loaded on a support of alumina ($Al_2O_3$), ceria ($CeO_2$) and a complex oxide of cerium and a rare earth (hereinafter referred to as "ceria-based complex oxide"), and that includes platinum (Pt) acting as a catalyst; ceria or a ceria-based complex oxide having a NOx adsorption capacity; and zeolite having a function of storing ammonia ($NH_3$) generated on the catalyst as ammonium ($NH_4^+$).

In addition to the crank angle position sensor 11, accelerator sensor 12, intake air pressure sensor 24, first exhaust pressure sensor 32, second exhaust pressure sensor 33, LAF sensor 34, first lift sensor 13 and second lift sensor 14, a coolant temperature sensor 15 and NOx purification catalyst temperature sensor 39 are connected to the ECU 9.

The coolant temperature sensor 15 detects a temperature $T_W$ of the coolant of the engine 1, and transmits a signal substantially proportional to the detected value to the ECU 9. The NOx purification catalyst temperature sensor 39 detects a temperature $T_{LNC}$ of the NOx purification catalyst 65, and transmits a signal substantially proportional to the detected value to the ECU 9.

The issues focused on by the inventors of the present application upon configuring the ECU controlling the above such exhaust purification system 2B will be explained.

Figure 28:
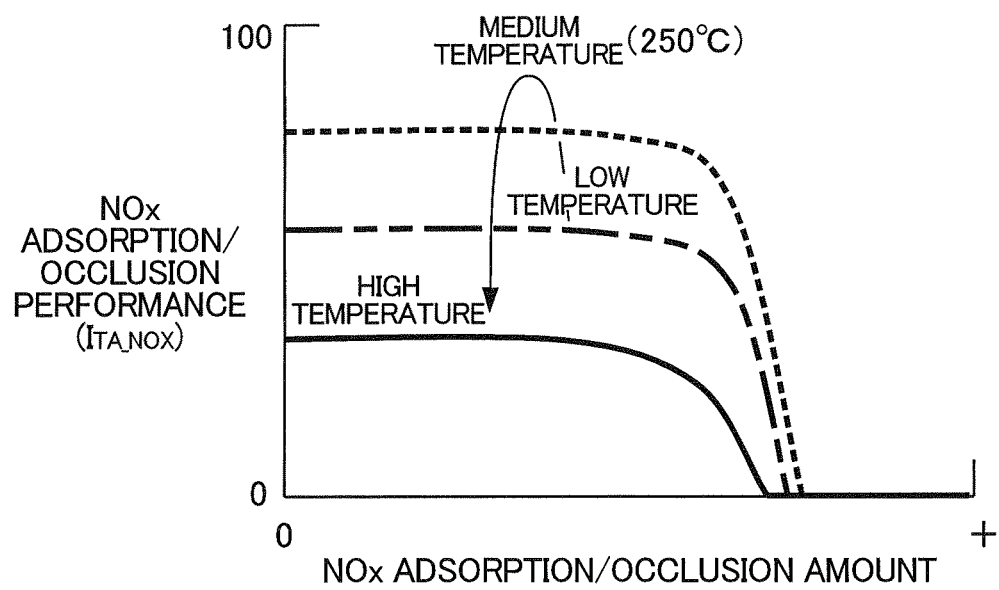
FIG. 28 is a graph showing a relationship between the NOx adsorption/occlusion performance and NOx adsorption/occlusion amount of the NOx purification catalyst according to the embodiment.

FIG. 28 is a graph showing a relationship between NOx adsorption/occlusion performance of the NOx purification catalyst and NOx adsorption/occlusion amount.

As shown in FIG. 28, the NOx adsorption/occlusion performance is substantially constant until the NOx adsorption/occlusion amount reaches a predetermined amount; however, it suddenly decreases when the predetermined amount is exceeded. As a result, in order to continuously maintain high NOx adsorption/occlusion performance, it is preferable to perform reducing control processing at an appropriate timing so that the NOx adsorption/occlusion amount does not become excessive.

In this case, it is necessary to estimate the NOx adsorption/occlusion amount of the NOx purification catalyst. Conventionally, a NOx sensor that detects the NOx amount in the exhaust on an upstream side of the NOx purification catalyst has been provided, and estimation of the NOx adsorption/occlusion amount has been performed based on the detected value of this NOx sensor. However, there are the following such problems in a case of using a NOx sensor in this way.

(7) First, with existing NOx sensors, the monitoring resolution for NOx is not sufficient to estimate the NOx adsorption/occlusion amount with high precision, and there is large variability in solids. As a result, the estimated value of the NOx adsorption/occlusion amount may be shifted from the actual value, and the timing at which to execute reducing control processing may become inappropriate. Therefore, there is concern over NOx from the NOx purification catalyst saturating and the amount of NOx discharged to the downstream side of the NOx purification catalyst increasing.

(8) In addition, with existing NOx sensors, the responsiveness is not sufficient to estimate the NOx adsorption/occlusion amount with high precision. As a result, a large sensing delay will arise during a transition in particular, a result of which the estimated value of the NOx adsorption/occlusion amount is shifted from the actual value, and the timing at which to execute reducing control processing may become inappropriate. Therefore, there is concern over the NOx purification catalyst entering a saturated state, and the NOx amount discharged to the downstream side of the NOx purification catalyst increasing.

(9) In addition, existing NOx sensors cannot suddenly rise in temperature in order to prevent breaking of the sensor element. As a result, after startup of the engine, it may take several hundreds of seconds until the NOx sensor reaches activity. Therefore, the NOx adsorption/occlusion amount cannot be estimated in this duration due to the output of the NOx sensor not being able to be used.

(10) In the aforementioned second embodiment, estimating the reducing agent amount in the exhaust is relatively easy since the reducing agent, i.e. urea water, is directly injected into the exhaust by way of the urea injection device. In contrast, with the present embodiment, the reducing agent amount in the exhaust complexly varies according to the combustion in the combustion chambers and exhaust plumbing, i.e. operating state of the engine, due to using fuel as the reducing agent. As a result, it is difficult to estimate the amount of reducing agent with the conventional method.

Hereinafter, the configuration of the control device of the exhaust purification system 2B made taking the above such problems into account will be explained. As explained in detail below, in the present embodiment, an adaptive virtual sensor network is developed that calculates an estimated value for the NOx amount in exhaust and an estimated value of the amount of reducing agent in the exhaust, similarly to the estimated value of the Inert-EGR amount in the exhaust purification system of the first embodiment. In other words, with the present embodiment, the NOx amount and the amount of reducing agent in the exhaust are estimated using a neural network, and furthermore, reducing control processing is executed based on these estimated values of the NOx amount and amount of reducing agent.

Figure 29:
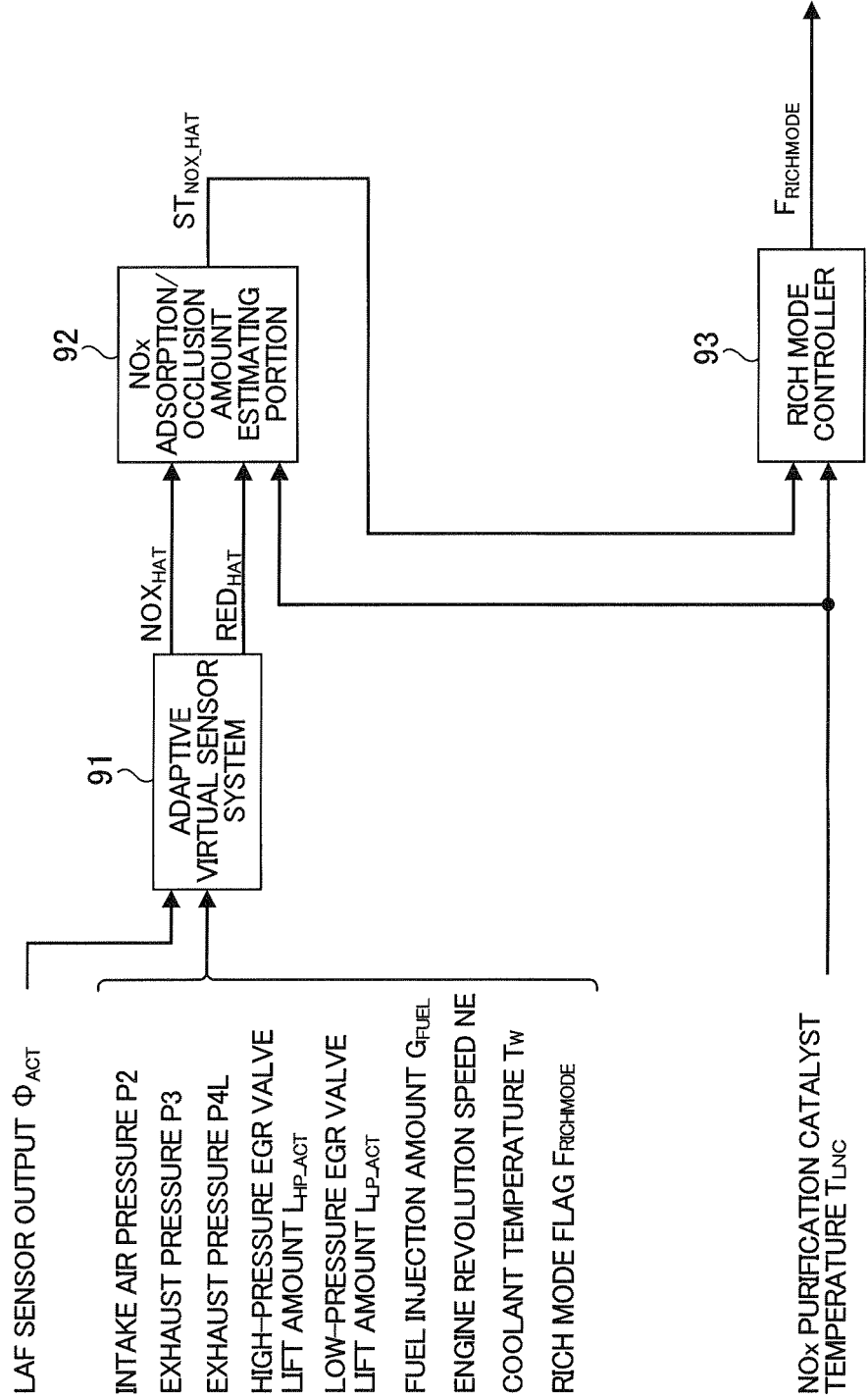
FIG. 29 is a block diagram showing a configuration of a control device of the exhaust purification system according to the embodiment.

FIG. 29 is a block diagram showing a configuration of a control device of the exhaust purification system 2B. It should be noted that only the configuration of the exhaust purification system 2B related to the execution of reducing control processing is illustrated in FIG. 29. More specifically, only the module configured by the ECU relating to determination of a rich mode flag $F_{RICHMODE}$ configured by the ECU is illustrated.

The rich mode flag $F_{RICHMODE}$ is a flag indicating that it is a period in which to execute the aforementioned reducing control processing. In other words, execution of the reducing control processing is instructed by setting the rich mode flag $F_{RICHMODE}$ to "1". The reducing control processing is executed by a module that is not illustrated, based on this instruction.

In addition, interruption of the reducing control processing is instructed by returning this rich mode flag $F_{RICHMODE}$ to "0". The aforementioned reducing control processing is interrupted based on this instruction.

This module is configured to include an adaptive virtual sensor system 91, NOx adsorption/occlusion amount estimating portion 92, and rich mode controller 93.

The adaptive virtual sensor system 91 calculates an estimated value $NOX_{HAT}$ of the NOx amount in the exhaust flowing into the NOx purification catalyst and an estimated value $RED_{HAT}$ of the amount of reducing agent in the exhaust flowing into the NOx purification catalyst, based on the detected values P2, P3, P3L, $\Phi_{ACT}$, $L_{HP\_ACT}$, $L_{LP\_ACT}$ $T_w$ of the plurality of sensors 24, 32, 33, 34, 13, 14 and 15, respectively, as well as the rich mode flag $F_{RICHMODE}$.

Figure 30:
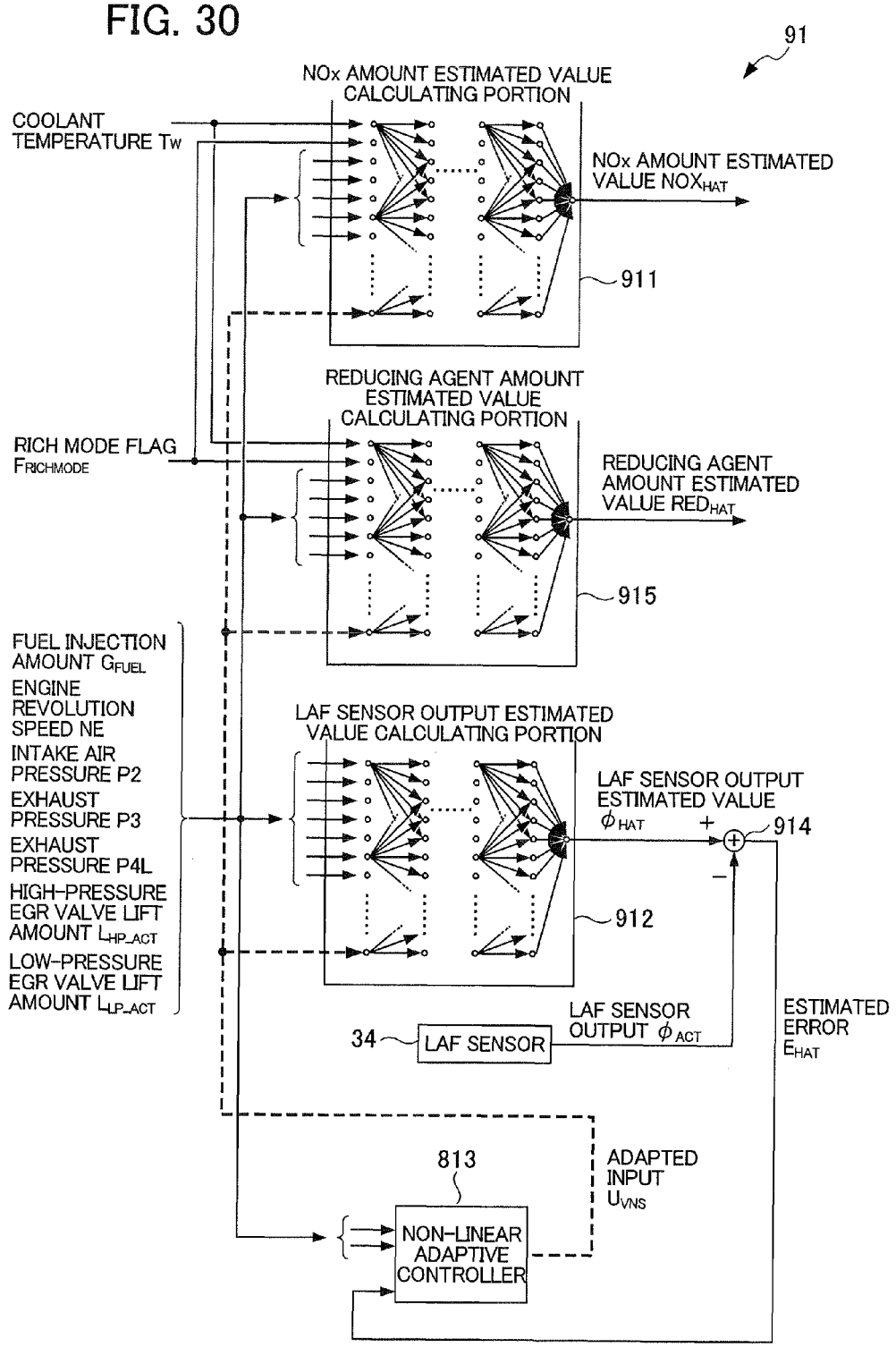
FIG. 30 is a block diagram showing a configuration of an adaptive virtual sensor system according to the embodiment.

FIG. 30 is a block diagram showing the configuration of the adaptive virtual sensor system 91.

The adaptive virtual sensor system 91 is configured to include a NOx amount estimated value calculating portion 911 that calculates the estimated value $NOX_{HAT}$ of the NOx amount, a reducing agent amount estimated value calculating portion 915 that calculates the estimated value $RED_{HAT}$ of the amount of reducing agent, an LAF sensor output estimated value calculating portion 912 that calculates the estimated value $\Phi_{HAT}$ for the output (exhaust air/fuel ratio) of the LAF sensor 34, and a non-linear adaptive corrector 913 that calculates the adaptive input $U_{VNS}$.

With this adaptive virtual sensor system 91, in order to solve the aforementioned problems (7) to (10), the estimated value $NOX_{HAT}$ of the NOx amount and the estimated value $RED_{HAT}$ of the amount of reducing agent are calculated similarly to the aforementioned estimation of the Inert-EGR amount in the first embodiment.

In other words, with the adaptive virtual sensor system 91 of the present embodiment, the estimated value $NOX_{HAT}$ of the NOx amount and the estimated amount $RED_{HAT}$ of the amount of reducing agent are calculated by the NOx amount estimated value calculating portion 911 and the reducing agent amount estimated value calculating portion 915 constructed by neural networks. Furthermore, the estimated value $\Phi_{HAT}$ of the exhaust air/fuel ratio, which is a separate physical quantity from this NOx amount and amount of reducing agent, and is a physical quantity correlated to the NOx amount and amount of reducing agent, is calculated by the LAF sensor output estimated value calculating portion 912, which has a neural network structure similar to the NOx amount estimated value calculating portion 911 and the reducing agent amount estimated value calculating portion 915. It should be noted that the neural network structures of this NOx amount estimated value calculating portion 811, reducing agent amount estimated value calculating portion 915 and LAF sensor output estimated value calculating portion 912 are each substantially the same configuration as the neural network structure of the Inert-EGR estimated value calculating portion 711 and LAF sensor output estimated value calculating portion 712 of the first embodiment; therefore, detailed explanations thereof will be omitted.

Furthermore, estimated error $E_{HAT}(k)$ between the estimated value $\Phi_{HAT}(k)$ of the exhaust air/fuel ratio calculated and the detected value $\Phi_{ACT}(k)$ of the LAF sensor 34 is calculated by the adder 914, as shown in the following formula (47).

$$E_{HAT}(k)=\Phi_{HAT}(k)-\Phi_{ACT}(k) \tag{47}$$

Furthermore, with the non-linear adaptive corrector 913, the adaptive input $U_{VNS}$ to be commonly input to the NOx amount estimated value calculating portion 911, reducing agent amount estimated value calculating portion 915, and LAF sensor output estimated value calculating portion 912 is calculated so that the estimated error $E_{HAT}$ calculated becomes a minimum. It should be noted that this non-linear adaptive corrector 913 is substantially the same configuration as the non-linear adaptive corrector 713 of the first embodiment; therefore, a detailed explanation thereof will be omitted.

Next, learning of the neural network for estimating the NOx amount and amount of reducing agent will be explained.

First, components of the input vector U(k) to the neural network are defined as shown in the following formula (48). In this way, the components of the input vector U(k) include a plurality of physical quantities required for estimating the NOx amount and amount of reducing agent (coolant temperature $T_W$, rich mode flag $F_{RICHMODE}$, fuel injection amount $G_{FUEL}$, intake air pressure P2, exhaust pressure P3, exhaust pressure P3L, detected value $L_{HP\_ACT}$ of high-pressure EGR valve lift amount, detected value $L_{LP\_ACT}$ of low-pressure EGR valve lift amount, and engine revolution speed NE), and the adaptive input $U_{VNS}$. In addition, data related to such a variety of different physical quantities are included, as well as data related to physical quantities at different times are included in the components of the input vector.

$$U(k) = \begin{Bmatrix} T_w(k) \\ F_{RICHMODE}(k) \\ G_{FUEL}(k) \\ G_{FUEL}(k-1) \\ G_{FUEL}(k-2) \\ P2(k) \\ P2(k-1) \\ P3(k) \\ P3(k-1) \\ P4L(k) \\ P4L(k-1) \\ L_{LP}(k) \\ L_{LP}(k-1) \\ L_{HP}(k) \\ L_{HP}(k-1) \\ NE(k) \\ NE(k-1) \\ NE(k-2) \\ U_{VNS}(k-1) \end{Bmatrix} \quad (48)$$

In addition, the output Y(k) of the neural network relative to such an input vector U(k) is defined as the estimated value $NOX_{HAT}(k)$ of the NOx amount and the estimated value $RED_{HAT}(k)$ of the amount of reducing agent, as shown in the following formulas (49) and (50).

$$NOX_{HAT}(k)=Y(k) \quad (49)$$

$$RED_{HAT}(k)=Y(k) \quad (50)$$

Learning of the neural network sets the input vector U(k) and output Y(k) in the above described way, and is performed according to a similar sequence as the aforementioned first embodiment. In other words, the at least two of the reference article and degraded article of the exhaust purification system are prepared, and data showing the relationships between the components of the input vector U and the NOx amount and amount of reducing agent in the exhaust is acquired for each exhaust purification system prepared. Learning of the neural network is further performed based on this acquired data.

Here in particular, data for a case of having the coolant temperature $T_W$ of the invention vary is also acquired. By carrying out learning of the neural network based on such data, it is possible to improve the estimation accuracy of the NOx amount in the exhaust in the course of warming up the engine, and solve the aforementioned problem (9).

In addition, learning in the neural network of the LAF sensor output estimated value calculating portion 912 is also performed according to a sequence similar to the aforementioned neural network of the NOx amount estimated value calculating portion 911 and reducing agent amount estimated value calculating portion 915.

The NOx adsorption/occlusion amount estimating portion 92 calculates the estimated value $ST_{NOX\_HAT}$ of the NOx adsorption/occlusion amount of the NOx purification catalyst, based on the estimated value $NOX_{HAT}$ of the NOx amount and the estimated value $RED_{HAT}$ of the amount of reducing agent calculated by the adaptive virtual sensor system 91.

With this NOx adsorption/occlusion amount estimating portion 92, the estimated value $ST_{NOX\_HAT}(k)$ of the NOx adsorption/occlusion amount is calculated by performing a computation such as those shown in the following formulas (51) and (52) every predetermined computation cycle. It should be noted that, in the following formula (51), $ST_{NOX\_MAX}(k)$ indicates the maximum NOx adsorption/occlusion amount of the NOx purification catalyst.

$$ST_{NOX\_HAT}(k) = \quad (51)$$
$$\begin{cases} ST_{NOX\_MAX}(k) & (ST_{NOX\_TMP}(k) > ST_{NOX\_MAX}(k)) \\ ST_{NOX\_TMP}(k) & (0 \leq ST_{NOX\_TMP}(k) \leq ST_{NOX\_MAX}(k)) \\ 0 & (ST_{NOX\_TMP}(k) < 0) \end{cases}$$

$$ST_{NOX\_TMP}(k) = \quad (52)$$
$$ST_{NOX\_HAT}(k-1) + I_{TA\_NOX}(k)NOX_{HAT}(k) - K_{RED}RED_{HAT}(k)$$

Figure 31:
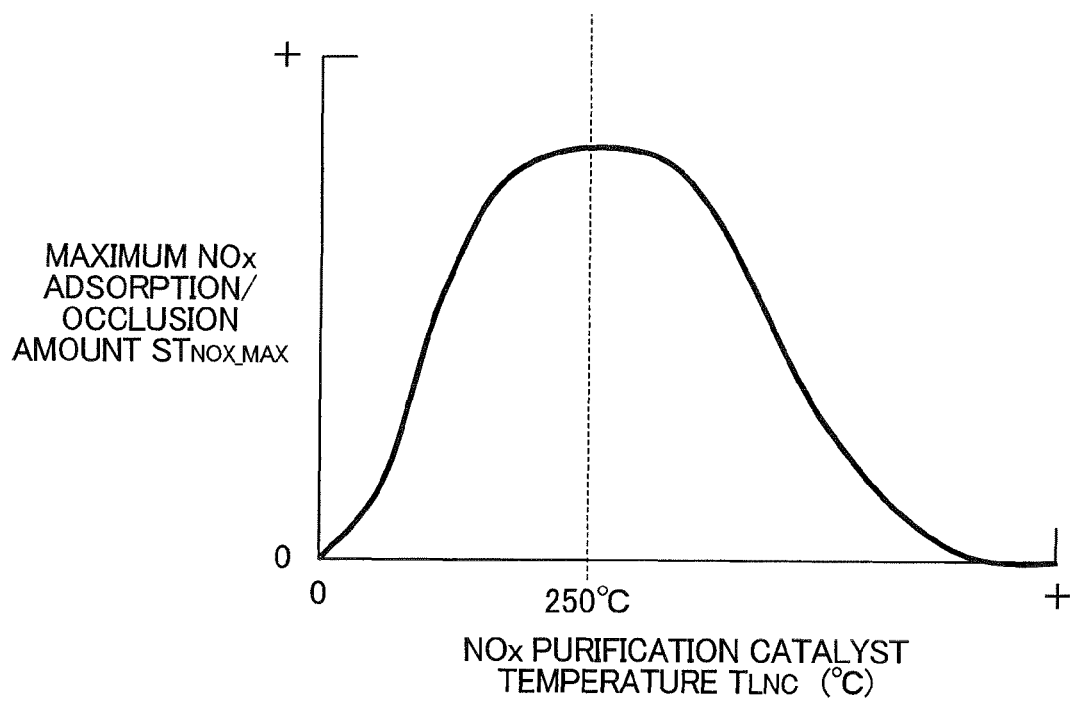
FIG. 31 is a graph showing a relationship between the maximum NOx adsorption/occlusion amount of the NOx purification catalyst and the NOx purification catalyst temperature.

FIG. 31 is a graph showing a relationship between the maximum NOx adsorption/occlusion amount $ST_{NOX\_MAX}$ of the NOx purification catalyst and the NOx purification catalyst temperature $T_{LNC}$.

As shown in this figure, the maximum NOx adsorption/occlusion amount $ST_{NOX\_MAX}$ varies depending on the NOx purification catalyst temperature $T_{LNC}$. In the above formula (51), the maximum NOx adsorption/occlusion amount $ST_{NOX\_MAX}(k)$ is calculated by searching a map such as that shown in this figure, based on the NOx purification catalyst temperature $T_{LNC}(k)$.

In addition, in the above formula (52), the right side second term indicates the increased amount due to NOx in the exhaust being adsorbed/occluded, and the right side third term indicates the decreased amount due to NOx being reduced.

In other words, $I_{TA\_NOX}(k)$ of the right side second term indicates the estimated value of the NOx adsorption/occlusion performance of the NOx purification catalyst. This estimated value $I_{TA\_NOX}(k)$ of the NOx adsorption/occlusion performance is calculated by searching a map such as that shown in the aforementioned FIG. 28, based on the NOx purification catalyst temperature $T_{LNC}(k)$ and the estimated value $ST_{NOX\_HAT}(k)$ of the NOx adsorption/occlusion amount, for example.

In addition, the coefficient $K_{RED}$ of the right side third term is a conversion factor that converts from reducing agent amount to NOx amount. More specifically, it shows the amount of NOx that can be reduced by reducing agent of a predetermined amount.

The rich mode controller 93 sets the rich mode flag $F_{RICHMODE}(k)$ based on a comparison between two threshold values $ST_{RICH\_ON}(k)$ and $ST_{RICH\_OFF}(k)$, and the estimated value $ST_{NOX\_HAT}(k)$ of the NOx adsorption/occlusion amount.

More specifically, the rich mode controller 93 sets the rich mode flag $F_{RICHMODE}(k)$ from "0" to "1", in a case of the estimated value $ST_{NOX\_HAT}(k)$ of the NOx adsorption/occlusion amount exceeding $ST_{RICH\_ON}(k)$. In addition, the rich mode controller 93 returns the rich mode flag $F_{RICHMODE}(k)$ from "1" to "0", in a case of the estimated value $ST_{NOX\_HAT}(k)$ of the NOx adsorption/occlusion amount falling below $ST_{RICH\_OFF}(k)$.

Moreover, these threshold values $ST_{RICH\_ON}(k)$ and $ST_{RICH\_OFF}(k)$ are each calculated by multiplying a coefficient $K_{RON}$ and $K_{ROFF}$ by the maximum NOx adsorption/occlusion amount $ST_{NOX\_MAX}(k)$ set by searching the map shown in FIG. 31, as shown in the following formulas (53) and (54). Herein, the coefficient $K_{RON}$ is set to 0.80, for example, and the coefficient $K_{ROFF}$ is set to 0.15, for example.

$$ST_{RICH\_ON}(k)=K_{RON}ST_{NOX\_MAX}(k) \quad (53)$$

$$ST_{RICH\_OFF}(k)=K_{ROFF}ST_{NOX\_MAX}(k) \quad (54)$$

Next, simulation results of reducing control processing of the present embodiment configured in the above way will be described in detail while referring to FIGS. 32 to 35.

Figure 32:
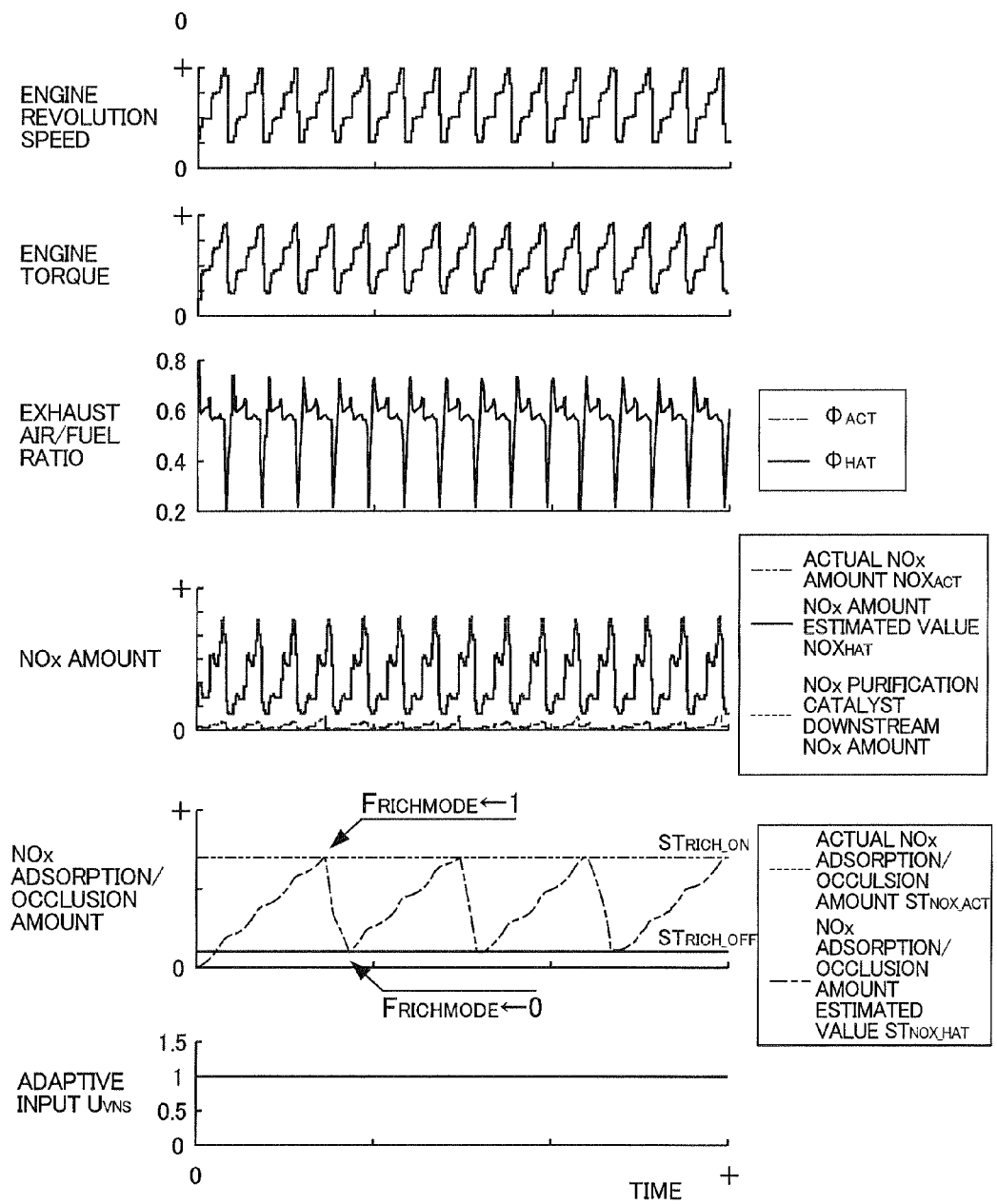
FIG. 32 provides graphs showing simulation results according to the embodiment.

FIG. 32 provides graphs showing simulation results in a case of fixing the adaptive input $U_{VNS}$ to "1", with the exhaust purification system as a reference article.

In this case, since the exhaust purification system is set as a reference article, the estimated value $NOX_{HAT}$ of the NOx amount will match the actual NOx amount $NOX_{ACT}$, even if the adaptive input $U_{VNS}$ is forcibly fixed to "1". Due to this, the estimated value $ST_{NOX\_HAT}$ of the NOx adsorption/occlusion amount matches the actual NOx adsorption/occlusion amount $ST_{NOX\_ACT}$. As a result, the timing at which to execute the reducing control processing is appropriately maintained. Therefore, the NOx amount on the downstream side of the NOx purification catalyst is suppressed whenever possible.

Figure 33:
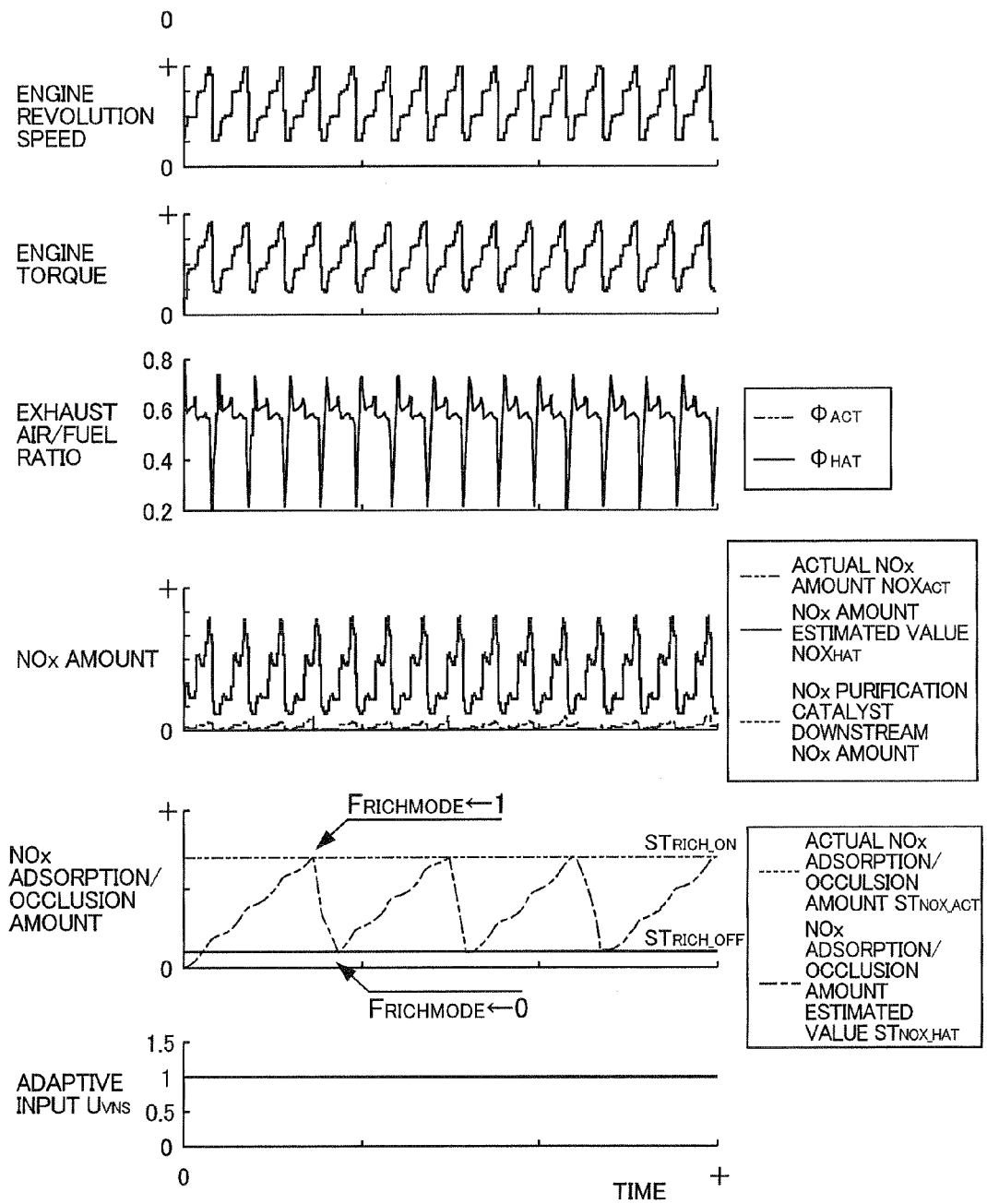
FIG. 33 provides graphs showing simulation results according to the embodiment.

FIG. 33 provides graphs showing simulation results in a case of having the adaptive input $U_{VNS}$ calculated by a non-linear adaptive corrector with the exhaust purification system as a reference article.

In this case, since each exhaust purification system is set as a reference article, even if the adaptive input $U_{VNS}$ is calculated by a non-linear adaptive corrector, it will remain unchanged at the initial value of "1". Therefore, the estimated value $NOX_{HAT}$ of the NOx amount will match the actual NOx amount $NOX_{ACT}$, substantially the same as the aforementioned results shown in FIG. 32. In addition, the estimated value $ST_{NOX\_HAT}$ of the NOx adsorption/occlusion amount matches the actual NOx adsorption/occlusion amount $ST_{NOX\_ACT}$. As a result, the timing at which to execute the reducing control processing is appropriately maintained. Therefore, the NOx amount on the downstream side of the NOx purification catalyst is suppressed whenever possible.

Figure 34:
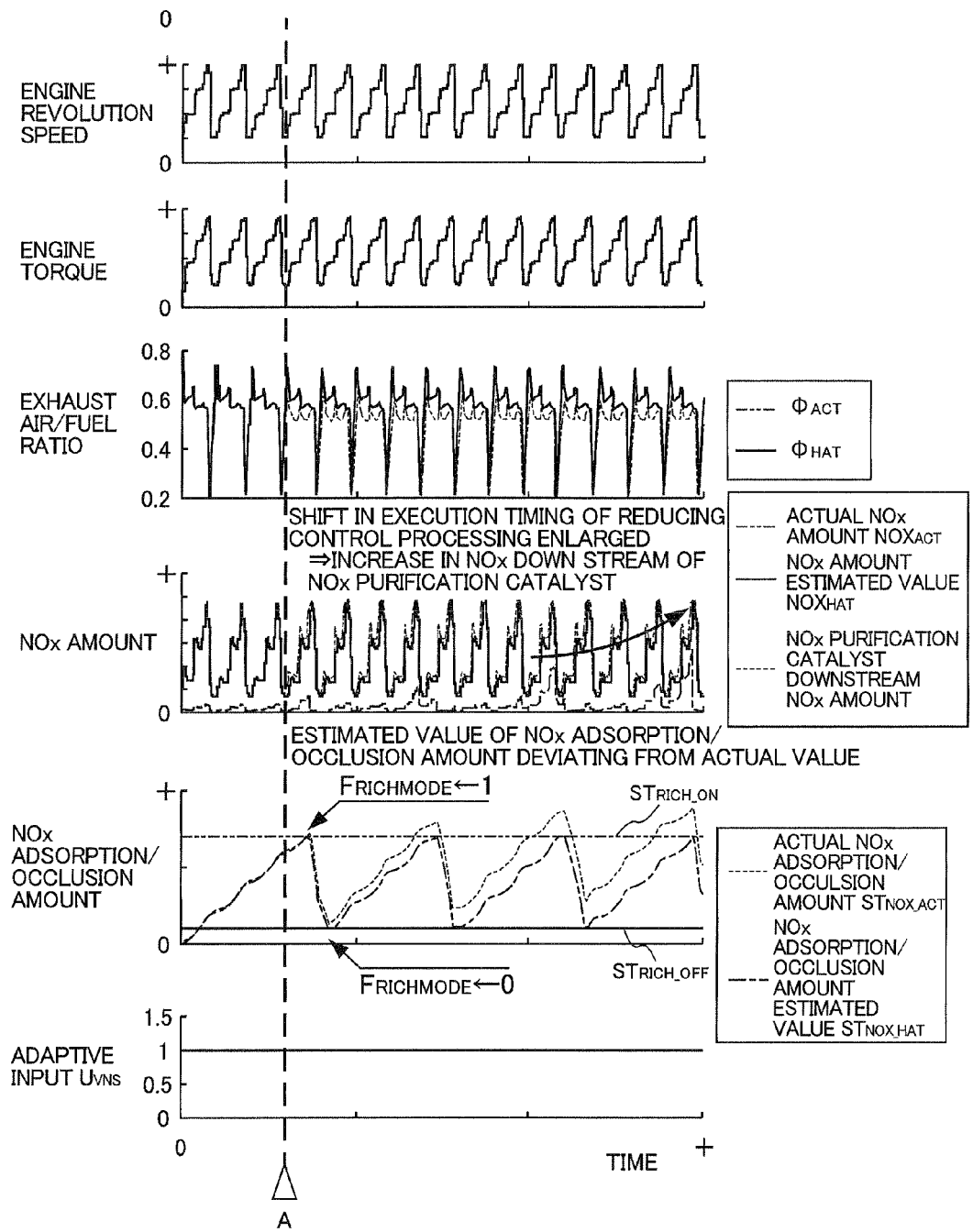
FIG. 34 provides graphs showing simulation results according to the embodiment.

FIG. 34 provides graphs showing simulation results in a case of virtually changing the exhaust purification system from a reference article to a degraded article at time A, and fixing the adaptive input $U_{VNS}$ to "1".

In this case, from time A and onwards, error occurs between the estimated value $NOX_{HAT}$ of the NOx amount and the actual NOx amount $NOX_{ACT}$. In addition, error also occurs between the output $\Phi_{ACT}$ and estimated $\Phi_{HAT}$ of the LAF sensor. However, since the adaptive input $U_{VNS}$ was fixed to "1", the error arising in the estimated value $NOX_{HAT}$ of the NOx amount remains. Due to this, the error between the estimated value $ST_{NOX\_HAT}$ of the NOx adsorption/occlusion amount and the actual NOx adsorption/occlusion amount $ST_{NOX\_ACT}$ gradually increases. As a result, the timing at which to execute the reducing control processing begins to shift from the appropriate timing.

In other words, the reducing control processing will no longer be executed, irrespective of the actual NOx adsorption/occlusion amount $ST_{NOX\_ACT}$ exceeding the threshold value $ST_{RICH\_ON}$. As a result, the NOx purification catalyst will enter a saturated state, a result of which the NOx amount on the downstream side of the NOx purification catalyst will increase.

Figure 35:
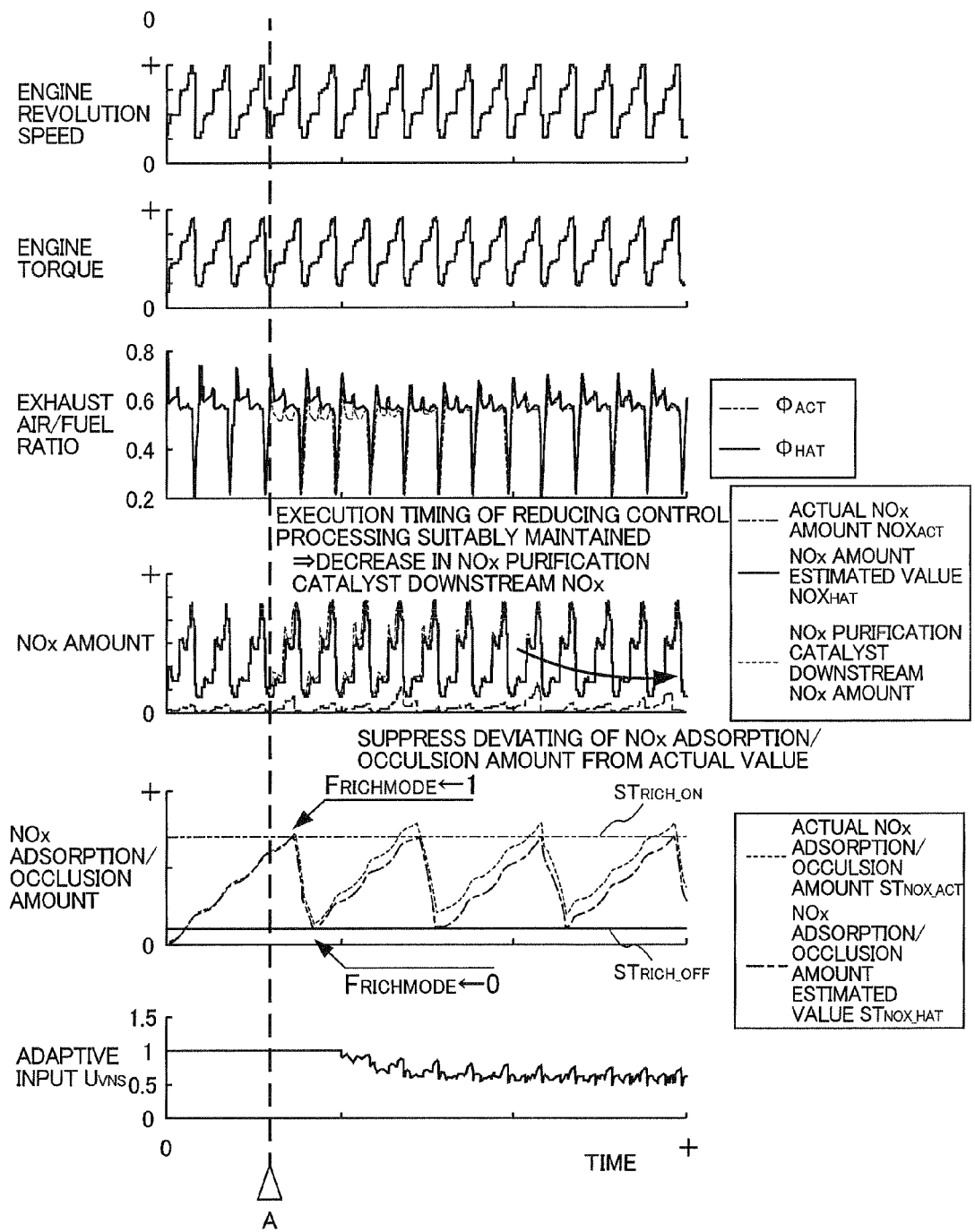
FIG. 35 provides graphs showing simulation results according to the embodiment.

FIG. 35 provides graphs showing simulation results in a case of virtually changing the exhaust purification system from a reference article to a degraded article at time A, and having the adaptive input $U_{VNS}$ calculated by a non-linear adaptive corrector.

In this case, from time A and onwards, error occurs between the estimated value $NOX_{HAT}$ of the NOx amount and the actual NOx amount $NOX_{ACT}$. In addition, error also occurs between the output $\Phi_{ACT}$ and estimated $\Phi_{HAT}$ of the LAF sensor. In accordance with this, the non-linear adaptive corrector corrects the adaptive input $U_{VNS}$ from "1" so as to make the error occurring a minimum. In addition, the error occurring between the estimated value $NOX_{HAT}$ of the NOx amount and the estimated value $\Phi_{HAT}$ of the output of the LAF sensor gradually becomes small by the correction of this adaptive input $U_{VNS}$. As a result, the estimated value $ST_{NOX\_HAT}$ of the NOx adsorption/occlusion amount can be suppressed from greatly shifting from the actual NOx adsorption/occlusion amount. Therefore, it is possible to prevent the NOx purification catalyst from entering a saturated state, and it is thereby possible to suppress an increase in the NOx amount on the downstream side of the NOx purification catalyst.

It has been confirmed from the above that the adaptive virtual sensor system of the present embodiment can demonstrate superior robustness against degradation of the exhaust purification system, and precisely calculate the estimated value $NOX_{HAT}$ of the NOx amount. In addition, it is clear that this adaptive virtual sensor system can demonstrate superior robustness also against variability in solids of the exhaust purification system.

In the present embodiment, the detection means is configured by the LAF sensor 34; and a first estimated value calculating means, second estimated value calculating means, adaptive input calculating means, and controller are configured by the ECU 9, for example.

More specifically, the first estimated value calculating means is configured by the NOx amount estimated value calculating portion 911 and the reducing agent amount estimated value calculating portion 915, the second estimated value calculating means is configured by the LAF sensor output estimated value calculating portion 912, and the adaptive input calculating means is configured by the non-linear adaptive corrector 913, for example. In addition, the controller is configured by the NOx adsorption/occlusion amount estimating portion 92 and the rich mode controller 93, for example.

It should be noted that the present invention is not limited to the aforementioned embodiments, and various modifications thereto are possible.

For example, although a hierarchical-type perceptron such as that shown in FIG. 6 is used as the neural network in the above embodiments, it is not limited thereto. Alternatively, a restricted Boltzmann machine, a recurrent neural network using a past value of an output as an input, a chaos type neural network using time series data of each data in the input, a self-organizing map (SOM) in which high precision estimation is possible without using multiple layers or neurons, and an RBF neural network may be used as the neural network structure.

Although the adaptive input depending on the estimated error and reference parameters is calculated by a non-linear adaptive corrector in the above embodiments (refer to aforementioned FIGS. 8 to 11), it is not limited thereto. For example, calculating the adaptive input using sliding mode control, back stepping control, PID control, and a known feedback algorithm such as an optimum control algorithm is also effective.

With the non-linear adaptive corrector of the above embodiments, the weighting function is defined in two-dimensional space with two reference parameters (engine revolution speed, fuel injection amount) as the domain, and the adaptive input $U_{VNS}$ is calculated using this weighting function; however, it is not limited thereto. In other words, the number of dimensions of the space defining the weighting function and the type of physical quantities used as the reference parameters are not limited to the examples illustrated in the above embodiments. The number of dimensions of the space may be one dimension or three or more dimensions. In addition, the intake air pressure P2, exhaust pressures P3 and P3L, EGR valve lift amounts $L_{LP}$ and $L_{HP}$, and the like may be employed as the physical quantities used as reference parameters.

With the non-linear adaptive corrector of the above embodiments, the local adaptive input $U_{ij}$ of every region is calculated using a sliding mode control algorithm (refer to above formulas (26) to (30)); however, it is not limited thereto. For example, the local adaptive input $U_{ij}$ of every region may be calculated using back stepping control, PID control, and a known feedback algorithm such as an optimum control algorithm.

Although the Inert-EGR amount is estimated in the above first embodiment, it is not limited thereto. Not only the Inert-EGR amount indicating the inert portion of the overall EGR amount, but also the overall EGR amount is a physical quantity for which detection using a sensor is difficult. As a result, estimating the EGR amount by way of an adaptive virtual sensor system, and determining the operation amount of each EGR valve based on this estimated is also effective.

With the adaptive virtual sensor system of the above-mentioned second embodiment, the estimated value of the NOx amount in the exhaust flowing into the selective reduction catalyst that can be purified by the selective reduction catalyst is calculated as $NOX_{HAT}$, taking into account of the NOx purification rate of the selective reduction catalyst varying depending on the ratio of $NO_2$ to NOx in the exhaust; however, it is not limited thereto. In other words, the influence from the ratio of $NO_2$ to NOx is taken into account by the layer of the output of the neural network; however, it is not limited thereto.

For example, the two of the neural network calculating an estimated value of the NOx amount in the exhaust and a similar neural network calculating an estimated value of the $NO_2$ amount in the exhaust may be prepared, and the influence from the ratio of $NO_2$ to NOx may be taken into account at the stage determining the urea injection amount $G_{UREA}$, based on these outputs.

Although an example employing the present invention in an exhaust purification system of urea addition type has been illustrated in the above-mentioned second embodiment, in which ammonia is set as the reducing agent and urea water is supplied as an additive serving as a source of this reducing agent, it is not limited thereto.

For example, ammonia may be supplied directly, without supplying urea water and generating ammonia from this urea water. In addition, the additive serving as the source of ammonia is not limited to urea water, and another additive may be employed. Furthermore, the reducing agent for reducing NOx is not limited to ammonia. The present invention can also be applied to an exhaust purification system in which hydrocarbons are used in place of ammonia as the reducing agent for reducing NOx, for example.

The invention claimed is:

1. A control device for a plant, comprising:
a first estimated value calculating means for calculating an estimated value of a first physical quantity, which is at least one of a plurality of physical quantities indicating a state of the plant, by way of a predetermined algorithm based on a plurality of inputs;
a second estimated value calculating means for calculating an estimated value of a second physical quantity, which correlates with the first physical quantity, by way of a predetermined algorithm based on a plurality of inputs;
a detection means for detecting the second physical quantity; and
an adaptive input calculating means for calculating an adaptive input to be mutually inputted to the first estimated value calculating means and the second estimated value calculating means, so that deviation between a detected value of the second physical quantity detected by way of the detection means and the estimated value of the second physical quantity calculated by way of the second estimated value calculating means becomes a minimum,
wherein a predetermined control variable of the plant is controlled based on the estimated value of the first physical quantity.

2. A control device for a plant according to claim 1, wherein the algorithm of the first estimated value calculating means and the algorithm of the second estimated value calculating means are each a neural network configured by joining a plurality of neurons that output according to a predetermined function.

3. A control device for a plant according to claim 2, wherein data related to a physical quantity at a plurality of different times are included in a plurality of inputs to the first estimated value calculating means and a plurality of inputs to the second estimated value calculating means, respectively.

4. A control device for a plant according to claim 1, wherein the adaptive input calculating means includes:
a weighting function setting means for defining a plurality of regions overlapping each other in a space in which at least one among a plurality of inputs to the first estimated value calculating means and a plurality of inputs to the second estimated value calculating means is defined as a reference parameter, and the reference parameter is set as a base thereof, and for setting a plurality of weighting functions that is normalized to have a value that is not "0" in each of the regions, respectively;
a corrected value calculating means for calculating a corrected value ($U_{ij}$) in each of the regions so that a product of a value of the weighting functions and the deviation become a minimum; and
a determination means for determining an adaptive input based on a sum total of products of the value of the weighting functions and the corrected value over all of the regions.

5. A control device for a plant according to claim 1, wherein the plant is an exhaust purification system of an internal combustion engine including an exhaust recirculation device that recirculates a portion of exhaust flowing through an exhaust system of the internal combustion engine to an intake system of the internal combustion engine, and
wherein the first physical quantity of the plant includes a parameter related to exhaust to be recirculated in the internal combustion engine by way of the exhaust recirculation device.

6. A control device for a plant according to claim 5, wherein the exhaust recirculation device includes an exhaust recirculation channel that recirculates a portion of exhaust flowing through the exhaust system to the intake system, and an exhaust recirculation control valve that is provided in the exhaust recirculation channel; and
wherein the control device further comprises a controller that determines an operation amount of the exhaust recirculation control valve so that the estimated value of the parameter related to exhaust to be recirculated matches a predetermined target value.

7. A control device for a plant according to claim 5, wherein the second physical quantity is an air/fuel ratio of exhaust flowing through the exhaust system.

8. A control device for a plant according to claim 1,
wherein the plant is an exhaust purification system for an internal combustion engine, including:
a selective reduction catalyst that is provided in an exhaust system of the internal combustion engine and reduces NOx flowing through the exhaust system under the presence of a reducing agent; and
a reducing agent supply means for supplying a reducing agent or an additive serving as a source of the reducing agent into the exhaust system on an upstream side of the selective reduction catalyst, and
wherein the first physical quantity of the plant includes a parameter related to NOx in exhaust flowing into the selective reduction catalyst.

9. A control device for a plant according to claim 8, further comprising a controller that determines a supply amount of the reducing agent or the additive from the reducing agent supply means, based on an estimated value of the parameter related to NOx in the exhaust.

10. A control device for a plant according to claim 8, wherein the second physical quantity is an air/fuel ratio of exhaust flowing through the exhaust system.

11. A control device according to claim 1,
wherein the plant is an exhaust purification system of an internal combustion engine including:
a NOx purification catalyst that is provided in an exhaust system of the internal combustion engine, adsorbs or occludes NOx in exhaust when an air/fuel mixture combusting in the internal combustion engine is set to be leaner than a theoretical air/fuel ratio, and reduces the NOx thus adsorbed or occluded under a reducing atmosphere; and
a reducing means for executing reducing control processing to make the exhaust flowing into the NOx purification catalyst a reducing atmosphere, and
wherein the first physical quantity of the plant includes a parameter related to NOx in exhaust flowing into the NOx purification catalyst, and a parameter related to a reducing component in exhaust flowing into the NOx purification catalyst.

12. A control device according to claim 11, further comprising a controller that instructs execution of the reducing control processing based on estimated values of the parameter related to NOx and the parameter related to the reducing component.

13. A control device for a plant according to claim 11, wherein the second physical quantity is an air/fuel ratio of exhaust flowing through the exhaust system.

* * * * *